000000000000000000000

(12) United States Patent
Park et al.

(10) Patent No.: US 7,583,586 B2
(45) Date of Patent: Sep. 1, 2009

(54) APPARATUS AND METHOD FOR TRANSMITTING/RECEIVING PILOT SIGNAL IN COMMUNICATION SYSTEM USING OFDM SCHEME

(75) Inventors: Sung-Eun Park, Suwon-si (KR); Seung-Hoon Choi, Suwon-si (KR); Dong-Seek Park, Yongin-si (KR); Jae-Yoel Kim, Gunpo-si (KR); Ji-Ho Jang, Seoul (KR); Pan-Yuh Joo, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 749 days.

(21) Appl. No.: 11/167,663

(22) Filed: Jun. 27, 2005

(65) Prior Publication Data

US 2006/0028976 A1 Feb. 9, 2006

(30) Foreign Application Priority Data

Jul. 2, 2004 (KR) ...................... 10-2004-0051468
Aug. 26, 2004 (KR) ...................... 10-2004-0069408

(51) Int. Cl.
*H04J 11/00* (2006.01)

(52) U.S. Cl. .................. 370/209; 370/210; 370/335

(58) Field of Classification Search ......... 370/203–210, 370/335, 342, 491, 480; 375/25, 141, 142; 714/755, 780

See application file for complete search history.

(56) References Cited

U.S. PATENT DOCUMENTS 5,577,025 A * 11/1996 Skinner et al. ............. 370/209

| | | | | |
|---|---|---|---|---|
| 5,757,767 A * | 5/1998 | Zehavi | ............ | 370/208 |
| 6,731,674 B1 * | 5/2004 | Yang et al. | ............ | 375/146 |
| 6,854,082 B1 * | 2/2005 | Rhee | ............ | 714/755 |
| 7,075,906 B2 * | 7/2006 | Douglas et al. | ............ | 370/328 |
| 2003/0072255 A1 * | 4/2003 | Ma et al. | ............ | 370/208 |
| 2004/0109405 A1 * | 6/2004 | Suh et al. | ............ | 370/208 |
| 2004/0131007 A1 * | 7/2004 | Smee et al. | ............ | 370/208 |
| 2006/0018251 A1 * | 1/2006 | Park et al. | ............ | 370/209 |

OTHER PUBLICATIONS

Peak-to-Average Rower Ratio Reduction of an OFDM Signal using Partial Transmit Sequence. Cimini, Jr et al. IEEE, Communication letters, 1999.*
Peak-to-Average Rower Ratio in MIMO-OFDM System using Selective Mapping. Lee et al. IEEE, Communication letters, vol. 7, No. 12 Dec. 2003.*

* cited by examiner

*Primary Examiner*—Ian N Moore
*Assistant Examiner*—Jose Villa
(74) *Attorney, Agent, or Firm*—The Farrell Law Firm, LLP

(57) ABSTRACT

Disclosed is a method for transmitting a reference signal for identification of each cell in a communication system including a plurality of cells each of which is identified by a cell identifier. The method includes receiving a cell identifier, and generating a block code corresponding to the cell identifier using a predetermined block code generator matrix, and generating a first part sequence using the block code; selecting a second part sequence in accordance with the cell identifier; generating a reference signal of a frequency domain using the first part sequence and the second part sequence; converting the reference signal of the frequency domain to a reference signal of a time domain through an Inverse Fast Fourier Transform operation and transmitting the reference signal of the time domain in a predetermined reference signal transmission interval.

57 Claims, 9 Drawing Sheets

APPARATUS AND METHOD FOR TRANSMITTING/RECEIVING PILOT SIGNAL IN COMMUNICATION SYSTEM USING OFDM SCHEME

PRIORITY

This application claims priority to an application entitled "Apparatus And Method For Transmitting/Receiving Pilot Signal In Communication System Using OFDM Scheme" filed in the Korean Industrial Property Office on Jul. 2, 2004 and assigned Ser. No. 2004-51468 and on Aug. 26, 2004 and assigned Ser. No. 2004-69408, the contents of which are hereby incorporated by reference.

BACKGROUND OF THE INVENTION

1. Field of the Invention

The present invention relates to a communication system using an Orthogonal Frequency Division Multiplexing (OFDM) scheme, and more particularly to an apparatus and a method for transmitting/receiving pilot signals for identifying base stations and sectors.

2. Description of the Related Art

In a $4^{th}$ generation (4G) communication system, which is the next generation communication system, research has been actively pursued to provide users with services having various qualities of service (QoS) and supporting a high transmission speed. Currently, in the 4G communication system, research has been actively pursued to support high speed services while ensuring mobility and QoS in a Broadband Wireless Access (BWA) communication system such as a wireless Local Area Network (LAN) and a Metropolitan Area Network (MAN) system.

In the 4G communication system, known to be useful for high speed data transmission in wire or wireless channels, the OFDM scheme is now actively being researched. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal sub-carriers before being transmitted.

In order to provide wireless multimedia service of high speed and high quality, the 4G communication system requires a wideband spectrum resource. However, when the wideband spectrum resource is used, the influence of fading on the wireless transmission paths due to multi-path propagation becomes severe, and the frequency selective fading has an influence on the transmission frequency bands. Therefore, for high speed wireless multimedia service, the OFDM scheme is now used more frequently than the Code Division Multiple Access (CDMA) scheme in the 4G communication system, since the OFDM scheme is more robust against the frequency selective fading and is thus more advantageous than the CDMA scheme.

Now, operations of a transmitter and a receiver in a communication system using the OFDM scheme ("hereinafter, the OFDM communication system") will be briefly discussed.

In the transmitter of the OFDM communication system, input data is modulated into sub-carrier signals by a scrambler, an encoder and an interleaver. Here, the transmitter provides a variety of variable data rates, based on which the coding rate, the interleaving size and the modulation scheme are determined. Usually, the encoder uses coding rates such as ½, ¾, etc., and the interleaving size for preventing burst error is determined according to the Number of Coded Bits Per OFDM Symbol (NCBPS). As the modulation scheme, a Quadrature Phase Shift Keying (QPSK) scheme, an 8-ary-Phase Shift Keying (8PSK) scheme, a 16-ary Quadrature Amplitude Modulation (16QAM) scheme, or a 64-ary Quadrature Amplitude Modulation (64QAM) scheme may be used, according to the data rates.

Meanwhile, a predetermined number of the modulated sub-carrier signals are added to a predetermined number of pilot sub-carrier signals, and an Inverse Fast Fourier Transform (IFFT) unit performs IFFT for the added signals, thereby generating an OFDM symbol. Then, guard intervals are inserted into the OFDM symbol in order to eliminate the inter-symbol interference (ISI) in the multi-path channel environment. The OFDM symbol containing the guard intervals is finally input to a Radio Frequency (RF) processor through a symbol waveform generator. Then, the RF processor processes the input signal and transmits the processed signal over the air.

Here, the guard interval is inserted in order to eliminate interference between OFDM symbols transmitted in the previous OFDM symbol time and OFDM symbols to be transmitted in the current OFDM symbol time. Therefore, a cyclic prefix method or a cyclic postfix method is usually used in inserting the guard interval. In the cyclic prefix method, a predetermined number of last bits of an OFDM symbol in the time domain are copied and inserted into an effective OFDM symbol. In the cyclic postfix method, a predetermined number of initial bits of an OFDM symbol in the time domain are copied and inserted into an effective OFDM symbol.

The receiver of the OFDM communication system, corresponding to the transmitter as described above, performs a process in reverse to the process in the transmitter together with an additional synchronization step.

To be more specific, first, frequency offset estimation and symbol offset estimation are performed using a training symbol set in advance for a received OFDM symbol. Then, a data symbol obtained by eliminating guard intervals from the OFDM symbol is restored to a predetermined number of sub-carrier signals containing a predetermined number of pilot sub-carriers added thereto by a Fast Fourier Transform (FFT) unit. Further, in order to overcome a path delay in an actual wireless channel, an equalizer estimates channel condition for the received channel signal, thereby eliminating signal distortion in the actual wireless channel from the received channel signal. The channel-estimated data from the equalizer is transformed into a bit stream which then passes through a de-interleaver. Thereafter, the bit stream passes through a decoder and descrambler for error correction and is then output as final data.

In the OFDM communication system as described above, a transmitter (for example, a Base Station (BS)) transmits pilot sub-carrier signals to a receiver (for example, a Mobile Station (MS)). The BS simultaneously transmits data sub-carrier signals together with the pilot sub-carrier signals. The MS can perform synchronization acquisition, channel estimation and BS identification by receiving the pilot sub-carrier signals. That is, the pilot sub-carrier signal is a kind of reference sub-carrier signal and serves as a kind of training sequence, thereby enabling channel estimation between the transmitter and the receiver. Moreover, an MS can identify by using the pilot sub-carrier signal a BS to which the MS belongs. The locations for the pilot sub-carrier signals have been agreed in advance by a protocol between the transmitter and the receiver. As a result, the pilot sub-carrier signals operate as kinds of reference signals.

A process will now be described in which an MS identifies, by using the pilot sub-carrier, and signals a BS to which the MS belongs.

First, the BS transmits the pilot sub-carrier signals with a relatively higher transmit power than that for the data sub-carrier signals such that the pilot sub-carrier signals can reach the cell boundary with a particular pattern (specifically, a pilot pattern). The reason why the BS transmits the pilot sub-carrier signals with a relatively high transmit power such that the pilot sub-carrier signals can reach the cell boundary with a particular pilot pattern will now be described.

First, the MS does not have any information about the BS to which the MS currently belongs when the MS enters a cell. In order to detect the BS to which the MS belongs, the MS must receive the pilot sub-carrier signals. Therefore, the BS transmits the pilot sub-carrier signals having a particular pilot pattern with a relatively high transmit power, in order to enable the MS to detect the BS to which the MS belongs.

Meanwhile, the pilot pattern implies a pattern generated by the pilot sub-carrier signals transmitted by the BS. That is, the pilot pattern is generated by the slope of the pilot sub-carrier signals and the start point at which the pilot sub-carrier signals begin to be transmitted. Therefore, the OFDM communication system must be designed such that each BS in the OFDM communication system has a specific pilot pattern for its identification. Further, coherence bandwidth and coherence time must be taken into account in generating the pilot pattern. Now, coherence bandwidth and coherence time will be discussed.

The coherence bandwidth signifies a maximum bandwidth on an assumption that a channel is constant in a frequency domain. The coherence time signifies a maximum time on an assumption that a channel is constant in a time domain. Therefore, it can be assumed that the channel is constant within the coherence bandwidth and coherence time. As a result, transmission of a single pilot sub-carrier signal within the coherence bandwidth and during the coherence time is sufficient for synchronization acquisition, channel estimation and BS identification.

Such transmission of a single pilot sub-carrier signal within the coherence bandwidth and during the coherence time can maximize transmission of data sub-carrier signals, thereby improving performance of the entire system. Therefore, it can be said that the coherence bandwidth is a maximum frequency interval with which the pilot sub-carrier signals are transmitted and the coherence time is a maximum time interval with which the pilot channel signals are transmitted, that is, a maximum OFDM symbol time interval.

Meanwhile, the number of BSs included in the OFDM communication system depends on the size of the OFDM communication system. Usually, a larger OFDM communication system includes more BSs. Therefore, in order to identify each of the BSs in the OFDM communication system, the number of the pilot patterns having different slopes and different start points must be equal to or greater than the number of the BSs included in the OFDM communication system. However, in order to transmit the pilot sub-carrier signals in the time-frequency domain of the OFDM communication system, the coherence bandwidth and the coherence time must be taken into consideration as described above. When the coherence bandwidth and the coherence time is taken into consideration, there is a limit to the number of the pilot patterns having different slopes and different start points. In contrast, when the pilot pattern is generated without considering the coherence bandwidth and the coherence time, pilot sub-carrier signals in pilot patterns representing different BSs get mixed up, so that it becomes impossible to identify the BSs by using the pilot patterns.

Locations at which pilot subcarriers are transmitted according to the pilot patterns in a typical OFDM communication system using one pilot sub-channel will now be discussed with reference to FIG. 1.

FIG. 1 is a graph schematically illustrating locations at which pilot subcarriers are transmitted according to the pilot patterns in a typical OFDM communication system using one pilot sub-channel.

Referring to FIG. 1, all slopes which can be generated by the pilot patterns and the number of the slopes (that is, the slopes according to the pilot sub-carrier signal transmission and the number of the slopes) are limited by the coherence bandwidth 100 and the coherence time 110. When the coherence bandwidth 100 is 6 and the coherence time 110 is 1, if the slope of the pilot pattern is an integer, six slopes from the slope s=0 (101) to the slope s=5 (106) can be generated as the slope of the pilot pattern. That is, under the conditions described above, the slope of the pilot pattern consists of integers from 0 to 5.

Here, the fact that six slopes of the pilot patterns can be generated implies that six BSs can be identified by using the pilot patterns in the OFDM communication system satisfying the conditions described above. A hatched circle 107 in FIG. 1 represents another pilot sub-carrier signal spaced with the coherence bandwidth 100 away from the first pilot sub-carrier signal. As a result, the slopes of the pilot patterns are limited by the coherence bandwidth 100.

As described above, the number of the pilot patterns used in order to identify BSs in the OFDM communication system is limited by the coherence bandwidth and the coherence time. Therefore, the limitation in the number of the pilot patterns which can be generated limits the number of identifiable BSs in the OFDM communication system.

SUMMARY OF THE INVENTION

Accordingly, the present invention has been made to solve the above-mentioned problems occurring in the prior art, and an object of the present invention is to provide an apparatus and a method for transmitting/receiving pilot signals for identifying base stations and sectors in an OFDM communication system.

It is another object of the present invention to provide an apparatus and a method for transmitting/receiving pilot signals in an OFDM communication system, which can minimize interference between the pilot signals.

It is another object of the present invention to provide an apparatus and a method for transmitting/receiving pilot signals each having a variable length in an OFDM communication system.

It is another object of the present invention to provide an apparatus and a method for transmitting/receiving pilot signals by using block codes generated by means of a Walsh basis and mask sequences in an OFDM communication system.

In order to accomplish this object, there is provided a method for transmitting a reference signal for identification of each cell in a communication system including a plurality of cells, each of which is identified by a cell identifier, the method including the steps of receiving a cell identifier, and generating a block code corresponding to the cell identifier using a predetermined a block code generator matrix, and then generating a first part sequence using the block code; selecting a second part sequence in accordance with the cell identifier; generating a reference signal of a frequency domain using the first part sequence and the second part sequence; converting the reference signal of the frequency domain to a reference signal of a time domain through an Inverse Fast Fourier Transform (IFFT) operation and then transmitting the reference signal of the time domain in a predetermined reference signal transmission interval.

In accordance with another aspect of the present invention, there is also provided a method for transmitting a reference signal for identification of each cell in a communication system including a plurality of cells each of which is identified by a cell identifier, and an entire frequency band of the communication system including a sub-carrier bands, the method including the steps of in response to input of the cell identifier, generating a block code corresponding to the cell identifier using a predetermined block code generator matrix; generating a first part sequence by interleaving the block code according to a predetermined interleaving scheme and performing an exclusive OR operation on the interleaved block code; selecting a second part sequence corresponding to the cell identifier and from among predetermined sequences considering Peak-to-Average Power Ratio(PAPR) reduction; generating a reference signal of a frequency domain by using the first part sequence and the second part sequence; converting the reference signal of the frequency domain to a reference signal of a time domain through an Inverse Fast Fourier Transform (IFFT) operation and then transmitting the reference signal of the time domain in a predetermined reference signal transmission interval.

In accordance with another aspect of the present invention, there is also provided a method for receiving a reference signal for identification of each cell in a communication system including a plurality of cells each of which is identified by a cell identifier, and an entire frequency band of the communication system including a sub-carrier bands, the method including the steps of extracting the reference signal from a received signal which has been converted through a Fast Fourier Transform (FFT) operation; dividing the reference signal into a predetermined number of intervals and performing an exclusive OR (XOR) operation on the divided intervals; deinterleaving the XOR-processed signal according to a predetermined deinterleaving scheme; dividing the deinterleaved signal into sub-block signals in accordance with a predetermined block code generator matrix; performing an Inverse Fast Hadamard Transform (IFHT) using mask sequences generated according to control of each of the sub-block signals; generating a combined signal by combining the IFHT-processed signals for each of the sub-block signals; and determining a cell identifier corresponding to a block code having a maximum correlation value from among the combined signals as a final cell identifier.

In accordance with another aspect of the present invention, there is also provided a method for transmitting a reference signal for identification of each cell through at least one transmit antenna in a communication system including a plurality of cells each of which is identified by a cell identifier, and an entire frequency band of the communication system including a sub-carrier bands, the method including the steps of receiving a cell identifier, generating a block code corresponding to the cell identifier by using a predetermined block code generator matrix, selecting a Walsh code corresponding to the cell identifier from among predetermined Walsh codes, and repeating the selected Walsh code a predetermined number of times; interleaving the block code according to a predetermined interleaving scheme and performing an exclusive OR operation on the interleaved block code and the repeated Walsh code, thereby generating a first part sequence; selecting a second part sequence corresponding to the cell identifier from among predetermined sequences; generating a reference signal of a frequency domain by using the first part sequence and the second part sequence; and converting the reference signal of the frequency domain to a reference signal of a time domain through an Inverse Fast Fourier Transform (IFFT) operation and then transmitting the reference signal of the time domain in a predetermined reference signal transmission interval.

In accordance with another aspect of the present invention, there is also provided an apparatus for transmitting a reference signal for identification of each cell in a communication system including a plurality of cells each of which is identified by a cell identifier, the apparatus including a reference signal generator which, in response to input of the cell identifier, generates a block code corresponding to the cell identifier by using a predetermined block code generator matrix, generates a first part sequence by using the block code, selects a second part sequence in accordance with the cell identifier, and generates a reference signal of a frequency domain by using the first part sequence and the second part sequence; and a transmitter for converting the reference signal of the frequency domain to a reference signal of a time domain through an Inverse Fast Fourier Transform and operation and then transmitting the reference signal of the time domain over a reference signal transmission interval.

In accordance with another aspect of the present invention, there is also provided an apparatus for transmitting a reference signal for identification of each cell in a communication system including a plurality of cells each of which is identified by a cell identifier, and an entire frequency band of the communication system including a sub-carrier bands, the apparatus including a block code encoder which, in response to input of the cell identifier, generates a block code corresponding to the cell identifier by using a predetermined block code generator matrix; an interleaver for interleaving the block code according to a predetermined interleaving scheme; an adder for performing an exclusive OR operation on the interleaved block code, thereby generating a first part sequence; a combiner for generating a reference signal of a frequency domain by using the first part sequence and a second part sequence which is selected corresponding to the cell identifier from among predetermined sequences; and a transmitter for converting the reference signal of the frequency domain to a reference signal of a time domain through an Inverse Fast Fourier Transform(IFFT), and operation and then transmitting the reference signal of the time domain over a reference signal transmission interval.

In accordance with another aspect of the present invention, there is also provided an apparatus for receiving a reference signal for identification of each cell in a communication system including a plurality of cells each of which is identified by a cell identifier, and an entire frequency band of the communication system including a sub-carrier bands, the apparatus including a Fast Fourier Transform (FFT) unit for performing an FFT operation on a received signal; a reference signal extractor for extracting the reference signal from the FFT-processed signal; an adder for dividing the reference signal into a predetermined number of intervals and performing an exclusive OR (XOR) operation on the divided intervals; a deinterleaver for deinterleaving the XOR-processed signal according to a predetermined deinterleaving scheme; a sub-block divider for dividing the deinterleaved signal into sub-block signals in accordance with a predetermined block code generator matrix; a block code decoder for performing an Inverse Fast Hadamard Transform (IFHT) using mask sequences generated according to control of each of the sub-block signals; a combiner for generating a combined signal by combining the IFHT-processed signals for each of the sub-block signals; and a comparison selector for determining a cell identifier corresponding to a block code having a maximum correlation value from among the combined signals as a final cell identifier.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention unclear.

The present invention provides an apparatus and a method for transmitting/receiving pilot signals for identifying base stations and sectors in an OFDM communication system. In particular, the present invention provides an apparatus and a method for transmitting/receiving pilot signals through at least one antenna, which can minimize interference between the pilot signals in performing identification of base stations and sectors in an OFDM communication system.

Figure 1:
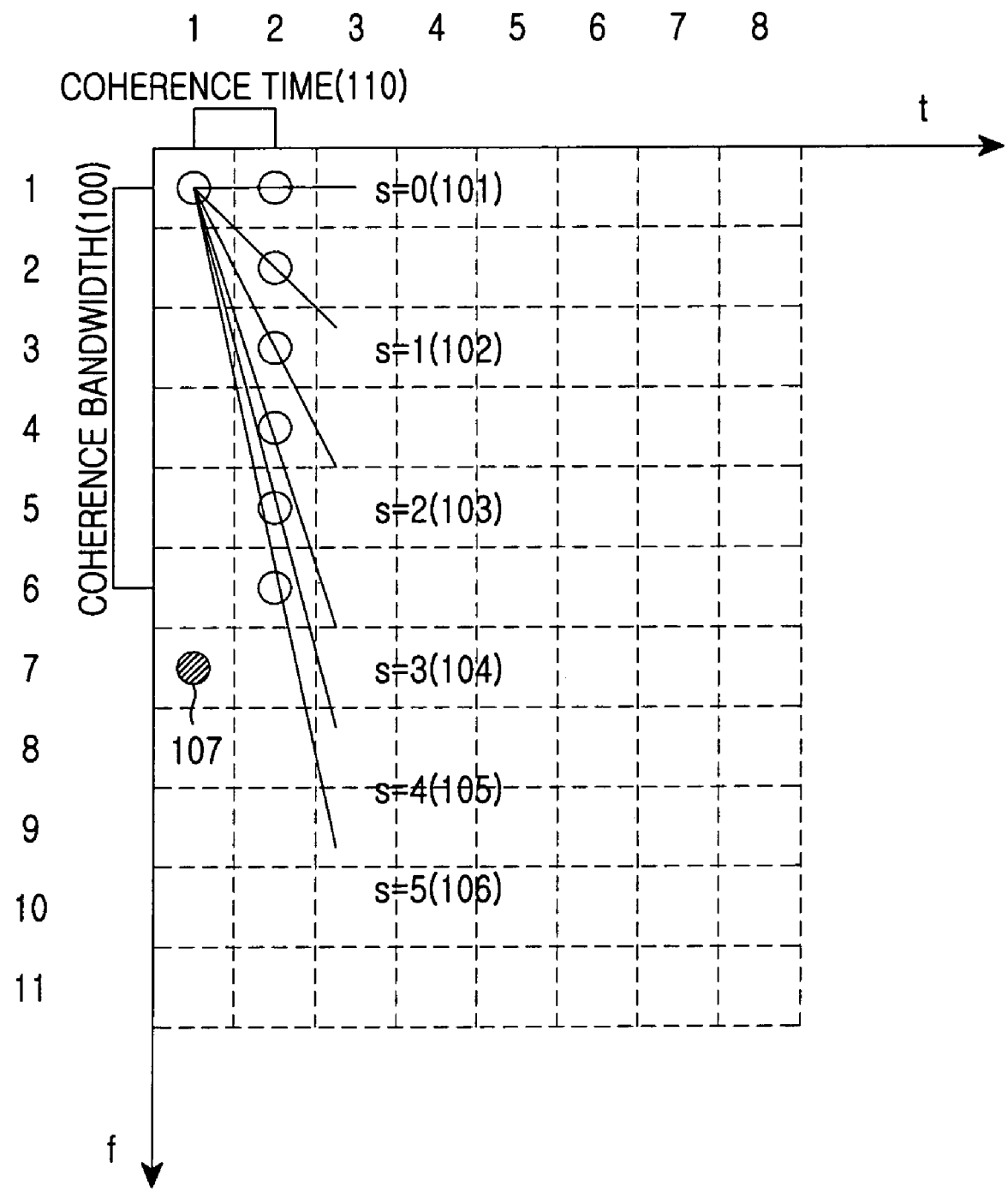
FIG. 1 is a graph schematically illustrating all slopes which can be generated by the pilot patterns in a typical OFDM communication system.
Figure 2:
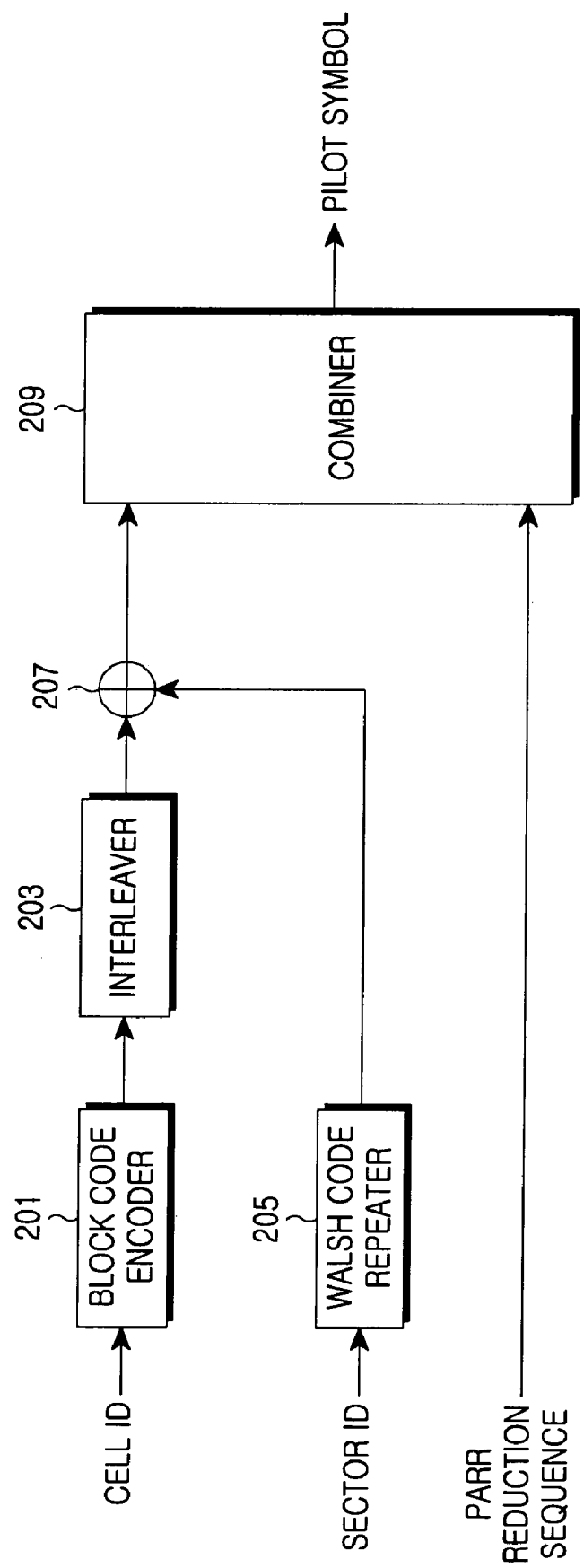
FIG. 2 is a block diagram illustrating an internal structure of a pilot signal generator of an OFDM communication system according to an embodiment of the present invention.

FIG. 2 is a block diagram illustrating an internal structure of a pilot signal generator of an OFDM communication system according to an embodiment of the present invention.

Referring to FIG. 2, the pilot signal generator includes a block code encoder 201, an interleaver 203, a Walsh code repeater 205, an adder 207 and a combiner 209.

First, a cell identifier (ID), which is an ID for identifying a cell (i.e. BS), is input to the block code encoder 201. Upon receiving the cell ID, the block code encoder 201 generates a codeword (i.e. block code) corresponding to the cell ID from a generator matrix G (not shown) stored in advance in the block code encoder 201 and outputs the generated block code to the interleaver 203. The generator matrix G generates block codes corresponding to the cell IDs, which are clearly differentiable from each other. The generator matrix G will be described now with reference to Equation (1) below.

$$G = \begin{bmatrix} \text{Walsh base} & \begin{matrix} \text{Mask}_{(i+1)} \\ \vdots \\ \text{Mask}_{(n)} \end{matrix} & \begin{matrix} \text{Mask}_{(j+1)} \\ \vdots \\ \text{Mask}_{(n)} \end{matrix} \\ \begin{matrix} \text{Mask}_{(1)} \\ \text{Mask}_{(2)} \end{matrix} & \text{Walsh base} & \cdots & \text{Walsh base} \\ \vdots & \begin{matrix} \text{Mask}_{(1)} \\ \vdots \end{matrix} & \begin{matrix} \text{Mask}_{(1)} \\ \vdots \end{matrix} \\ \text{Mask}_{(n)} & \text{Mask}_{(i)} & \text{Mask}_{(j)} \end{bmatrix} \quad (1)$$

First, on an assumption that the generator matrix G has $N_r$ rows and $N_c$ columns, the length $N_G$ of the block code which can be generated by using the generator matrix G is equal to the number $N_c$ of the columns of the generator matrix G. Further, the pilot symbols generated by the block code can identify a maximum number of $(2^{N_r}-1)$ cells. Each of the $N_c$ columns includes a number of sub-blocks each having a length of $N_c/a$ which is designed to be less than the coherence bandwidth of a channel. The a sub-blocks in each of the $N_c$ columns include $$\log_2\left(\frac{N_c}{a}\right)$$

Walsh bases and n mask sequences. Here, the Walsh bases in the a sub-blocks are the same Walsh basis. The number n of the mask sequences is equal to $$N_r - \log_2 t\left(\frac{N_c}{a}\right).$$

In equation (1), mask(i) represents the i-th mask sequence. In the generator matrix G, the second sub-block is generated through an (n-1) time cyclic shift of the rows of the first sub-block, and the m-th sub-block is generated through an (n-j) time cyclic shift of the rows of the first sub-block in the same way. The cyclic shift is performed in such a way as to maximize the minimum distance of the block code generated by using the generator matrix G.

The interleaver 203 receives the signal output from the block code encoder 201, interleaves the signal according to a predetermined interleaving scheme and outputs the interleaved signal to the adder 207. The reason why the interleaver 207 interleaves the signal from the block code encoder 201 according to the predetermined interleaving scheme is that the Peak to Average Power Ratio (PAPR) of the pilot signal becomes high when the block code generated in the block code encoder 201 (i.e. the block code generated correspondingly to a specific cell ID) includes a frequently repeated numerical sequence of a specific pattern. In other words, the PAPR of the pilot signal of the OFDM system is reduced (i.e. the PARP characteristic is improved) by interleaving all block codes generated by the block code encoder 201.

Now, an internal structure of the interleaver 203 will be discussed.

First, the interleaver 203 includes a internal interleavers (not shown) which perform interleaving for the signals generated through the a sub-blocks of the generator matrix G, respectively. That is, the block code output from the block code encoder 201 is divided into a sub-codes which are interleaved in different ways by the a internal interleavers, respectively. Through the interleaving for each of the a sub-codes of the block code by the interleaver 203, the receiver can decode the information data corresponding to the block code transmitted from the transmitter, by using the Inverse Fast Hadamard Transform (IFHT) using the Walsh basis.

In the meantime, a sector ID (an ID for identifying a sector) is input to the Walsh code repeater 205. Upon receiving the sector ID, the Walsh code repeater 205 repeats a Walsh code corresponding to the sector ID a predetermined number of times and then outputs a signal, including the repeated Walsh code, to the adder 207.

In the present embodiment, it is assumed that the pilot symbol of the OFDM communication system has a length of $N_P$, the block code generated by the block code encoder 201 has a length $N_G$, and the Walsh code has a length of $N_w$. On this assumption, the Walsh code repeater 205 repeats $N_W/N_G$ times the Walsh code corresponding to the sector ID and outputs the signal including the repeated Walsh code to the adder 207. Here, the length of the signal output from the Walsh code repeater 205 is equal to the length $N_G$ of the signal output from the interleaver 203.

The adder 207 performs an exclusive OR (XOR) operation on the signal output from the interleaver 203 and the signal output from the Walsh code repeater 205 and outputs the resultant signal to the combiner 209.

A PAPR reduction sequence is a sequence for reducing the PAPR of a pilot symbol in the OFDM communication system and has a length of $N_R$. Here, it is assumed that the PAPR reduction sequence has been determined in advance correspondingly to the cell ID and the sector ID. The PAPR reduction sequence, having a length of $N_R$, is input to the combiner 209. The combiner 209 allocates sub-carriers to the signal output from the adder 207 and the PAPR sequence so that the signal from the adder and the PAPR sequence can be carried by the sub-carriers, thereby generating and outputting a pilot symbol. Here, the pilot symbol output from the combiner 209 has a length of $N_P$ ($N_P = N_G + N_R$).

Hereinafter, an internal structure of a transmitter will be described with reference to FIG. 3 which is a block diagram illustrating an internal structure of a transmitter of an OFDM communication system according to an embodiment of the present invention.

Figure 3:
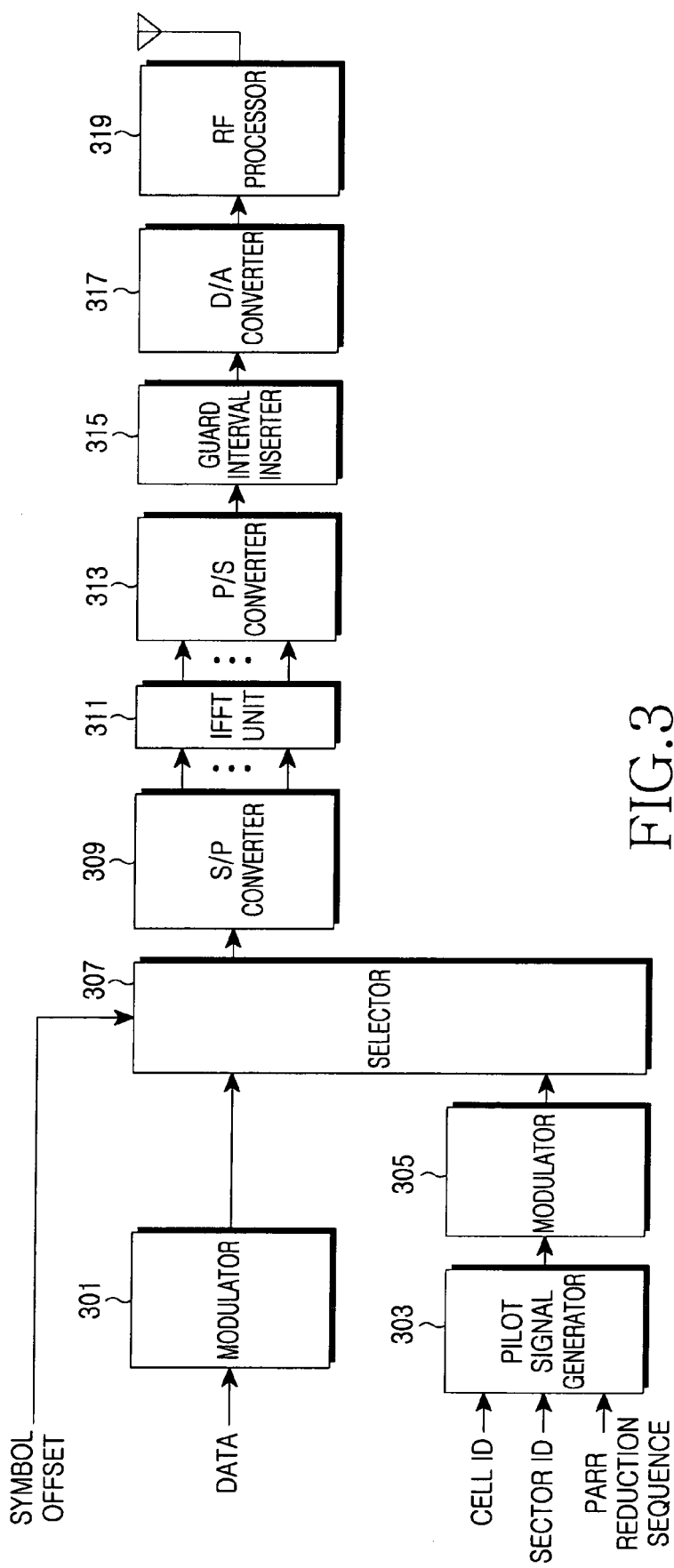
FIG. 3 is a block diagram illustrating an internal structure of a transmitter of an OFDM communication system according to an embodiment of the present invention.

Referring to FIG. 3, the transmitter includes a first modulator 301, a pilot signal generator 303, a second modulator 305, a selector 307, a serial-to-parallel converter 309, an Inverse Fast Fourier Transform (IFFT) unit 311, a parallel-to-serial converter 313, a guard interval inserter 315, a digital-to-analog converter 317, a Radio Frequency (RF) processor 319.

First, when there is data to be transmitted (i.e. information data bits), the information data bits are input to the first modulator 301. The first modulator 301 generates a modulated symbol by modulating the input information data bits according to a predetermined modulation scheme and outputs the modulated symbol to the selector 307. Here, various schemes such as a Quadrature Phase Shift Keying (QPSK) scheme or a 16-ary Quadrature Amplitude Modulation (16QAM) scheme are available for the modulation scheme.

When it is necessary to transmit a pilot signal (i.e. pilot symbol), a cell ID and a sector ID of a cell and sector to which the pilot symbol will be transmitted and a PAPR reduction sequence, set in advance correspondingly to the cell ID and the sector ID, are input to the pilot signal generator 303. The pilot signal generator 303 generates a pilot symbol by using the input cell ID, sector ID, and the PAPR reduction sequence and outputs the generated pilot symbol to the second modulator 305. Here, the pilot signal generator 303 has an internal structure as shown in FIG. 2. Upon receiving the signal output from the pilot signal generator 303, the second modulator 305 generates a modulated symbol by modulating the signal according to a predetermined modulation scheme and outputs the modulated symbol to the selector 307. Here, a Binary Phase Shift Keying (BPSK) scheme, etc., may be used as the modulation scheme.

In a data symbol transmission interval in which the transmitter must transmit a current data symbol, the selector 307 allows the signal from the first modulator 301 to be output to the serial-to-parallel converter 309. In contrast, in a pilot symbol transmission interval in which the transmitter must transmit a current pilot symbol, the selector 307 allows the signal from the second modulator 305 to be output to the serial-to-parallel converter 309. The serial-to-parallel converter 309 converts the serial modulation symbols output from the selector 307 into parallel symbols and outputs the parallel symbols to the IFFT unit 311. The IFFT unit 311 performs an N-point IFFT on the signal output from the serial-to-parallel converter 309 and then outputs the IFFT-processed signal to the parallel-to-serial converter 313.

The parallel-to-serial converter 313 converts the signals output from the IFFT unit 311 into a serial signal and outputs the serial signal to the guard interval inserter 315. The guard interval inserter 315 inserts a guard interval into the signal output from the parallel-to-serial converter 313 and then outputs a resultant signal to the digital-analog converter 317. Here, the guard intervals are inserted in order to eliminate interference, between an OFDM symbol transmitted during a previous OFDM symbol time and an OFDM symbol transmitted during a current OFDM symbol time, in transmission of the OFDM symbols in the OFDM communication system. In inserting the guard intervals, a cyclic prefix method or a cyclic postfix method may be used. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol. The signal output from the guard interval inserter 315 serves as one OFDM symbol.

The digital-analog converter 317 converts the signal output from the guard interval inserter 315 into an analog signal and outputs the analog signal to the RF processor 319. Here, the RF processor 319 includes a filter and a front end unit, etc. The RF processor 319 processes the signal output from the digital-analog converter 317 and transmits the signal over the air through an antenna.

Hereinafter, an internal structure of a receiver of an OFDM communication system according to an embodiment of the present invention will be described with reference to FIG. 4.

Figure 4:
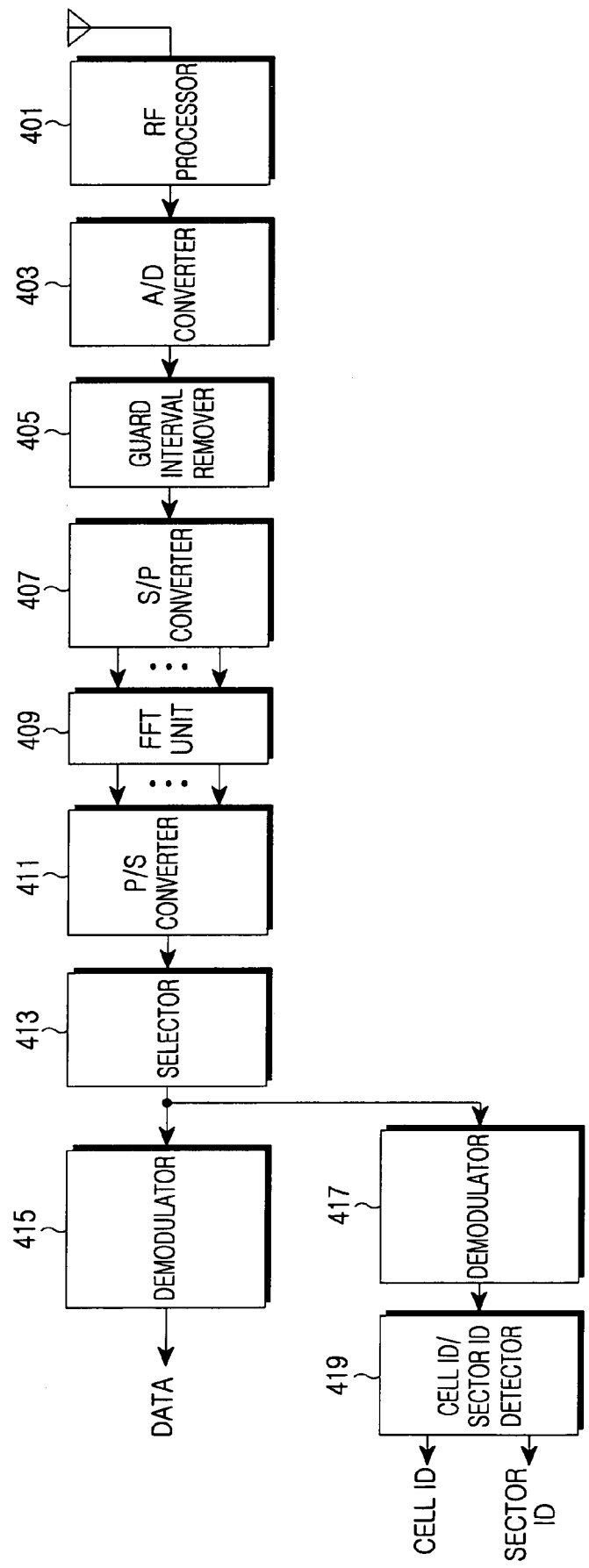
FIG. 4 is a block diagram illustrating an internal structure of a receiver of an OFDM communication system according to an embodiment of the present invention.

Referring to FIG. 4, the receiver includes an RF processor 401, an analog-to-digital converter 403, a guard interval remover 405, a serial-to-parallel converter 407, a Fast Fourier Transform (FFT) unit 409, a parallel-to-serial converter 411, a selector 413, a first demodulator 415, a second demodulator 417, and a cell ID/sector ID detector 419.

First, a signal transmitted from the transmitter of the OFDM communication system, together with noise added to the signal while the signal passes through a multipath channel, is received via a receive antenna of the receiver. The signal received through the receive antenna is input to the RF processor 401. The RF processor 401 down-converts the signal received through the reception signal into a signal having an Intermediate Frequency (IF) band and outputs the down-converted signal to the analog-to-digital converter 403. The analog-to-digital converter 403 converts the analog signal from the RF processor 401 into a digital signal and outputs the digital signal to the guard interval remover 405.

Upon receiving the digital signal from the analog-to-digital converter 403, the guard interval remover 405 removes the guard interval from the digital signal and outputs the signal to the serial-to-parallel converter 407. The serial-to-parallel converter 407 converts the serial signal into parallel signals and sends the parallel signals to the FFT unit 409. The FFT unit 409 performs an N-point FFT on the parallel signals output from the serial-to-parallel converter 407 and outputs the FFT-processed signals to the parallel-to-serial converter 411.

The parallel-to-serial converter 411 converts the parallel signals from the FFT unit 409 into a serial signal and sends the serial signal to the selector 413. In a data symbol reception interval in which the receiver must receive a current data symbol, the selector 413 allows the signal from the parallel-to-serial converter 411 to be sent to the first demodulator 415. In contrast, in a pilot symbol reception interval in which the receiver must receive a current pilot symbol, the selector 413 allows the signal from the parallel-to-serial converter 411 to be sent to the second demodulator 417. The first demodulator 415 demodulates the signal output from the selector 413 according to a demodulation scheme, corresponding to the modulation scheme employed in the transmitter, and outputs data (i.e. information data bits) restored through the demodulation.

Meanwhile, the second demodulator 417 demodulates the signal output from the selector 413 according to a demodulation scheme, corresponding to the modulation scheme employed in the transmitter, and outputs a pilot signal restored through the demodulation to the cell ID/sector ID detector 419. The cell ID/sector ID detector 419 receives the pilot signal from the second demodulator 417 and detects a cell ID and a sector ID corresponding to the pilot signal. Here, the pilot signal is a signal, generated corresponding to the cell ID and the sector ID, that has been agreed in advance by a protocol between the transmitter and the receiver.

Hereinafter, an internal structure of an cell ID/sector ID detector will be described with reference to FIG. 5 which is a block diagram illustrating an internal structure of the cell ID/sector ID detector 419 of FIG. 4.

Figure 5:
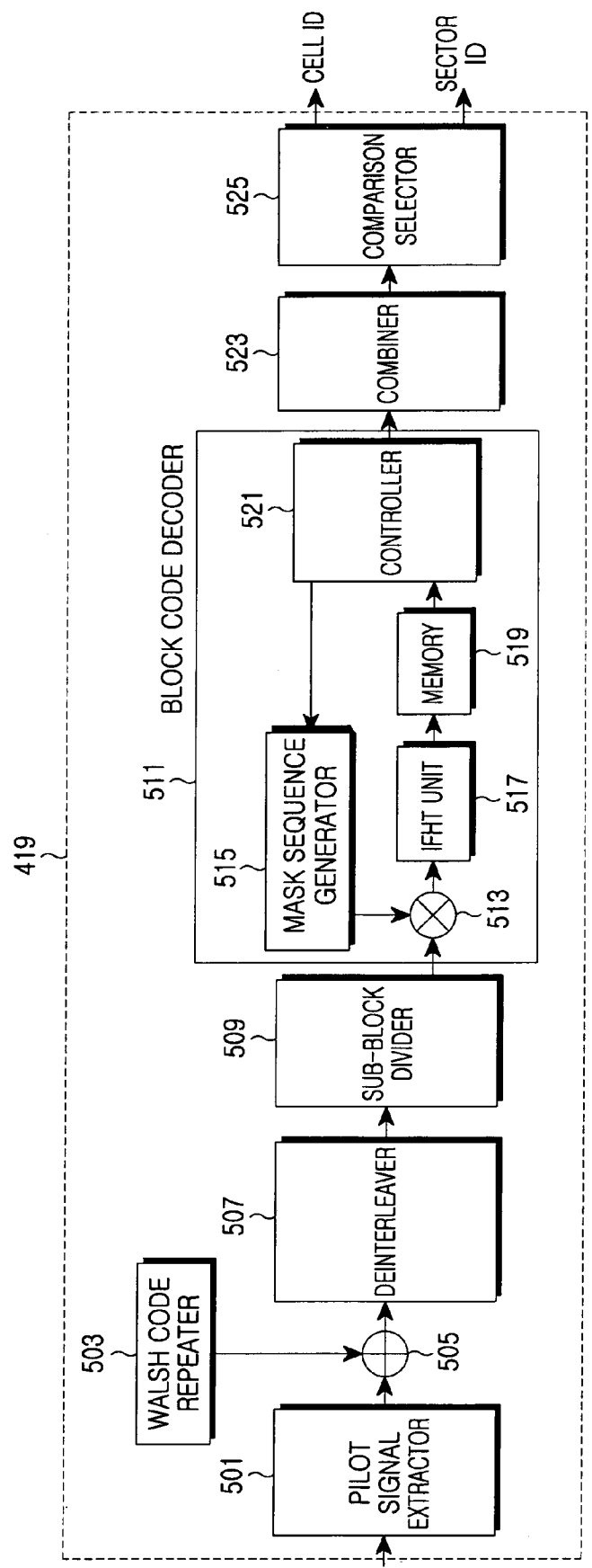
FIG. 5 is a block diagram illustrating an internal structure of a cell ID/sector ID detector of FIG. 4.

Referring to FIG. 5, the cell ID/sector ID detector 419 includes a pilot signal extractor 501, a Walsh code repeater 503, an adder 505, a deinterleaver 507, a sub-block divider 509, a block code decoder 511, a combiner 523 and a comparison selector 525. The block code decoder 511 includes a multiplier 513, a mask sequence generator 515, an IFHT unit 517, a memory 519 and a controller 521.

First, the signal output from the second demodulator 417 of FIG. 4 is input to the pilot signal extractor 501. The pilot signal extractor 501 extracts an $N_G$ number of symbols by eliminating the PAPR sequence from the signal output from the second demodulator 417 and outputs the extracted symbols to the adder 505. Further, the Walsh code repeater 503 repeatedly outputs Walsh codes corresponding to all sector IDs which can be identified by the receiver, sequentially selects one Walsh code from among the Walsh codes corresponding to the all sector IDs, and repeatedly outputs the selected Walsh code to the adder 505.

The adder 505 performs an XOR operation on the signal output from the pilot signal extractor 501 and the signal output from the Walsh code repeater 503 and sends the XOR-operated signal to the deinterleaver 507. The deinterleaver 507 deinterleaves the signal output from the adder 505 according to the same interleaving scheme as that employed by the interleavers in the pilot signal generator of the transmitter (i.e. the interleaver 203 of FIG. 2) and outputs the deinterleaved signal to the sub-block divider 509.

Upon receiving the deinterleaved signal from the deinterleaver 507, the sub-block divider 509 divides the signal into sub-blocks and outputs the sub-blocks from in the generator matrix G of the transmitter described above with reference to Equation (1). That is, the sub-block divider 509 divides the signal into a sub-blocks and sequentially outputs the sub-blocks to the block code decoder 511. Specifically, the sub-block divider 509 divides the signal output from the deinterleaver 507 into a sub-blocks, stores the a sub-blocks in an internal memory (not shown), and sequentially outputs the sub-blocks from the first sub-block while delaying the other sub-blocks until the final sub-block (i.e. the a-th sub-block) is output to the block code decoder 511.

The signal output from the sub-block divider 509 is input to the multiplier 513 of the block code decoder 511. The multiplier 513 multiplies the mask sequence output from the mask sequence generator 515 by the signal output from the sub-block divider 509 and then outputs the resultant signal to the IFHT unit 517. The mask sequence generator 515 sequentially generates the mask sequences used in the block code generator matrix G of the transmitter and outputs them to the multiplier 513 under the control of the controller 521.

Upon receiving the signal output from the multiplier 513, the IFHT unit 517 performs an IFHT operation on the signal and then outputs the IFHT-performed signal to the memory 519. The memory 519 stores the signal from the IFHT unit 517 and outputs the signal to the controller 521. The controller 521 controls the operation of the mask sequence generator 515 for generating the mask sequence. Further, after the mask sequence generator 515 generates all of the mask sequences used in the block code generator matrix G of the transmitter, the controller 521 controls the output signal of the IFHT unit 517 corresponding to the mask sequences of the corresponding sub-blocks of the output signal of the deinterleaver 507 stored in the memory 519 to be output to the combiner 523.

The combiner 523 stores the signal output from the controller 521 for the a sub-blocks, combines the output values output from the IFHT unit 517 in accordance with the block code generator matrix G of the transmitter, and then outputs the combined signal to the comparison selector 525.

The comparison selector 511 selects a maximum correlation value from among the output correlation values of the combiner 523 for the block codes corresponding to all the cell IDs and the Walsh codes corresponding to all the sector IDs, and outputs a cell ID and a sector ID corresponding to the selected maximum correlation value.

Figure 6:
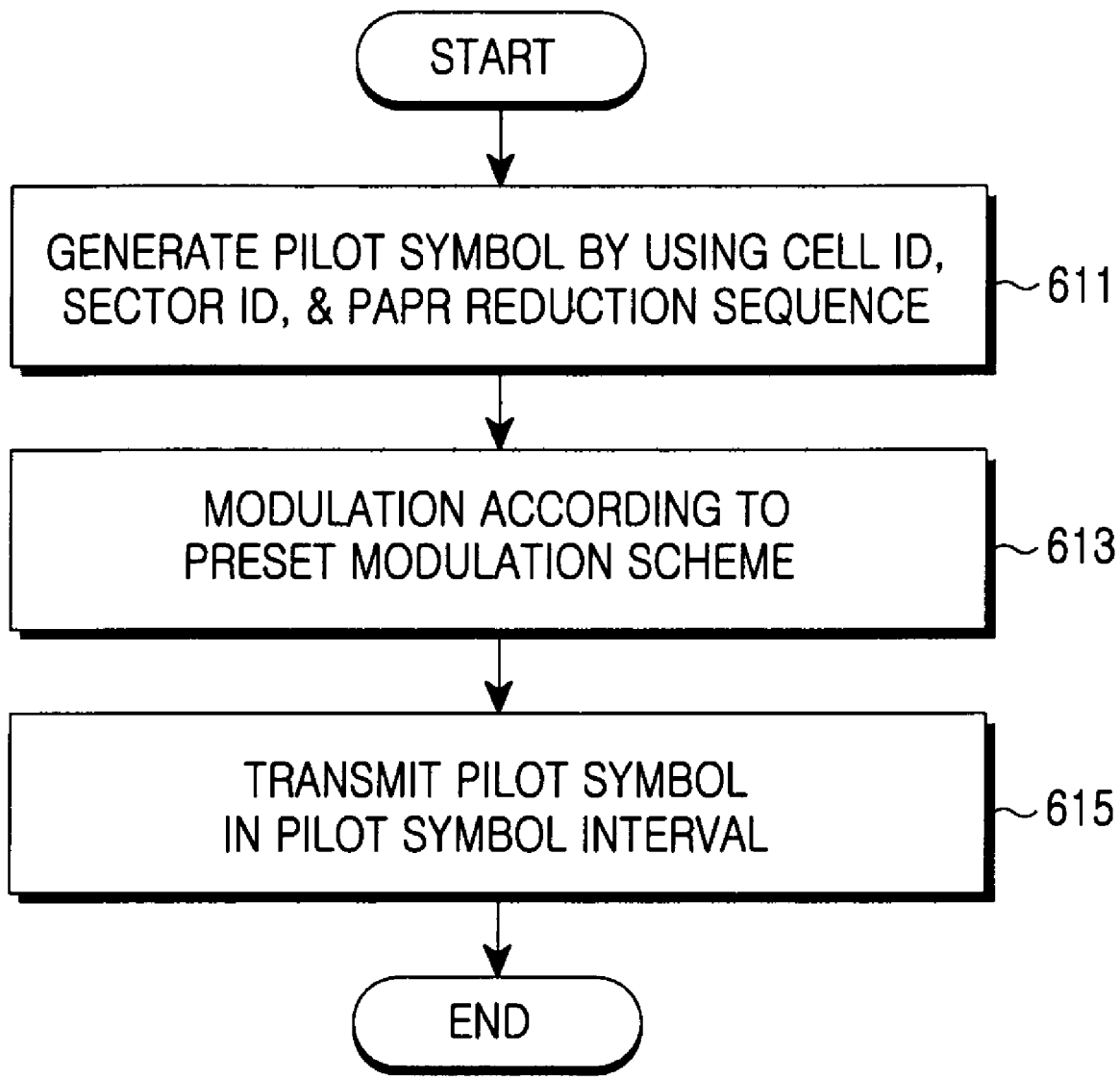
FIG. 6 is a flowchart of an operation process of a transmitter in an OFDM communication system according to an embodiment of the present invention.

Hereinafter, the operation of the transmitter will be described with reference to FIG. 6 which is a flowchart of an operation process of a transmitter in an OFDM communication system according to an embodiment of the present invention.

In the following description with reference to FIG. 6, the transmission of the pilot signal by the transmitter will be mainly discussed and the transmission of the data signal will not be dealt with in detail since the latter has no direct relation to the present invention. First, in step 611, the transmitter generates a pilot symbol by using a cell ID of the transmitter, a sector ID, and a PAPR reduction sequence. The operation of generating the pilot symbol is the same as described above with reference to FIG. 2 and will thus be omitted here. In step 613, the transmitter generates a modulated symbol by modulating the pilot symbol according to a preset modulation scheme such as a BPSK scheme.

In step 615, the transmitter transmits the modulated pilot symbol in a pilot symbol interval and ends the process. Although not shown in FIG. 6, a frequency offset may be taken into consideration in transmitting the pilot symbol. That is, the location at which the pilot symbol begins may be set differently for each cell and each sector.

Figure 7:
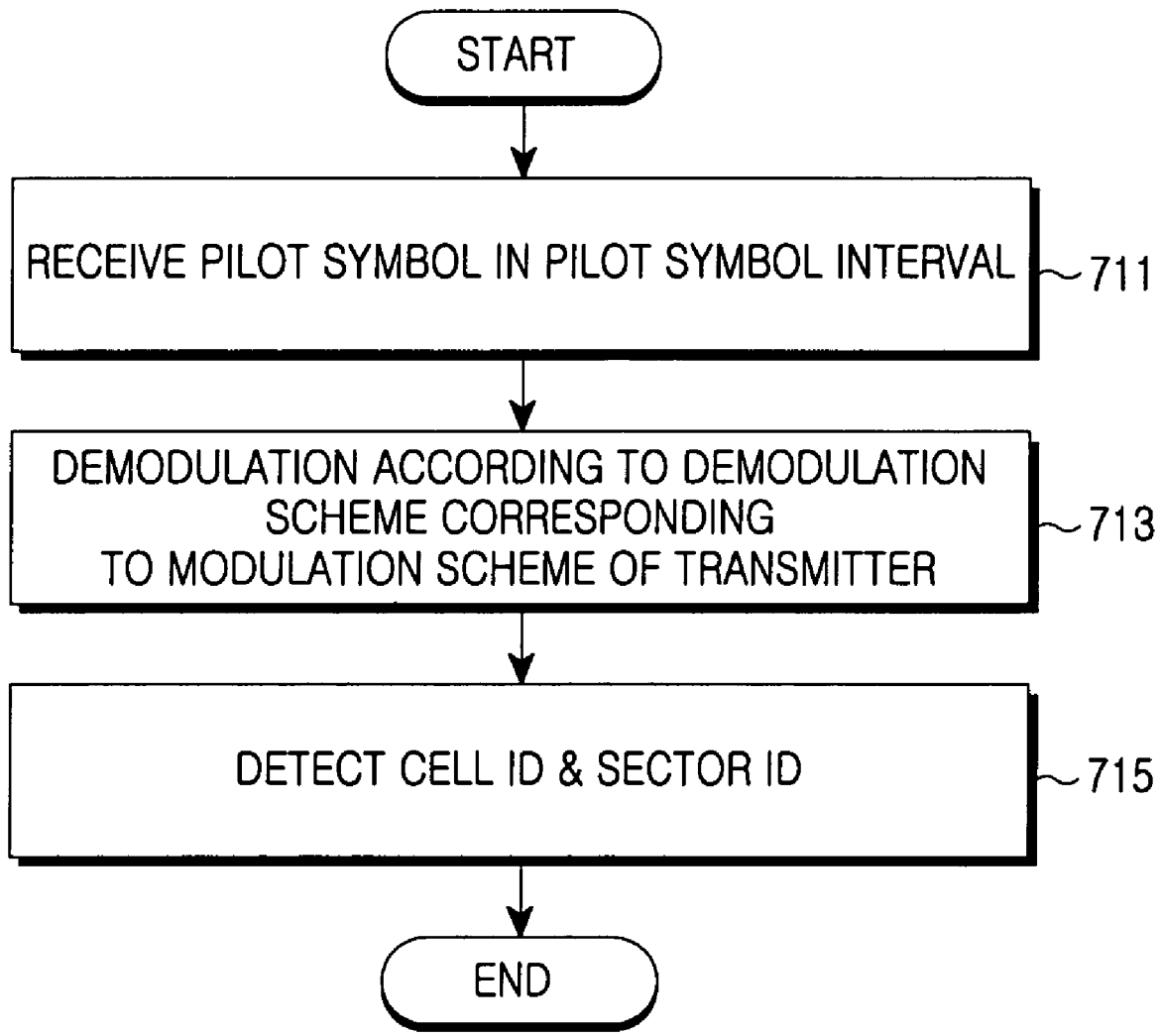
FIG. 7 is a flowchart of an operation process of a receiver in an OFDM communication system according to an embodiment of the present invention.

Hereinafter, the operation of the receiver will be described with reference to FIG. 7 which is a flowchart of an operation process of a receiver in an OFDM communication system according to an embodiment of the present invention.

In the following description with reference to FIG. 7, the reception of the pilot signal by the receiver will be mainly discussed and the reception of the data signal will not be dealt with in detail since the latter has no direct relation to the present invention. First, in step 711, the receiver receives the pilot symbol in a pilot symbol interval. Here, although not shown in FIG. 7, when the transmitter has transmitted the pilot symbol in consideration of the frequency offset as described above in relation to FIG. 6, the receiver determines the signal reception location corresponding to the frequency offset before receiving the pilot symbol. In step 713, the receiver demodulates the pilot symbol according to a demodulation scheme corresponding to the modulation scheme employed by the transmitter. In step 715, the receiver performs a correlation on the demodulated pilot symbol for block codes corresponding to all the cell IDs which can be identified by the receiver and the Walsh codes corresponding to said all cell IDs, detects a cell ID and a sector ID having a maximum correlation value as the cell ID and the sector ID of the transmitter, and then ends the process.

Hereinafter, the mapping relation between sub-carriers and pilot symbols when an IFFT is performed in an OFDM communication system according to an embodiment of the present invention will be described with reference to FIG. 8.

Figure 8:
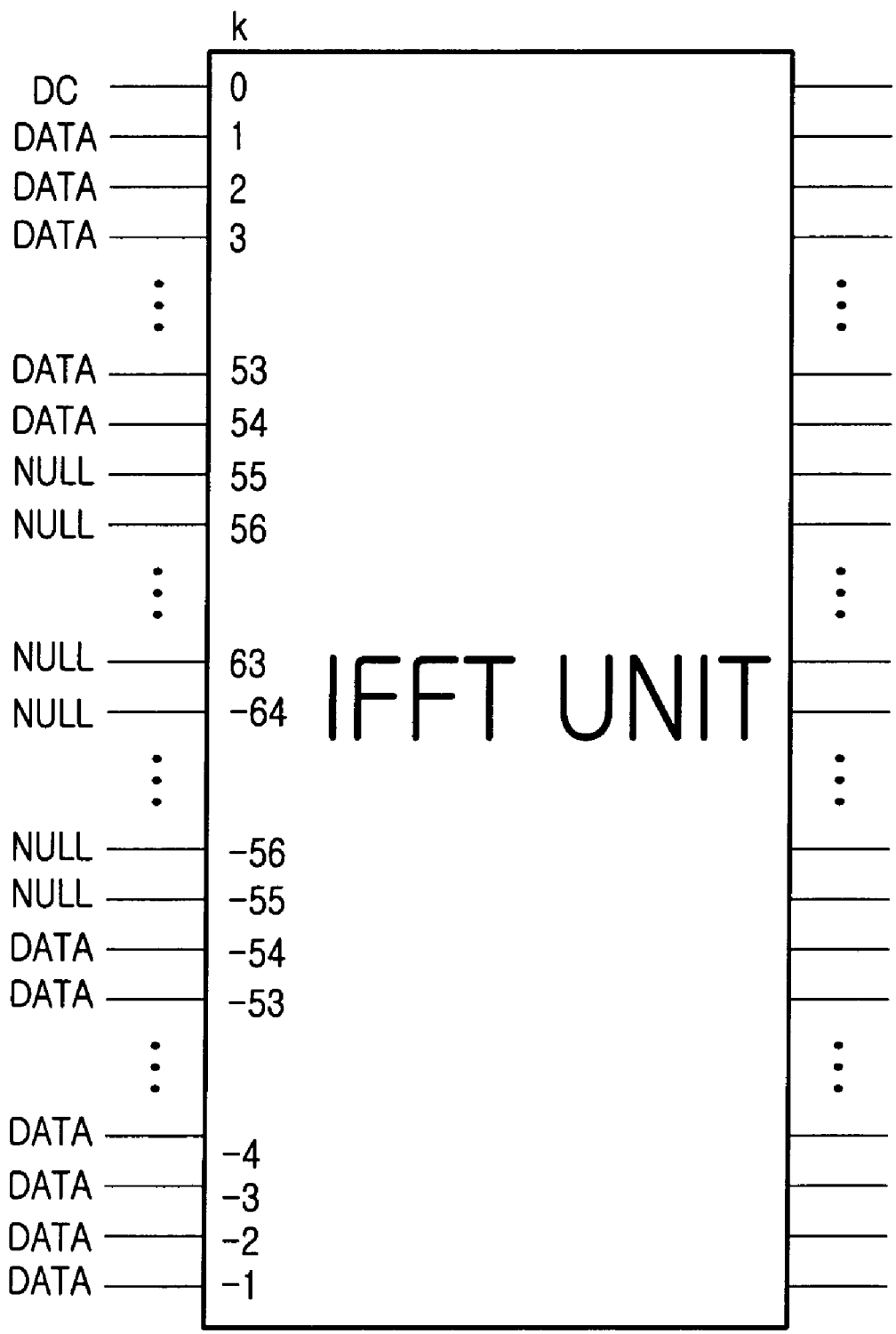
FIG. 8 is a schematic view for illustrating a mapping relation between sub-carriers and pilot symbols when an IFFT is performed in an OFDM communication system according to an embodiment of the present invention.

FIG. 8 is based on an assumption that the number of all sub-carriers in the OFDM communication system is 128 and the number of actually used sub-carriers from among the 128 sub-carriers is 108. In other words, 108 sub-carriers including 54 sub-carriers from a sub-carrier of No.−54 to a sub-carrier of No.−1 and 54 sub-carriers from a sub-carrier of No. 1 to a sub-carrier of No. 54 are actually used from among the 128 sub-carriers in the system. In FIG. 8, the number of each input port of the IFFT unit (that is, k) denotes an index of each sub-carrier. The sub-carrier of No. 0 represents a reference point for the pilot symbols in the time domain, that is, a DC component in the time domain after the IFFT is performed. Therefore, a null data is inserted into the sub-carrier of No. 0.

Further, the null data is also inserted into the other sub-carriers than the 108 actually used sub-carriers and the sub-carrier of No. 0. That is, the null data is inserted also into the sub-carriers from the sub-carrier of No.−55 to the sub-carrier of No.−64 and the sub-carriers from the sub-carrier of No. 55 to the sub-carrier of No. 63.

Here, the reason why the null data is inserted into the sub-carriers from the sub-carrier of No.−55 to the sub-carrier of No.−64 and the sub-carriers from the sub-carrier of No. 55 to the sub-carrier of No. 63 is that the sub-carriers from the sub-carrier of No.−55 to the sub-carrier of No.−64 and the sub-carriers from the sub-carrier of No. 55 to the sub-carrier of No. 63 are adjacent to the frequency bands of other systems. By inserting null data into such sub-carriers, it is possible to minimize interference with another system using a neighboring frequency band. Therefore, when the pilot symbol of the frequency domain has been input to the IFFT unit, the IFFT unit maps the input pilot symbol of the frequency domain to corresponding sub-carriers, performs an IFFT operation on the mapped symbol, and then outputs a resultant pilot symbol of the time domain.

Figure 9:
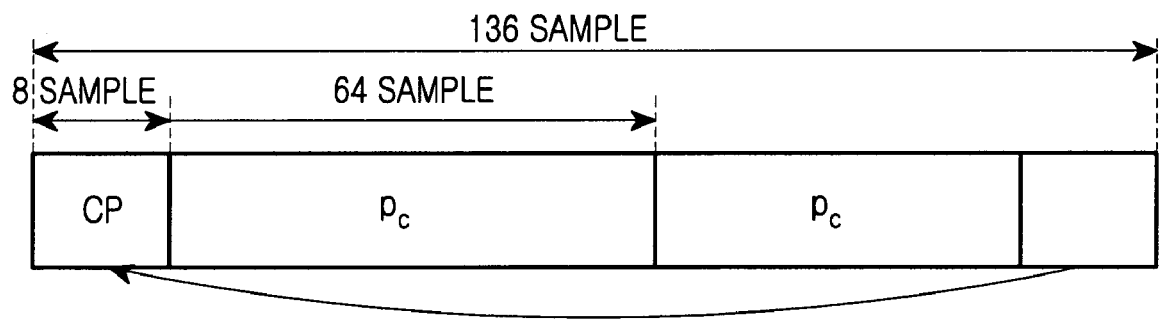
FIG. 9 illustrates a frame structure of a pilot symbol in the time domain of an OFDM communication system according to an embodiment of the present invention.

FIG. 9 illustrates a frame structure of a pilot symbol in the time domain of an OFDM communication system according to an embodiment of the present invention.

Referring to FIG. 9, the pilot symbol includes twice repeated symbols each having the same length of $p_c$ (i.e. the same length of $N_{FFT}/2$) and a guard interval signal added to the front end of the twice repeated symbols. The guard interval signal is inserted according to the Cyclic Prefix (CP) scheme as described above in consideration of the characteristics of the OFDM communication system. Here, $N_{FFT}$ denotes the number of points of the IFFT/FFT operation used in the OFDM communication system. That is, as described above with reference to FIG. 8, the number of points of the IFFT/FFT operation used in the OFDM communication system is 128, and the length of $p_c$ is 64.

Figure 10:
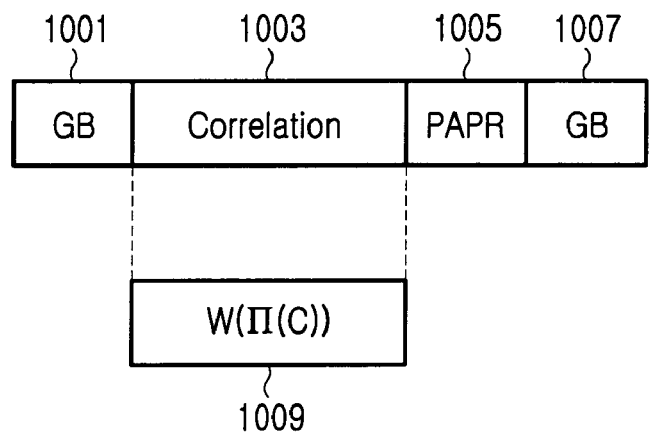
FIG. 10 illustrates a structure of a pilot symbol in the frequency domain of an OFDM communication system according to an embodiment of the present invention.

FIG. 10 illustrates a structure of a pilot symbol in the frequency domain of an OFDM communication system according to an embodiment of the present invention.

Referring to FIG. 10, the sub-carrier interval except for the guard bands (i.e. guard intervals) 1001 and 1007 includes a correlation interval 1003 and a PAPR interval 1005. The correlation interval 1003 includes sequences having large correlation values (i.e. sequences generated by combining the block codes and the Walsh codes) and the PAPR interval 1005 includes PAPR reduction sequences corresponding to the sequences in the correlation interval 1003.

As shown in FIG. 10, the pilot symbol includes a first part sequence (i.e. a sequence corresponding to the correlation interval 1003) and a second part sequence (i.e. a sequence corresponding to the PAPR interval 1005). Hereinafter, the sequence inserted in the correlation interval 1003 (i.e. the sequence output from the adder 207 in FIG. 2) will be referred to as "correlation sequence". The calculation of the correlation values as described above with reference to FIG. 5 is performed only for the correlation interval 1003.

In FIG. 10, C denotes a block code having a length of 48 and Π(•) denotes an interleaving scheme having a length of 48 by which the block code having a length of 48 is interleaved. Further, W(•) denotes a Walsh code masking.

The pilot symbol is generated by frequency domain sequences as expressed by Equation (2) below.

$$P_{ID_{cell,S}}[k] = \qquad (2)$$

-continued $$\begin{cases} \sqrt{2}\,(1-2q_{ID_{cell},S}[m]), & k=2m-\dfrac{N_{used}}{2}, \\ & m=0,1,\ldots,\dfrac{N_{used}}{4}-1 \\ \sqrt{2}\,(1-2q_{ID_{cell},S}[m-1]), & k=2m-\dfrac{N_{used}}{2}, \\ & m=\dfrac{N_{used}}{4}+1,\dfrac{N_{used}}{4}+2,\ldots,\dfrac{N_{used}}{2} \\ 0, & \text{otherwise} \end{cases}$$

$$ID_{cell} \in \{0,1,\ldots,126\},\ s \in \{0,1,\ldots,7\},$$
$$k \in \{-N_{FFT}/2,\ -N_{FFT}/2+1,\ \ldots,\ N_{FFT}/2-1\}.$$

In Equation (2), $ID_{cell}$ denotes a cell ID (i.e. ID of a BS), s denotes a sector ID, k denotes a sub-carrier index, and $N_{used}$ denotes the number of sub-carriers actually used in the OFDM communication system (i.e. the number of sub-carriers except for the DC component and the guard interval component). In the present embodiment, it is assumed that the pilot symbols of all BSs and sectors use the same frequency offset. According to the frequency domain sequence $P_{ID_{cell},S}[k]$ as shown in Equation (2), the values in the form as shown in Equation (2) are assigned only to sub-carriers having an even number of indices and a value of 0 is unconditionally assigned to all sub-carriers having an odd number of indices. Therefore, when the IFFT operation has been performed, the same sequence is repeated twice in the time domain.

Further, in Equation (2), $\sqrt{2}$ is a weight value in order to enable the pilot symbol to have the same transmit power level as the transmit power level of the data symbol transmitted in an interval (i.e. data symbol interval) other than the pilot symbol interval. $q_{ID_{cell},S}[m]$ is defined by Equation (3) below.

$$q_{ID_{cell},S}[m] = \begin{cases} R\!\left(8*\left\lfloor \dfrac{m}{9} \right\rfloor + m \bmod 9\right), & \text{where } m \bmod 9 = 0,1,\ldots,7 \\ & m=0,1,\ldots,53 \\ T\!\left(\left\lfloor \dfrac{m}{9} \right\rfloor\right), & \text{where } m \bmod 9 = 8 \end{cases} \quad (3)$$

In Equation (3), $$\left\lfloor \frac{m}{9} \right\rfloor$$

represents a maximum integer not larger than $$\frac{m}{9}.$$

In Equation (3), R(r) can be expressed by Equation (4) below.

$$R(r) = w^s_{r \bmod 8} \oplus b_{ID_{cell}+1} g_{\Pi(r)}, \quad (4)$$

$$r = 8*\left\lfloor \frac{m}{9} \right\rfloor + m \bmod 9 = 0,1,\ldots,47$$

In Equation (4), $W^s_{r\ mod\ 8}$ represents the repetition of the Walsh codes having a length of 8 and a sector ID corresponding to s. Further, a certain decimal number k ($1 \leq k \leq 127$) is expressed as a binary number of $b_6 b_5 b_4 b_3 b_2 b_1 b_0$, wherein $b_k$ represents a row vector ($b_k = \{b_6 b_5 b_4 b_3 b_2 b_1 b_0\}$) when $b_6$ is the Most Significant Bit (MSB) and $b_0$ is the Least Significant Bit (LSB). Further, in equation (4), $g_u$ ($0 \leq u \leq 47$) represents the u-th column vector of the block code generator matrix G. The block code generator matrix G can be expressed by Equation (5) below.

$$G = [g_0 g_1 \ldots g_{47}] = \quad (5)$$

$$\begin{bmatrix} 0101010101010101 & 0000010101100010 & 0000000011111111 \\ 0011001100110011 & 0000100010001000 & 0000000101010110 \\ 0000111100001111 & 0101010101010101 & 0000010101100011 \\ 0000000011111111 & 0011001100110011 & 0101010101010101 \\ 0000001101010110 & 0000011110001111 & 0101010101010101 \\ 0000010101100011 & 0000000011111111 & 0011001100110011 \\ 0001000100010001 & 0000001101010110 & 0000011110001111 \end{bmatrix}$$

As noted from Equation (5), the block code generator matrix G includes three sub-blocks each having a length of 16, in each of which the Walsh bases are marked by the dotted lines. The Walsh bases and mask sequences in Equation (5) can be expressed as Table 1.

TABLE 1

| Walsh basis | 0101010101010101 |
| | 0011001100110011 |
| | 0000111100001111 |
| | 0000000011111111 |
| Mask$_{(1)}$ | 0000001101010110 |
| Mask$_{(2)}$ | 0000010101100011 |
| Mask$_{(3)}$ | 0001000100010001 |

Meanwhile, in Equation (5), $b_k g_u$ represents a matrix product between a (1×7) row vector and (7×1) column vector and has a scalar value which is calculated through operations including modulo 2 addition and multiplication. In Equation (5), $\Pi(r)$ ($0 \leq r \leq 47$) represents the interleaving scheme of the interleaver 203 as described above with reference to FIG. 2. The interleaving scheme can be expressed as Table 2 below.

TABLE 2

| $\Pi(r)$ | 9, 7, 14, 15, 10, 1, 2, 5, 3, 8, 0, 4, 13, 11, 6, 12, 27, 29, 21, 18, 16, 25, 23, 17, 24, 19, 28, 31, 26, 20, 30, 22, 38, 47, 41, 42, 37, 46, 39, 45, 32, 34, 40, 33, 35, 43, 36, 44 |
|---|---|

That is to say, the interleaving scheme $\Pi(r)$ uses permutation of the locations of 48 elements in the block code having a length of 48 according to the order shown in Table 2. In Table 2, each number indicates the index of a sub-carrier to which an element of the block code is one-to-one mapped.

It is noted from the interleaving scheme shown in Table 2 that an interleaving scheme having a length of 16 is concatenated three times as shown in Table 3 below.

TABLE 3

| 1$^{st}$ interleaving scheme | 9, 7, 14, 15, 10, 12, 5, 3, 8, 0, 4, 13, 11, 6, 12 |
| 2$^{nd}$ interleaving scheme | 11, 13, 5, 20, 9, 7, 18, 3, 1, 2, 1, 5, 10, 4, 14, 6 |
| 3$^{rd}$ interleaving scheme | 6, 15, 9, 10, 5, 14, 7, 13, 0, 2, 8, 1, 3, 11, 4, 12 |

In Table 3, each number indicates the index of a sub-carrier to which each element of the three sub-codes is one-to-one mapped.

Further, in Equation (3), the value of the sequence $$T(s) \left(s = \left\lfloor \frac{m}{9} \right\rfloor = 0, 1, \ldots, 5\right)$$

is determined by the PAPR reduction sequence which minimizes the PAPR of the pilot symbol. Table 4 shows PAPR reduction sequences corresponding to the cell IDs and sector IDs and PAPRs of pilot symbols corresponding to the cell IDs and sector IDs.

Table 4

TABLE 4

| IDcell | S | PAPR reduction sequence | PAPR(dB) |
|---|---|---|---|
| 0 | 0 | 001100 | 6.18158 |
| 0 | 1 | 100110 | 6.30181 |
| 0 | 2 | 101011 | 4.35385 |
| 0 | 3 | 000101 | 5.33634 |
| 0 | 4 | 110111 | 5.06097 |
| 0 | 5 | 110111 | 6.58247 |
| 0 | 6 | 000100 | 5.3471 |
| 0 | 7 | 101110 | 7.09793 |
| 1 | 0 | 010000 | 5.75956 |
| 1 | 1 | 100011 | 5.67524 |
| 1 | 2 | 000000 | 5.28916 |
| 1 | 3 | 111010 | 5.68051 |
| 1 | 4 | 010011 | 6.70095 |
| 1 | 5 | 010011 | 5.61945 |
| 1 | 6 | 001100 | 5.46733 |
| 1 | 7 | 101111 | 5.92966 |

The method of transmitting/receiving pilot signals as described above may be also employed in an OFDM communication system using multiple antennas and requiring no sector differentiation. For example, when a transmitter of such an OFDM communication system uses an $N_t$ number of transmit antennas, the pilot symbols transmitted through each of the $N_t$ transmit antennas can be expressed by Equation (6) below.

$$P_{ID_{cell},n}[k] = \begin{cases} 1 - 2q_{ID_{cell}}[m], & k = N_t m - \frac{N_{used}}{2} + n, \\ & m = 0, 1, \ldots, \frac{N_{used}}{N_t} - 1 \\ 0, & \text{otherwise} \end{cases} \quad (6)$$

$ID_{cell} \in \{0, 1, \ldots, 126\}, n = 0, 1, \ldots N_t - 1,$ $k \in \left\{-\frac{N_{FFT}}{2}, -\frac{N_{FFT}}{2} + 1, \ldots, \frac{N_{FFT}}{2} - 1\right\}$ In Equation (6), n denotes the number of the transmit antennas and k denotes a sub-carrier index. Further, $q_{ID_{cell}}[m]$ in Equation (6) can be defined as Equation (7) below.

$$q_{ID_{cell}}[m] = \begin{cases} R\left(8 * \left\lfloor \frac{m}{9} \right\rfloor + m \bmod 9\right), & \text{where } m \bmod 9 = 0, 1, \ldots, 7 \\ & m = 0, 1, \ldots, \frac{N_{used}}{N_t} - 1 \\ T\left(\left\lfloor \frac{m}{9} \right\rfloor\right), & \text{where } m \bmod 9 = 8 \end{cases} \quad (7)$$

In Equation (7), each of the two sequences R(r) and T(k) is differently defined according to the number $N_t$ of the transmit antennas and the number of points of the FFT operation used in the OFDM communication system, so that the sequence $q_{ID_{cell}}[m]$ also is differently defined according to the number $N_t$ of the transmit antennas and the number of points of the FFT operation used in the OFDM communication system.

Hereinafter, the above-mentioned R(r), T(k), and $q_{ID_{cell}}[m]$ according to the number $N_t$ of the transmit antennas and the number of points of the FFT operation used in the OFDM communication system will be described.

First, when the number $N_t$ of the transmit antennas is two and the number of the FFT operation points used in the OFDM communication system is 128 (i.e. $N_t=2$, $N_{FFT}=128$), R(r) can be expressed by Equation (8) below.

$$R(r) = B_{ID_{cell}+1} g_{\Pi(r)}, r = 8 * \left\lfloor \frac{m}{9} \right\rfloor + m \bmod 9 = 0, 1, \ldots, 47 \quad (8)$$

In Equation (8), the block code generator matrix G is the same as that in Equation (4) and the interleaving scheme can be expressed by Table 5 below.

TABLE 5

| Π(l) | 5, 6, 4, 10, 7, 2, 14, 0, 8, 11, 13, 12, 3, 15, 1, 9, 26, 29, 19, 27, 31, 17, 20, 16, 23, 28, 24, 21, 18, 30, 25, 22, 43, 46, 34, 47, 44, 41, 37, 36, 39, 38, 35, 33, 32, 45, 40, 42 |
|---|---|

Meanwhile, T(k) in Equation (7) has values as expressed by the hexadecimal numbers shown in Table 6 below and $q_{ID_{cell}}[m]$ can be expressed by the hexadecimal numbers as shown in Table 7.

TABLE 6

| ID cell | sequence | papr |
|---|---|---|
| 0 | 1 1 1 0 1 1 | 6.67057 |
| 1 | 0 0 1 1 0 0 | 5.883 |
| 2 | 1 1 1 1 1 1 | 4.95588 |
| 3 | 0 1 1 0 0 1 | 4.92942 |
| 4 | 1 0 0 1 0 0 | 4.84232 |
| 5 | 0 1 0 1 0 0 | 5.97707 |
| 6 | 0 0 0 0 1 1 | 5.2818 |
| 7 | 0 1 1 1 0 1 | 4.62935 |
| 8 | 1 1 1 1 0 1 | 4.80191 |
| 9 | 0 1 1 1 1 0 | 4.62839 |
| 10 | 1 0 0 0 0 0 | 4.93818 |
| 11 | 0 0 0 0 1 0 | 4.62239 |
| 12 | 1 1 0 0 1 1 | 6.23206 |
| 13 | 0 0 0 0 0 1 | 4.76556 |
| 14 | 1 1 0 1 1 1 | 5.21957 |
| 15 | 0 1 1 0 0 0 | 5.73261 |
| 16 | 0 0 1 1 1 0 | 4.9981 |
| 17 | 0 1 1 0 0 0 | 5.23977 |
| 18 | 1 1 1 1 1 0 | 5.59862 |
| 19 | 0 1 1 1 0 1 | 6.75846 |
| 20 | 0 0 1 1 1 1 | 4.86729 |
| 21 | 1 1 0 0 0 0 | 5.57405 |
| 22 | 1 0 1 0 0 1 | 4.82303 |
| 23 | 0 1 0 1 0 1 | 4.54948 |
| 24 | 0 1 1 1 0 1 | 5.45765 |
| 25 | 1 1 0 0 0 1 | 4.91648 |
| 26 | 1 0 0 1 0 1 | 3.95813 |
| 27 | 1 0 0 0 0 1 | 6.03433 |
| 28 | 1 1 0 0 0 1 | 4.50629 |
| 29 | 0 1 0 0 0 1 | 4.80454 |
| 30 | 1 0 1 1 1 1 | 4.94614 |
| 31 | 1 0 1 1 0 0 | 4.54236 |
| 32 | 0 1 1 0 0 0 | 3.86311 |
| 33 | 0 1 1 0 0 0 | 5.18297 |
| 34 | 1 1 0 1 0 1 | 5.59137 |
| 35 | 1 0 0 1 0 0 | 5.51632 |
| 36 | 1 1 0 0 1 0 | 4.64969 |
| 37 | 1 1 1 0 0 0 | 5.59862 |

TABLE 6-continued

| ID cell | sequence | papr |
|---|---|---|
| 38 | 0 0 0 0 1 1 | 6.56393 |
| 39 | 1 0 1 0 0 0 | 6.63257 |
| 40 | 0 0 1 0 1 1 | 6.30937 |
| 41 | 0 0 0 1 0 1 | 5.76388 |
| 42 | 0 0 0 1 1 1 | 5.17733 |
| 43 | 1 0 0 1 1 0 | 6.50695 |
| 44 | 0 0 0 0 0 1 | 5.58222 |
| 45 | 1 1 1 0 1 1 | 5.19814 |
| 46 | 1 0 0 1 1 0 | 5.50865 |
| 47 | 1 0 0 0 0 0 | 5.40503 |
| 48 | 1 0 0 1 0 0 | 4.48416 |
| 49 | 0 1 0 0 1 1 | 5.59962 |
| 50 | 0 1 0 1 0 0 | 4.76603 |
| 51 | 0 1 1 1 0 1 | 4.87033 |
| 52 | 1 1 1 0 0 1 | 5.60052 |
| 53 | 1 0 1 0 0 1 | 4.18939 |
| 54 | 1 1 1 1 0 1 | 5.00411 |
| 55 | 1 1 1 1 0 0 | 4.31284 |
| 56 | 0 0 0 0 1 0 | 5.32296 |
| 57 | 0 0 0 0 1 0 | 5.39012 |
| 58 | 0 1 1 0 0 1 | 6.0232 |
| 59 | 1 1 0 1 0 0 | 5.27241 |
| 60 | 0 0 1 0 1 0 | 5.26582 |
| 61 | 1 0 0 0 0 1 | 5.47146 |
| 62 | 0 0 0 0 1 0 | 5.43249 |
| 63 | 1 0 0 1 1 1 | 4.69906 |
| 64 | 1 1 1 0 0 0 | 5.29969 |
| 65 | 1 0 1 0 1 1 | 6.66865 |
| 66 | 1 0 1 0 1 1 | 5.90593 |
| 67 | 0 1 1 1 0 0 | 5.13642 |
| 68 | 0 0 1 0 0 0 | 4.9337 |
| 69 | 0 1 1 0 1 0 | 5.13715 |
| 70 | 1 1 1 1 0 0 | 5.05877 |
| 71 | 1 0 0 1 0 0 | 5.42538 |
| 72 | 1 1 1 0 1 0 | 5.21428 |
| 73 | 1 0 1 1 0 1 | 4.27288 |
| 74 | 0 1 0 0 0 1 | 4.63478 |
| 75 | 1 0 1 0 0 1 | 5.47216 |
| 76 | 1 0 1 0 1 0 | 6.48514 |
| 77 | 1 1 0 0 0 0 | 5.95897 |
| 78 | 0 0 0 0 0 1 | 5.59862 |
| 79 | 0 1 0 0 0 0 | 5.38694 |
| 80 | 0 0 0 0 1 0 | 4.79522 |
| 81 | 0 0 1 1 1 0 | 5.03585 |
| 82 | 1 1 0 0 1 1 | 6.41538 |
| 83 | 0 1 1 0 0 1 | 5.92329 |
| 84 | 1 0 1 1 1 0 | 5.24541 |
| 85 | 0 0 0 0 0 0 | 6.41868 |
| 86 | 1 0 1 0 1 1 | 5.47231 |
| 87 | 0 1 0 1 1 1 | 4.27052 |
| 88 | 0 0 0 1 0 1 | 4.98455 |
| 89 | 0 0 0 1 0 1 | 4.85573 |
| 90 | 1 0 1 1 0 0 | 4.66224 |
| 91 | 0 1 1 0 0 1 | 5.59862 |
| 92 | 0 1 0 1 0 1 | 5.13782 |
| 93 | 1 1 0 0 1 0 | 5.73533 |
| 94 | 0 1 1 1 1 1 | 6.31115 |
| 95 | 0 1 1 1 0 1 | 4.76096 |
| 96 | 0 1 0 1 1 1 | 4.43229 |
| 97 | 1 0 0 1 1 1 | 4.52351 |
| 98 | 1 0 0 1 0 0 | 4.16266 |
| 99 | 1 1 1 0 1 0 | 5.72573 |
| 100 | 0 1 0 1 0 0 | 4.34746 |
| 101 | 1 0 0 1 0 0 | 6.81937 |
| 102 | 0 1 0 1 1 1 | 5.86829 |
| 103 | 0 1 0 1 1 0 | 5.22038 |
| 104 | 1 0 0 0 0 0 | 4.8724 |
| 105 | 0 1 1 0 1 1 | 6.7858 |
| 106 | 1 0 0 0 1 0 | 5.75267 |
| 107 | 1 1 0 0 1 1 | 5.1796 |
| 108 | 1 1 1 0 0 0 | 6.00083 |
| 109 | 1 0 1 0 0 1 | 4.6724 |
| 110 | 1 0 0 1 0 1 | 4.8345 |
| 111 | 0 0 1 1 1 0 | 4.05646 |
| 112 | 0 0 1 1 1 1 | 5.6271 |
| 113 | 0 1 1 1 1 1 | 5.59862 |
| 114 | 1 1 0 0 1 0 | 4.90494 |

TABLE 6-continued

| ID cell | sequence | papr |
|---|---|---|
| 115 | 0 0 1 1 0 0 | 5.95286 |
| 116 | 0 1 1 0 0 1 | 5.99303 |
| 117 | 0 1 0 0 1 1 | 3.97648 |
| 118 | 0 1 0 1 0 0 | 5.71222 |
| 119 | 0 0 0 0 1 1 | 4.81998 |
| 120 | 1 1 1 1 1 0 | 4.67909 |
| 121 | 1 0 0 1 1 0 | 5.53328 |
| 122 | 0 0 0 1 1 0 | 5.20303 |
| 123 | 0 1 1 0 0 0 | 5.00673 |
| 124 | 1 0 1 1 1 0 | 4.57847 |
| 125 | 0 1 1 1 0 0 | 4.79082 |
| 126 | 1 1 0 1 0 0 | 4.91901 |

TABLE 7

| ID cell | sequence | papr |
|---|---|---|
| 0 | 88B7E232CDC83C | 6.67057 |
| 1 | 5E260E301C4620 | 5.883 |
| 2 | D691EC22D18E1C | 4.95588 |
| 3 | EA1A5F3245640C | 4.92942 |
| 4 | 62ADBD0098A430 | 4.84232 |
| 5 | B43C5102592228 | 5.97707 |
| 6 | 3C0BB31084EA14 | 5.2818 |
| 7 | 127AEE31B90504 | 4.62935 |
| 8 | 9ACD4C2374C53C | 4.80191 |
| 9 | 4C5CE021B54B20 | 4.62839 |
| 10 | C4EB0213688318 | 4.93818 |
| 11 | F860B103EC6908 | 4.62239 |
| 12 | 70D7531121A934 | 6.23206 |
| 13 | A646BF13E0272C | 4.76556 |
| 14 | 2EF15D013DEF14 | 5.21957 |
| 15 | 4A30D2BAA965A0 | 6.73261 |
| 16 | C20730A874AD98 | 4.9981 |
| 17 | 1416DCAAA52380 | 5.23977 |
| 18 | 9CA17EB878EBB8 | 5.59862 |
| 19 | A02ACDA8FC01AC | 6.75846 |
| 20 | 281D2FBA31C994 | 4.86729 |
| 21 | FE8CC398E04788 | 5.57405 |
| 22 | 76BB21AA2D87B4 | 4.82303 |
| 23 | 584A7C8B1060A4 | 4.54948 |
| 24 | D07DDEB9DDA09C | 5.45765 |
| 25 | 06EC729B0C2684 | 4.91648 |
| 26 | 8EDB9089D1E6BC | 3.95813 |
| 27 | B2D023994504AC | 6.03433 |
| 28 | 3AE7C18B88C494 | 4.50629 |
| 29 | EC766D8949428C | 4.80454 |
| 30 | 64C18FBB948AB4 | 4.94614 |
| 31 | 9A82B62CDF0708 | 4.54236 |
| 32 | 1235543E02C730 | 3.86311 |
| 33 | C424F83CC34128 | 5.18297 |
| 34 | 4C935A0E1E8114 | 5.59137 |
| 35 | 7098A91E9A6300 | 5.51632 |
| 36 | F8AF4B0C47AB38 | 4.64969 |
| 37 | 2EBEE72E862520 | 5.59862 |
| 38 | A609051C4BED1C | 6.56393 |
| 39 | 88F8183D660208 | 6.63257 |
| 40 | 004FBA2FABCA34 | 6.30837 |
| 41 | D65E160D7A442C | 5.76388 |
| 42 | 5E69B41FB78C14 | 5.17733 |
| 43 | 62E2070F336E00 | 6.50695 |
| 44 | EA55A51DEEA63C | 5.58222 |
| 45 | 3CC4493F2F2824 | 5.19814 |
| 46 | B4F3AB0DF2E818 | 5.50865 |
| 47 | D0B224966662A8 | 5.40503 |
| 48 | 58858684BBA290 | 4.48416 |
| 49 | 8E146A866A2C8C | 5.59862 |
| 50 | 0623C894B7E4B0 | 4.76609 |
| 51 | 3A287BA43306A4 | 4.87033 |
| 52 | B29FD9B6EEC69C | 5.60052 |
| 53 | 648E35B42F4084 | 4.18939 |
| 54 | ECB9D7A6F280BC | 5.00411 |
| 55 | C2C8CAA7DF67A8 | 4.91284 |
| 56 | 4A7F289502AF90 | 6.92296 |

TABLE 7-continued

| ID cell | sequence | papr |
|---|---|---|
| 57 | 9C6E8497C32988 | 5.39012 |
| 58 | 145966A50EE1B4 | 6.0232 |
| 59 | 28D2D5959A03A0 | 6.27241 |
| 60 | A06537A747CB98 | 5.26582 |
| 61 | 76F49B85864584 | 5.47146 |
| 62 | FE4339974B8DB8 | 6.43249 |
| 63 | 08A61410F5BE24 | 4.69906 |
| 64 | 8091F622287618 | 5.28969 |
| 65 | 56801A20E9F804 | 6.66865 |
| 66 | DEB7B83224383C | 5.90593 |
| 67 | E23C4B22B0D228 | 6.13642 |
| 68 | 6A0BA9306D1210 | 4.9337 |
| 69 | BC1A4532AC9C08 | 5.13715 |
| 70 | 34ADE720715430 | 5.05877 |
| 71 | 1ADCBA015CB320 | 5.42538 |
| 72 | 92EB5833817B18 | 5.21428 |
| 73 | 44FAB43150F504 | 4.27288 |
| 74 | CC4D56038D353C | 4.63478 |
| 75 | F0C6A53309D72C | 5.47216 |
| 76 | 78F10721C41710 | 6.49514 |
| 77 | AEE0EB03059108 | 5.35897 |
| 78 | 26570911C85134 | 5.59862 |
| 79 | 4216C68A4CD380 | 5.36634 |
| 80 | CA212498811BB8 | 4.79522 |
| 81 | 1C3088BA509DA0 | 5.03585 |
| 82 | 94876A888D5D9C | 6.41538 |
| 83 | A80CD9B809B78C | 5.92329 |
| 84 | 20BB3BAAD47FB0 | 5.24541 |
| 85 | F62A978805F1AC | 6.41868 |
| 86 | 7E9D35BAC83994 | 5.47231 |
| 87 | 506C689BF5DE84 | 4.27052 |
| 88 | D85B8A893816BC | 4.98455 |
| 89 | 0E4A268BF990A4 | 4.85573 |
| 90 | 86FD84B9345098 | 4.66224 |
| 91 | BA7677A9A0B28C | 5.59862 |
| 92 | 3241D59B7D72B4 | 5.13782 |
| 93 | E4D07999ACF4A8 | 5.73533 |
| 94 | 6C67DBAB713C94 | 6.31115 |
| 95 | 9224E23C3AB12C | 4.76096 |
| 96 | 1A13400EF77914 | 4.43229 |
| 97 | CC82AC0C36FF0C | 4.52351 |
| 98 | 44B50E1EFB3730 | 4.16266 |
| 99 | 78BEFD2E6FDD20 | 5.72573 |
| 100 | F0095F1CB21518 | 4.34746 |
| 101 | 2698B31E739300 | 6.81937 |
| 102 | AE2F510CBE5B3C | 5.86829 |
| 103 | 805E4C0D93BC28 | 5.22038 |
| 104 | 08E9AE1F4E7410 | 4.8724 |
| 105 | DE78423D8FFA0C | 6.7858 |
| 106 | 56CFA00F423A30 | 5.75267 |
| 107 | 6AC4531FC6D824 | 5.1796 |
| 108 | E2F3F12D0B1018 | 6.00083 |
| 109 | 34E21D2FCA9604 | 4.6724 |
| 110 | BCD5BF1D175638 | 4.8345 |
| 111 | D81430A693DC88 | 4.05646 |
| 112 | 502392B45E1CB4 | 5.6271 |
| 113 | 86327EB69F9AAC | 5.59862 |
| 114 | 0E85DC84425A90 | 4.90494 |
| 115 | 320E2FB4D6B080 | 5.95286 |
| 116 | BA39CDA60B70BC | 5.99303 |
| 117 | 6C286184CAFEA4 | 3.97648 |
| 118 | E41FC396173698 | 5.71222 |
| 119 | CA6E9E972AD98C | 4.61398 |
| 120 | 42D97CA5F719B0 | 4.67909 |
| 121 | 94C89087369FA8 | 5.53328 |
| 122 | 1C7F3295FB5F90 | 5.20303 |
| 123 | 2074C1A56FB580 | 5.00679 |
| 124 | A8C323B7B27DB8 | 4.57847 |
| 125 | 7E52CFB573F3A0 | 4.79082 |
| 126 | F6E56D87BE3398 | 4.91901 |

Next, when the number $N_t$ of the transmit antennas is three and the number of the FFT operation points used in the OFDM communication system is 128 (i.e. $N_t=3$, $N_{FFT}=128$), R(r) can be expressed by Equation (9) below.

$$R(r) = B_{IDcell+1} g_{\Pi(r)}, r = 8 * \left\lfloor \frac{m}{9} \right\rfloor + m \bmod 9 = 0, 1, \ldots, 31 \quad (9)$$

In Equation (9), the block code generator matrix G is expressed as shown by Equation (10) below and the interleaving scheme can be expressed by Table 8 below.

$$G = [g_0 g_1 \ldots g_{31}] \quad (10)$$

$$= \begin{bmatrix} 01010101010101010000010101100011 \\ 00110011001100110001000100010001 \\ 00001111000011110101010101010101 \\ 00000000111111110011001100110011 \\ 00000011010101100000111100001111 \\ 00000101011000110000000011111111 \\ 00010001000100010000001101010110 \end{bmatrix}$$

TABLE 8

| $\Pi(l)$ | 11, 4, 12, 15, 0, 13, 5, 6, 14, 8, 10, 9, 1, 3, 2, 7, 16, 20, 31, 26, 22, 30, 27, 23, 19, 18, 17, 25, 21, 29, 24, 28 |
|---|---|

Meanwhile, T(k) in Equation (7) has values as expressed by the hexadecimal numbers shown in Table 9 below and $q_{ID_{cell}}[m]$ can be expressed by the hexadecimal numbers as shown in Table 10.

TABLE 9

| ID cell | sequence | papr |
|---|---|---|
| 0 | 0 0 1 1 | 4.49505 |
| 1 | 0 1 1 0 | 4.11454 |
| 2 | 0 1 1 0 | 6.0206 |
| 3 | 1 1 0 0 | 5.06896 |
| 4 | 0 0 0 0 | 4.51602 |
| 5 | 1 0 1 0 | 4.96176 |
| 6 | 0 0 0 1 | 4.50134 |
| 7 | 0 1 0 0 | 5.29586 |
| 8 | 1 1 1 1 | 5.37387 |
| 9 | 1 0 0 0 | 4.6668 |
| 10 | 0 1 1 0 | 5.09482 |
| 11 | 0 0 0 1 | 6.11344 |
| 12 | 0 0 0 0 | 5.71868 |
| 13 | 0 0 0 0 | 4.12233 |
| 14 | 0 1 1 1 | 4.44864 |
| 15 | 1 0 1 0 | 4.42172 |
| 16 | 1 0 0 0 | 4.43697 |
| 17 | 0 1 1 0 | 5.96559 |
| 18 | 0 0 1 0 | 5.31882 |
| 19 | 1 1 1 0 | 5.1578 |
| 20 | 0 0 1 1 | 4.18834 |
| 21 | 1 1 0 0 | 5.74259 |
| 22 | 1 0 1 0 | 6.10238 |
| 23 | 1 1 1 0 | 4.50069 |
| 24 | 1 0 0 1 | 4.38448 |
| 25 | 1 1 0 1 | 4.33171 |
| 26 | 1 0 0 1 | 5.31759 |
| 27 | 1 1 1 0 | 6.33599 |
| 28 | 1 1 0 1 | 4.55537 |
| 29 | 0 1 0 0 | 4.89809 |
| 30 | 1 0 1 1 | 4.45342 |
| 31 | 1 0 1 0 | 5.12448 |
| 32 | 1 0 0 0 | 4.43697 |
| 33 | 0 0 0 1 | 4.90907 |
| 34 | 1 0 0 1 | 3.9985 |
| 35 | 1 0 1 0 | 6.0206 |
| 36 | 0 0 0 1 | 5.39301 |
| 37 | 1 0 0 0 | 3.66487 |

TABLE 9-continued

| ID cell | sequence | papr |
|---|---|---|
| 38 | 1 0 1 1 | 4.92205 |
| 39 | 0 1 1 1 | 5.53843 |
| 40 | 0 1 1 1 | 5.26898 |
| 41 | 1 1 0 1 | 5.16959 |
| 42 | 0 1 1 0 | 5.34282 |
| 43 | 0 0 0 0 | 5.15133 |
| 44 | 1 0 0 1 | 4.87551 |
| 45 | 1 1 1 1 | 4.79443 |
| 46 | 1 0 1 0 | 5.07783 |
| 47 | 0 0 1 0 | 4.99682 |
| 48 | 1 0 1 1 | 5.94242 |
| 49 | 1 0 0 1 | 4.77698 |
| 50 | 1 0 0 0 | 5.03657 |
| 51 | 0 0 1 1 | 4.46604 |
| 52 | 1 0 0 0 | 5.68568 |
| 53 | 1 1 0 1 | 5.01898 |
| 54 | 0 1 1 1 | 4.95591 |
| 55 | 1 0 0 1 | 5.27862 |
| 56 | 1 1 1 0 | 6.0317 |
| 57 | 1 0 1 1 | 4.64979 |
| 58 | 1 1 0 0 | 5.02865 |
| 59 | 0 0 0 0 | 6.04332 |
| 60 | 0 0 0 1 | 4.44083 |
| 61 | 0 1 1 1 | 5.23739 |
| 62 | 1 0 1 0 | 6.43278 |
| 63 | 0 1 1 1 | 4.43697 |
| 64 | 1 0 1 1 | 4.43697 |
| 65 | 1 1 1 0 | 4.50516 |
| 66 | 1 0 0 1 | 4.58929 |
| 67 | 0 1 1 0 | 4.35849 |
| 68 | 0 0 0 0 | 5.13149 |
| 69 | 0 0 1 0 | 4.59563 |
| 70 | 0 1 0 1 | 4.73083 |
| 71 | 1 0 0 0 | 4.43697 |
| 72 | 1 0 0 0 | 4.44072 |
| 73 | 1 0 1 0 | 5.47799 |
| 74 | 1 1 1 0 | 4.92135 |
| 75 | 1 0 0 0 | 5.5708 |
| 76 | 1 0 0 0 | 4.48634 |
| 77 | 0 0 0 1 | 5.3005 |
| 78 | 1 0 1 1 | 5.8947 |
| 79 | 1 1 0 0 | 5.38806 |
| 80 | 0 0 1 0 | 4.74777 |
| 81 | 0 1 0 0 | 4.82428 |
| 82 | 1 0 0 0 | 4.45469 |
| 83 | 1 0 1 1 | 5.66832 |
| 84 | 1 1 0 0 | 4.50856 |
| 85 | 1 0 0 1 | 4.97948 |
| 86 | 1 0 1 1 | 4.68484 |
| 87 | 0 1 0 1 | 5.50907 |
| 88 | 1 0 1 0 | 5.38228 |
| 89 | 0 0 1 0 | 5.22999 |
| 90 | 1 1 1 0 | 5.0672 |
| 91 | 0 1 0 0 | 5.59042 |
| 92 | 0 1 0 1 | 4.95926 |
| 93 | 0 0 1 1 | 5.80828 |
| 94 | 1 0 1 1 | 5.40268 |
| 95 | 0 0 1 0 | 5.97897 |
| 96 | 1 0 0 1 | 3.99109 |
| 97 | 1 0 0 1 | 5.06574 |
| 98 | 0 0 0 1 | 6.08269 |
| 99 | 1 0 0 0 | 4.99827 |
| 100 | 0 0 1 1 | 4.70382 |
| 101 | 0 1 0 1 | 4.60731 |
| 102 | 0 1 0 0 | 5.05357 |
| 103 | 1 0 1 0 | 3.30653 |
| 104 | 1 0 1 1 | 4.52548 |
| 105 | 1 1 0 0 | 5.53041 |
| 106 | 0 1 1 0 | 6.04148 |
| 107 | 1 0 1 0 | 4.88727 |
| 108 | 0 0 1 0 | 5.40024 |
| 109 | 1 1 0 0 | 4.566 |
| 110 | 0 1 1 1 | 4.92798 |
| 111 | 1 0 1 1 | 5.17459 |
| 112 | 0 1 0 1 | 4.65719 |
| 113 | 1 1 1 0 | 4.94826 |
| 114 | 1 1 1 0 | 5.62084 |

TABLE 9-continued

| ID cell | sequence | papr |
|---|---|---|
| 115 | 0 0 1 0 | 4.77778 |
| 116 | 0 1 0 0 | 4.43697 |
| 117 | 0 1 1 0 | 4.24182 |
| 118 | 0 0 0 0 | 5.37234 |
| 119 | 1 1 1 0 | 4.46408 |
| 120 | 0 1 1 0 | 5.23129 |
| 121 | 1 1 0 0 | 5.9557 |
| 122 | 0 0 1 0 | 5.1374 |
| 123 | 1 0 0 0 | 5.35576 |
| 124 | 0 1 0 0 | 4.82596 |
| 125 | 1 1 1 0 | 4.45697 |
| 126 | 1 1 1 0 | 4.74343 |

TABLE 10

| ID cell | sequence | papr |
|---|---|---|
| 0 | 960E8D631 | 4.48505 |
| 1 | 9153C8F00 | 4.11454 |
| 2 | 075D45B30 | 6.0206 |
| 3 | 77C0C8D78 | 5.06896 |
| 4 | E14E05948 | 4.51602 |
| 5 | E69300278 | 4.96176 |
| 6 | 701D8D449 | 4.50134 |
| 7 | B4784FD80 | 5.29586 |
| 8 | 22F6C2BB1 | 5.37387 |
| 9 | 25AB87080 | 4.6668 |
| 10 | B3254A6B0 | 6.09492 |
| 11 | C338870F9 | 6.11344 |
| 12 | 55360A4C8 | 5.71868 |
| 13 | 526B0FDF8 | 4.12233 |
| 14 | C465C2BC9 | 4.44864 |
| 15 | 85C88B61A | 4.42172 |
| 16 | 13C61602A | 4.45697 |
| 17 | 141B53B1A | 5.96559 |
| 18 | 82159EF2A | 5.31882 |
| 19 | F28853B62 | 5.1578 |
| 20 | 64069EF53 | 4.18834 |
| 21 | 63D8DB462 | 5.74259 |
| 22 | F5D516252 | 6.10238 |
| 23 | 31B0D4B9A | 4.50063 |
| 24 | A7BE19DAB | 4.38448 |
| 25 | A0E35C49B | 4.33171 |
| 26 | 36ED910AB | 6.31759 |
| 27 | 46F05C6E2 | 6.33599 |
| 28 | D0FED10D3 | 4.55537 |
| 29 | D723D48E2 | 4.83803 |
| 30 | 41AD19FD3 | 4.45342 |
| 31 | 12D88DA2E | 5.12448 |
| 32 | 84D600C1E | 4.43697 |
| 33 | 830B0552F | 4.90907 |
| 34 | 15858811F | 3.9985 |
| 35 | 659805756 | 6.0206 |
| 36 | F31688167 | 5.39301 |
| 37 | F4CB8D856 | 3.66497 |
| 38 | 62C500E67 | 4.92205 |
| 39 | A620C27AF | 5.53843 |
| 40 | 302E4F39F | 5.26838 |
| 41 | 37F34A8AF | 5.16959 |
| 42 | A17DC7E9E | 5.34282 |
| 43 | D1600A8D6 | 5.15133 |
| 44 | 47EE87CE7 | 4.87551 |
| 45 | 40B3C27D7 | 4.79443 |
| 46 | D6BD0F3E6 | 5.07783 |
| 47 | 971016E34 | 4.99682 |
| 48 | 019E9BA05 | 5.94242 |
| 49 | 06C39E135 | 4.77698 |
| 50 | 90CD13504 | 5.03657 |
| 51 | E0509E34D | 4.46604 |
| 52 | 76DE1357C | 5.68568 |
| 53 | 718356C4D | 5.01898 |
| 54 | E70DDBA7D | 4.95591 |
| 55 | 23E8191B5 | 5.27862 |
| 56 | B5E6D4784 | 6.0317 |

TABLE 10-continued

| ID cell | sequence | papr |
|---|---|---|
| 57 | B2BB91EB5 | 4.64379 |
| 58 | 24B55C884 | 5.02869 |
| 59 | 542891CCC | 6.04332 |
| 60 | C2261C8FD | 4.44083 |
| 61 | C57B593CD | 5.23739 |
| 62 | 53F5947FC | 6.45278 |
| 63 | 9002C3E29 | 4.43697 |
| 64 | 068CDEA19 | 4.43697 |
| 65 | 01D14B528 | 4.50516 |
| 66 | 97DFB6519 | 4.58929 |
| 67 | E7424B350 | 4.35848 |
| 68 | 714C86560 | 5.13148 |
| 69 | 761183E50 | 4.59563 |
| 70 | E01F4E861 | 4.73083 |
| 71 | 24FA8C1A8 | 4.43697 |
| 72 | B2F4O1598 | 4.44072 |
| 73 | B5A9O4EA8 | 5.47799 |
| 74 | 23A7C9A98 | 4.92135 |
| 75 | 53BA04CD0 | 5.5708 |
| 76 | C5B4B98E0 | 4.49634 |
| 77 | C2698C1D1 | 5.3005 |
| 78 | 54E7017E1 | 5.8947 |
| 79 | 15CA58832 | 5.38806 |
| 80 | 834495E02 | 4.74777 |
| 81 | 8419D0532 | 4.82428 |
| 82 | 12971D102 | 4.45469 |
| 83 | 628A9074B | 5.66832 |
| 84 | F4845D17A | 4.50856 |
| 85 | F3D91884B | 4.97946 |
| 86 | 65D795E7B | 4.68484 |
| 87 | A132575B3 | 5.50907 |
| 88 | 37BC9A382 | 5.38228 |
| 89 | 30619FAB2 | 5.22999 |
| 90 | A6EF52E82 | 5.0672 |
| 91 | D672DF8CA | 5.59042 |
| 92 | 407C52CFB | 4.95926 |
| 93 | 4721177CB | 3.80828 |
| 94 | D1AF9A3FB | 5.40268 |
| 95 | 825A0E606 | 5.97897 |
| 96 | 14D483037 | 3.99109 |
| 97 | 138986907 | 5.06574 |
| 98 | 85070BD37 | 6.08269 |

TABLE 10-continued

| ID cell | sequence | papr |
|---|---|---|
| 107 | 41E2896FE | 4.88727 |
| 108 | D76C042CE | 5.40024 |
| 109 | D0B1419FE | 4.566 |
| 110 | 463FCCFCF | 4.92796 |
| 111 | 07929521D | 5.17459 |
| 112 | 911C5842D | 4.65718 |
| 113 | 96C15DF1C | 4.94826 |
| 114 | 00CFD0B2C | 5.62084 |
| 115 | 70521DF64 | 4.77778 |
| 116 | E65CD0954 | 4.43697 |
| 117 | E101D5264 | 4.24182 |
| 118 | 770F18454 | 6.37234 |
| 119 | B3EADAF9C | 4.46408 |
| 120 | 256457BAC | 5.23129 |
| 121 | 22B95209C | 5.9557 |
| 122 | B4379F6AC | 5.1374 |
| 123 | C4AA120E4 | 5.35576 |
| 124 | 5224DF4D4 | 4.82596 |
| 125 | 55F9DAFE4 | 4.43697 |
| 126 | C3F757BD4 | 4.74343 |

Next, when the number $N_t$ of the transmit antennas is four and the number of the FFT operation points used in the OFDM communication system is 512 (i.e. $N_t=4$, $N_{FFT}=512$), R(r) can be expressed by Equation (11) below.

$$R(r) = B_{IDcell+1} g_{\Pi(r)}, r = 8*\left\lfloor \frac{m}{9} \right\rfloor + m \bmod 9 = 0, 1, \ldots, 95 \quad (11)$$

In Equation (11), the block code generator matrix G is expressed as by Equation (12) below and the interleaving scheme can be expressed by Table 11 below.

Equation (12)

$$G = [g_0 g_1 \ldots g_{95}]$$

$$= \begin{bmatrix} 0101010101010101000100010001000100000101011000110000001101010110000000011111111000011110000111 \\ 0011001100110010101010101010001000100010000001010110001100000011010101100000000111111111 \\ 0000111100001111001100110011010101010101010001000100010000001010110001100000011010101100 \\ 0000000011111111000011110000111100110011001101010101010101010001000100010000001010110001 \\ 0000001101010110000000001111111100001111000011110011001100110011010101010101010100010001000100010001 \\ 0000010101100011000001101010110000000011111111000011110000111100110011001101010101010101010101 \\ 0001000100010001000001010110001100000011010101100000000011111111000011110000111100110011001100110011 \end{bmatrix} \quad (12)$$

TABLE 10-continued

| ID cell | sequence | papr |
|---|---|---|
| 99 | F59A8697E | 4.39827 |
| 100 | 63140BF4F | 4.70382 |
| 101 | 64494E47F | 4.60731 |
| 102 | F247C304E | 5.05357 |
| 103 | 36A201B86 | 3.30653 |
| 104 | A0AC8CFB7 | 4.52546 |
| 105 | A7F1C9486 | 5.53041 |
| 106 | 317F442B6 | 6.04148 |

TABLE 11

| Π(l) | 2, 6, 0, 10, 14, 11, 7, 3, 8, 15, 1, 12, 9, 4, 13, 5, 18, 26, 24, 17, 29, 19, 21, 16, 23, 22, 25, 28, 27, 31, 20, 30, 41, 34, 38, 44, 36, 43, 35, 32, 45, 47, 46, 39, 40, 33, 37, 42, 60, 56, 59, 61, 51, 62, 52, 49, 58, 48, 53, 50, 54, 57, 55, 63, 71, 77, 76, 74, 67, 66, 68, 75, 78, 64, 69, 79, 72, 70, 65, 73, 81, 92, 83, 87, 82, 94, 86, 88, 95, 91, 93, 90, 84, 85, 80, 89 |
|---|---|

T(k) in Equation (7) has values as expressed by the hexadecimal numbers shown in Table 12 below and $q_{ID_{cell}}[m]$ can be expressed by the hexadecimal numbers as shown in Tables 13a and 13b.

TABLE 12

| ID cell | sequence | papr |
|---|---|---|
| 0 | CB3 | 6.26336 |
| 1 | D47 | 5.27748 |
| 2 | 59D | 4.9581 |
| 3 | F21 | 5.05997 |
| 4 | 87E | 6.51422 |
| 5 | BFA | 5.33856 |
| 6 | 4D4 | 7.0618 |
| 7 | 3E0 | 6.41769 |
| 8 | 3E4 | 4.87727 |
| 9 | 6F7 | 4.15136 |
| 10 | 8D0 | 5.86359 |
| 11 | 33E | 5.68455 |
| 12 | CA3 | 5.79482 |
| 13 | 119 | 5.29216 |
| 14 | AA3 | 5.3423 |
| 15 | EC5 | 5.40257 |
| 16 | A08 | 5.63148 |
| 17 | 96C | 5.44285 |
| 18 | 9D3 | 5.19112 |
| 19 | 5BC | 5.41859 |
| 20 | 4BC | 5.96539 |
| 21 | D15 | 6.07706 |
| 22 | A31 | 4.76142 |
| 23 | 4B3 | 4.67373 |
| 24 | B0A | 5.24324 |
| 25 | BB7 | 4.81109 |
| 26 | 245 | 4.99566 |
| 27 | 834 | 4.81878 |
| 28 | A59 | 5.78273 |
| 29 | B07 | 5.59368 |
| 30 | 694 | 5.53837 |
| 31 | 6C6 | 6.42782 |
| 32 | 1F3 | 5.26429 |
| 33 | 573 | 4.94488 |
| 34 | 07F | 6.36319 |
| 35 | 9A3 | 5.91188 |
| 36 | C86 | 5.36258 |
| 37 | 349 | 4.98064 |
| 38 | C83 | 6.14253 |
| 39 | EE0 | 5.95156 |
| 40 | 4CA | 5.40169 |
| 41 | 634 | 4.82317 |
| 42 | 360 | 5.05168 |
| 43 | 7B6 | 5.20885 |
| 44 | 4A7 | 5.52378 |
| 45 | 0D4 | 6.47369 |
| 46 | 523 | 5.20757 |
| 47 | F29 | 5.0776 |
| 48 | A67 | 5.52381 |
| 49 | 251 | 5.10732 |
| 50 | B8E | 4.77121 |
| 51 | 5B0 | 5.38618 |
| 52 | B6B | 5.20069 |
| 53 | DCC | 6.18175 |
| 54 | 356 | 5.46713 |
| 55 | 7FB | 6.23427 |
| 56 | C6B | 4.64117 |
| 57 | 956 | 5.81606 |
| 58 | 100 | 5.04293 |
| 59 | DF0 | 6.56931 |
| 60 | 663 | 5.4996 |
| 61 | 602 | 5.72958 |
| 62 | 894 | 4.96955 |
| 63 | 247 | 5.37554 |
| 64 | 73E | 5.29366 |
| 65 | 0FE | 6.62956 |
| 66 | 5CB | 4.88939 |
| 67 | C59 | 4.30678 |
| 68 | 5B5 | 5.54517 |
| 69 | E2D | 5.27261 |
| 70 | 5F6 | 5.03828 |
| 71 | 9A9 | 5.25379 |

TABLE 12-continued

| ID cell | sequence | papr |
|---|---|---|
| 72 | BDB | 5.14859 |
| 73 | AE7 | 5.39255 |
| 74 | 2C2 | 4.97124 |
| 75 | 6A3 | 6.20876 |
| 76 | D3A | 4.83271 |
| 77 | 741 | 5.5686 |
| 78 | 737 | 5.64126 |
| 79 | 7AC | 5.17063 |
| 80 | 79F | 5.0828 |
| 81 | 3FA | 5.22885 |
| 82 | 99C | 6.01707 |
| 83 | 755 | 6.51422 |
| 84 | A44 | 4.93486 |
| 85 | F67 | 4.86142 |
| 86 | 4D4 | 6.21941 |
| 87 | 810 | 4.25677 |
| 88 | 201 | 4.47647 |
| 89 | 054 | 6.8165 |
| 90 | 654 | 5.87238 |
| 91 | F34 | 5.31419 |
| 92 | 4FF | 6.88515 |
| 93 | 4AA | 6.75475 |
| 94 | E8D | 6.10937 |
| 95 | 944 | 4.79898 |
| 96 | 478 | 4.77121 |
| 97 | 17E | 5.66118 |
| 98 | 696 | 4.93494 |
| 99 | 31A | 5.36534 |
| 100 | 9D7 | 4.78933 |
| 101 | 2A4 | 5.45932 |
| 102 | 35C | 6.40963 |
| 103 | CBD | 5.39788 |
| 104 | 44C | 4.38835 |
| 105 | 416 | 4.38145 |
| 106 | 6B6 | 5.5007 |
| 107 | E79 | 5.6706 |
| 108 | 34F | 5.62588 |
| 109 | DC4 | 5.29578 |
| 110 | 586 | 5.00808 |
| 111 | DF3 | 4.48385 |
| 112 | F2B | 5.53794 |
| 113 | ED1 | 5.58523 |
| 114 | 686 | 5.71655 |
| 115 | 500 | 5.01001 |
| 116 | 8FB | 5.89436 |
| 117 | CB5 | 5.25553 |
| 118 | 99A | 5.47731 |
| 119 | 43D | 5.4871 |
| 120 | 161 | 6.18899 |
| 121 | 32D | 5.35874 |
| 122 | 49D | 5.46312 |
| 123 | 8BD | 5.13605 |
| 124 | 2E9 | 5.70272 |
| 125 | 0F0 | 6.26171 |
| 126 | 144 | 5.50515 |

TABLE 13a

| ID cell | sequence | papr | ID cell | sequence | papr |
|---|---|---|---|---|---|
| 0 | 07B5CI11880898D2ID714C95B59 | 6.26336 | 64 | 0015DIA53246IB03179396DA2F8 | 5.29366 |
| 1 | DFA04795906284114EC142DI7E3 | 5.27748 | 65 | D80017012A2F07C2452398DEE42 | 6.62956 |
| 2 | D815C68418691BC153B08E44CBB | 4.9581 | 66 | DF35D610B22C9F105852D40B71B | 4.88939 |
| 3 | 4AABF139B866B0A2069058858C3 | 5.05997 | 67 | 4D8BE18D022337710D72828A163 | 4.30678 |
| 4 | 4D9E300820652C721BE1945039A | 6.51422 | 68 | 4A3E609C9A28ABA311034E5F83B | 5.54517 |
| 5 | 958BB6AC380C34B349519AI4F20 | 5.33856 | 69 | 92ABE638824IB36242B3C05B481 | 5.27261 |
| 6 | 923E779DA00FAC61552056CI478 | 7.0618 | 70 | 951E67091A4A2FB25FC20CCEFD8 | 5.03828 |
| 7 | IC6D02BAF66B8CE64E89080512A | 6.41769 | 71 | 1BCD120E5C2E0B37446BD20A88B | 5.25379 |
| 8 | 1B5883AB7E68143652F844D0872 | 4.87727 | 72 | 1CF8933FD42D97E5591A9E9F3D3 | 5.14859 |
| 9 | C34D452F66090CF70148AD46C9 | 4.15136 | 73 | C4EDI5BBCC4C8F260AAA10DBF69 | 5.39255 |
| 10 | C4F8841EEE0A94251D390601D90 | 5.86359 | 74 | C35894AA444F17F416DB5C0E630 | 4.97124 |
| 11 | 5646B3A35E0538464919D0C0BE8 | 5.68455 | 75 | 5166E337E448BB9742FB0A8F249 | 6.20876 |
| 12 | 51F37292C60EA09654681C152B1 | 5.79482 | 76 | 56D362067C4323475F8AC61AB10 | 4.83271 |
| 13 | 8966B416DE67B85507D89211C0B | 5.29216 | 77 | BE46E4A274223F840C3A481E5AB | 5.5686 |
| 14 | 8ED33527466C20871AA95E84753 | 5.3423 | 78 | 897365B3FC2IA3561I4B04CBEF3 | 5.64126 |
| 15 | 4E855A27A38F94B136C919CC181 | 5.40257 | 79 | 49254AB319CA13623C2BC3C3820 | 5.17063 |
| 16 | 49B09B362B8408612AB8D5198D8 | 5.63148 | 80 | 4E10CBA291C98BB0215A8F56379 | 5.0828 |
| 17 | 91A51D9233E514A27808DB5D462 | 5.44285 | 81 | 96050D2699A8977373EA81I2FC2 | 5.22885 |
| 18 | 96909C83BBEE8C7065791788F3B | 5.19112 | 82 | 91B0C1711AB0BA16F9BCDC749A | 6.01707 |
| 19 | 042EEB1E1BE920133159C149942 | 5.41859 | 83 | 030EFBAAB1A4A7C038BB1B460E3 | 6.51422 |
| 20 | 031B6A0F83EAB8C32D288DDC01A | 5.96539 | 84 | 04BB3ABB29A73F1026CA57D39BA | 4.93486 |
| 21 | DB8EEC8B9B83A0007F9803D8CA1 | 6.07706 | 85 | DCAEFC3F31C627D3747A59D7701 | 4.86142 |
| 22 | DC882DBA038038D263E94F0D5F9 | 4.76142 | 86 | DB1B7D0EA9CDBF01690B1542C58 | 6.21941 |
| 23 | 5268589D45EC1857794011892AB | 4.67373 | 87 | 55C80809EFA19B8473A24B8690A | 4.25677 |
| 24 | 55DD99ACDDE780856431DD1CBF2 | 5.24324 | 88 | 527D893867A203546ED30713053 | 4.47647 |
| 25 | 8DC81F28D58E984637815358749 | 4.81109 | 89 | 8A680F9C6FC31F953D630957CE8 | 6.8165 |
| 26 | 8A7D9E394D8504942AF01FCDC11 | 4.99566 | 90 | 8D5DCEADE7C08745211245C25B0 | 5.87238 |
| 27 | 18C3A984ED82A8F77FD0494C868 | 4.81878 | 91 | 1FE3F93057C72B267532134 31C8 | 5.31419 |
| 28 | 1FF628B56581342563A18599131 | 5.78273 | 92 | 18567801CFCCB7F66943DFD6A91 | 6.88515 |
| 29 | C7E3AE116DE028E430110BDDF8B | 5.59368 | 93 | C043FE85C7ADAB373AF3D19262A | 6.75475 |
| 30 | C0566F20E5EBB0342D6047484D2 | 5.53837 | 94 | C7F67FB44FAE33E526829D47D73 | 6.10937 |
| 31 | 1A24C23D294F4E58569D4A6C3CA | 6.42782 | 95 | 1D8492899302CD895C7F106386A | 4.79898 |
| 32 | 1D11030CB14CD68A4BEC06B9A93 | 5.26429 | 96 | 1A3153980B01555B410EDC86132 | 4.77121 |
| 33 | C504C588B925CE4B195C08BD629 | 4.94488 | 97 | C224951C13604D9A13BED2F2F88 | 5.66118 |
| 34 | C23104992126569B052DC468F71 | 6.36319 | 98 | C511542D8B6BD1480FCF1E676D0 | 4.93494 |
| 35 | 508F33049129FAFA500D12A9B09 | 5.91188 | 99 | 572F23B03B6479295BEFC8A62A8 | 5.36534 |

TABLE 13b

| 36 | 57BAF215092A62284C7C5E7C250 | 5.36258 | 100 | 509AA281B36FE5F9479E0473BF1 | 4.78933 |
|---|---|---|---|---|---|
| 37 | 8F2F34B111437EE91ECCD038CEB | 4.98064 | 101 | 880F2425AB0EF93A142E0A7754A | 5.45932 |
| 38 | 889AF5808948E23902BD1CAD7B3 | 6.14253 | 102 | 8F3AA534330565E8095FC6E2C12 | 6.40963 |
| 39 | 06C9C0A7CF2CC6BE181442290E0 | 5.95156 | 103 | 01E9D0136569416FI3F69866941 | 5.39788 |
| 40 | 017C4196472F5E6C04658EBCBB8 | 5.40169 | 104 | 065C5102ED62ODBD0E87D4F3018 | 4.38835 |
| 41 | D969C7324F4642AF57D500F8502 | 4.82317 | 105 | DE49D786E503C17C5D375AF7EA2 | 4.38145 |
| 42 | DE5C0623D745DE7F4AA44C2DC5A | 5.05168 | 106 | D97C56B76D0859AE414616627FA | 5.5007 |
| 43 | 4C6271BE774A721E1F841AECA22 | 5.20885 | 107 | 4BC26I2ACD07F5CF1566C0A3183 | 5.6706 |
| 44 | 4B57F08FEF49EACE02F5567937B | 5.52378 | 108 | 4C77A03B55046D1D08178C76ADB | 5.62588 |
| 45 | 9342360BE728F60D5145587DDC0 | 6.47369 | 109 | 94E2669F5D6D75DC5AA70272460 | 5.29578 |
| 46 | 9477F71A7F236ADF4C3414A8699 | 5.20757 | 110 | 9357E78ED56EE90C46D64EE7F38 | 5.00808 |
| 47 | 54A1D83A9AC0DAEB6054D3A004B | 5.0776 | 111 | 5381C88E308D5D3A6BB609AFBEB | 4.48385 |
| 48 | 5394192B02C3463B7C251F75B13 | 5.52381 | 112 | 54B449BFB886C1EA76C7C53A2B3 | 5.53794 |
| 49 | 8B019FAF0AA25EF82F9511315A9 | 5.10732 | 113 | 8CA1CF3BAA0BEFDD2925774B3EC09 | 5.58523 |
| 50 | 8CB41EBE92A9C22832E4DDE4EF0 | 4.77121 | 114 | 8B144E2A28EC41F9380607EB750 | 5.71655 |
| 51 | 1E0A690332AE6A4B67C40B25888 | 5.38618 | 115 | 192A799798E3E9986C26512AI28 | 5.01001 |
| 52 | 19BFA832BAA5F69B7AB5C7B03D1 | 5.20069 | 116 | 1E9FB88600E8754A7I579DBFA7I | 5.89436 |
| 53 | C1AA6E96B2CCEE582805C9F4D6A | 6.18175 | 117 | C68A7E020889698B23E713FB4CB | 5.25553 |
| 54 | C61FAFA73AC7768835740561632 | 5.46713 | 118 | C18FBF13908AF1593F96DF2EF92 | 5.47731 |
| 55 | 484CDAA07CAB560F2FDDDBA5361 | 6.23427 | 119 | 4F6CCA14C6E6D1DE253F81EA8C1 | 5.4871 |
| 56 | 4FF95B91E4A0CEDF32AC9730A39 | 4.64117 | 120 | 48590B055EE54D0E384E4D3F199 | 6.18899 |
| 57 | 97EC9D15FCC1D61C611C1974682 | 5.81606 | 121 | 904C8DAI568451CF6AFEC37BD23 | 5.35874 |
| 58 | 9059IC0474C24ACC7C6D55A1DDA | 5.04293 | 122 | 97794C90CE8FC9ID778F8FEE47B | 5.46312 |
| 59 | 02E76B99D4CDE6AF294D03209A2 | 6.56931 | 123 | 05C73B0D6E88617E23AFD96F003 | 5.13605 |
| 60 | 0552EAA84CC67E7F343C4FB52F8 | 5.4996 | 124 | 0272BA3CE68BFDAE3EDE95BA95B | 5.70272 |
| 61 | DD476C2C44A762BC668C41B1E40 | 5.72958 | 125 | DA673C98EEEAE56F6D6E1BBE5E0 | 6.26171 |
| 62 | DAF2AD1DCCACFA6C7BFD0D64518 | 4.96955 | 126 | DD52BD8976E17DBD701F576BCB8 | 5.50515 |
| 63 | 072010B4AA4587D10AE25A4FBA1 | 5.37554 | | | |

As understood from the above description, the present invention provides pilot symbols which can identify cell IDs and sector IDs by using a Walsh code and a block code using Walsh bases and mask sequences in an OFDM communication system, thereby increasing the number of identifiable cell IDs and sector IDs in the OFDM communication system. Further, the present invention enables a receiver to detect a pilot symbol by using an IFHT unit, thereby minimizing the complexity of the receiver. Also, according to the present invention, the pilot symbol is generated by using not only the block code and Walsh code but also the PAPR reduction sequence, thereby improving the PAPR characteristic of the pilot symbol.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a reference signal for identification of each cell in a communication system including a plurality of cells each of which is identified by a cell identifier, the method comprising the steps of:

in response to input of the cell identifier, generating, by a block code encoder, a block code corresponding to the cell identifier using a predetermined block code generator matrix;

generating a first part sequence by interleaving, by an interleaver, the block code according to at least one interleaving scheme and performing, by an adder, an exclusive OR operation on the interleaved block code;

selecting a second part sequence corresponding to the cell identifier and from among predetermined sequences considering Peak-to-Average Power Ratio (PAPR) reduction;

generating, by a combiner, a reference signal of a frequency domain by using the first part sequence and the second part sequence;

converting, by a transmitter, the reference signal of the frequency domain to a reference signal of a time domain through an Inverse Fast Fourier Transform (IFFT) operation; and transmitting, by the transmitter, the reference signal of the time domain in a over a reference signal transmission interval, wherein the reference signal of the frequency domain is defined by:

$$P_{ID_{cell},S}[k] = \begin{cases} \sqrt{2}(1 - 2q_{ID_{cell},S}[m]), & k = 2m - \frac{N_{used}}{2}, \\ & m = 0, 1, \ldots, \frac{N_{used}}{4} - 1 \\ \sqrt{2}(1 - 2q_{ID_{cell},S}[m-1]), & k = 2m - \frac{N_{used}}{2}, \\ & m = \frac{N_{used}}{4} + 1, \frac{N_{used}}{4} + 2, \ldots, \frac{N_{used}}{2} \\ 0, & \text{otherwise} \end{cases}$$

$$ID_{cell} \in \{0, 1, \ldots, 126\}, s \in \{0, 1, \ldots, 7\},$$
$$k \in \{-N_{FFT}/2, -N_{FFT}/2 + 1, \ldots, N_{FFT}2 - 1\},$$

where $P_{ID_{cell},S}[k]$ denotes the reference signal, $ID_{cell}$ denotes the cell identifier, s denotes a sector identifier, k denotes a sub-carrier index, $N_{used}$ denotes a number of used subcarriers, $N_{FFT}$ denotes a number of points of the IFFT operation, and $q_{ID_{cell},S}[m]$ denotes a setup sequence.

2. The method as claimed in claim 1, wherein the step of converting the reference signal comprises the steps of:

inserting null data into sub-carriers corresponding to DC components and intersubcarrier interference eliminating components from among N sub-carriers;

inserting elements of the reference signal into M sub-carriers other than the sub-carriers into which the null data is inserted from among the N sub-carriers; and performing an IFFI operation on a signal including the reference signal elements and the M sub-carriers and then transmitting the signal.

3. The method as claimed in claim 2, wherein inserting elements of the reference signal is performed in consideration of a predetermined offset that is set to have a specific value for each of the cells and sectors.

4. The method as claimed in claim 1, wherein the setup sequence is defined by:

$$q_{ID_{cell},S}[m] = \begin{cases} R\left(8 * \lfloor \frac{m}{9} \rfloor + m \bmod 9\right), & \text{where } m \bmod 9 = 0, 1, \ldots, 7 \\ & m = 0, 1, \ldots, 53 \\ T\left(\lfloor \frac{m}{9} \rfloor\right), & \text{where } m \bmod 9 = 8 \end{cases}$$

wherein $\lfloor m/9 \rfloor$ represents a maximum integer not greater than m/9, and R(r) is defined by:

$$R(r) = w^s_{r \bmod 8} \oplus b_{ID_{cell}+1} g_{\Pi(r)},$$

$$r = 8 * \lfloor \frac{m}{9} \rfloor + m \bmod 9 = 0, 1, \ldots, 47,$$

wherein $w^s_{r \bmod 8}$ represents repetition of Walsh codes having a length of 8, $b_k$ ($1 \leq k \leq 47$) represents a k-th row vector of the block code generator matrix, k represents a value calculated by adding a cell identifier IDcell and 1, $g_u$ ($0 \leq u \leq 47$) represents a u-th column vector of the block code generator matrix, u represents indicating an r-th element of an interleaving pattern according to an interleaving scheme $\Pi(r)$, R(r) denotes a first sequence, and T(−) denotes a second sequence.

5. The method as claimed in claim 4, wherein the block code generator matrix is defined as $$G = [g_0 g_1 \ldots g_{47}] =$$

$$\begin{bmatrix} 0101010101010101 & 0000010101100001 & 0000000011111111 \\ 0011001100110011 & 0001000100010001 & 0000001101010110 \\ 0000111100001111 & 0101010101010101 & 0000010101100011 \\ 0000000011111111 & 0011001100110011 & 0001000100010001 \\ 0000001101010110 & 0000111100001111 & 0101010101010101 \\ 0000010101100011 & 0000000011111111 & 0011001100110011 \\ 0001000100010001 & 0000001101010110 & 0000111100001111 \end{bmatrix}$$

6. The method as claimed in claim 5, wherein the interleaving scheme is defined by Π(r) as shown:

| Π(r) | 9, 7, 14, 15, 10, 1, 2, 5, 3, 8, 0, 4, 13, 11, 6, 12, 27, 29, 21, 18, 16, 25, 23, 17, 24, 19, 28, 31, 26, 20, 30, 22, 38, 47, 41, 42, 37, 46, 39, 45, 32, 34, 40, 33, 35, 43, 36, 44, |
|---|---| wherein each number in the table indicates an index of a sub-carrier to which an element of the block code is one-to-one mapped.

7. An apparatus for transmitting a reference signal for identification of each cell in a communication system including a plurality of cells each of which is identified by a cell identifier, the apparatus comprising:

a block code encoder which, in response to input of the cell identifier, generates a block code corresponding to the cell identifier by using a predetermined block code generator matrix;

an interleaver for interleaving the block code according to at least one interleaving scheme;

an adder for performing an exclusive OR operation on the interleaved block code, thereby generating a first part sequence;

a combiner for generating a reference signal of a frequency domain by using the first part sequence and a second part sequence which is selected corresponding to the cell identifier and from among predetermined sequences; and a transmitter for converting the reference signal of the frequency domain to a reference signal of a time domain through an Inverse Fast Fourier Transform (IFFT) and, operation and then transmitting the reference signal of the time domain over a reference signal transmission interval, where the reference signal of the frequency domain is defined by:

$$P_{ID_{cell},S}[k] = \begin{cases} \sqrt{2}(1 - 2q_{ID_{cell},S}[m]), & k = 2m - \frac{N_{used}}{2}, \\ & m = 0, 1, \ldots, \frac{N_{used}}{4} - 1 \\ \sqrt{2}(1 - 2q_{ID_{cell},S}[m-1]), & k = 2m - \frac{N_{used}}{2}, \\ & m = \frac{N_{used}}{4} + 1, \frac{N_{used}}{4} + 2, \ldots, \frac{N_{used}}{2} \\ 0, & \text{otherwise} \end{cases}$$

$$ID_{cell} \in \{0, 1, \ldots, 126\}, s \in \{0, 1, \ldots, 7\},$$
$$k \in \{-N_{FFT}/2, -N_{FFT}/2 + 1, \ldots, N_{FFT}2 - 1\},$$

wherein $P_{ID_{cell},S}[k]$ denotes the reference signal, $ID_{cell}$ denotes the cell identifier, s denotes the sector identifier, k denotes a sub-carrier index, $N_{used}$ denotes a number of used subcarriers, $N_{FFT}$ denotes a number of points of the IFFT operation, and $q_{ID_{cell},S}[m]$ denotes a setup sequence.

8. The apparatus as claimed in claim 7, wherein the block code generator matrix includes b number of sub-blocks, each of which includes c number of Walsh bases and d number of mask sequences, and the b sub-blocks including a first sub-block to a b-th sub-block have a relation of cyclic shift between each other, so as to maximize a minimum distance of the block code generated by using the block code generator matrix.

9. The apparatus as claimed in claim 8, wherein the interleaver divides the block code into the b sub-blocks and interleaves the b sub-blocks according to b number of interleaving schemes differently set for the b sub-blocks.

10. The apparatus as claimed in claim 7, wherein the transmitter comprises:

an Inverse Fast Fourier Transform (IFFT) unit for inserting null data into sub-carriers corresponding to DC components and intersubcarrier interference eliminating components from among N sub-carriers, inserting elements of the reference signal into M sub-carriers other than the sub-carriers into which the null data is inserted from among the N sub-carriers, and then performing an IFFT operation on a signal including the reference signal of the frequency domain elements and the M sub-carriers; and a Radio Frequency (RF) processor for processing and transmitting the IFFT-processed signal.

11. The apparatus as claimed in claim 7, wherein the transmitter comprises:

an IFFT unit for inserting null data into sub-carriers corresponding to DC components and intersubcarrier interference eliminating components from among N sub-carriers, inserting elements of the reference signal into M sub-carriers other than the sub-carriers into which the null data is inserted from among the N sub-carriers, in consideration of a predetermined offset, and then performing an IFFT operation on a signal including the reference signal of the frequency domain elements and the M sub-carriers and then transmitting the signal; and a Radio Frequency (RF) processor for processing and transmitting the IFFT-processed signal.

12. The apparatus as claimed in claim 11, wherein the offset is set to have a specific value for each of the cells and sectors.

13. The apparatus as claimed in claim 7, wherein the setup sequence is defined by:

$$q_{ID_{cell},S}[m] = \begin{cases} R\left(8 * \lfloor \frac{m}{9} \rfloor + m \bmod 9\right), & \text{where } m \bmod 9 = 0, 1, \ldots, 7 \\ & m = 0, 1, \ldots, 53 \\ T\left(\lfloor \frac{m}{9} \rfloor\right), & \text{where } m \bmod 9 = 8 \end{cases}$$

wherein $$\lfloor \frac{m}{9} \rfloor$$

represents a maximum integer not greater than $$\frac{m}{9},$$

and R(r) is defined by:

$$R(r) = w^s_{r \bmod 8} \oplus b_{IDcell+1} g_{\Pi(r)},$$

$$r = 8 * \left\lfloor \frac{m}{9} \right\rfloor + m \bmod 9 = 0, 1, \ldots, 47,$$

wherein $w^s_{r\,mod8}$ represents repetition of Walsh codes having a length of 8, $b_k$ ($1 \leq k \leq 47$) represents a k-th row vector of the block code generator matrix, k represents a value calculated by adding a cell identifier IDcell and 1, $g_u$ ($0 \leq u \leq 47$) represents a u-th column vector of the block code generator matrix, u represents indicating an r-th element of an interleaving pattern according to an interleaving scheme $\Pi(r)$, R(r) denotes a first sequence, and T(−) denotes a second sequence.

14. The apparatus as claimed in claim 13, wherein the block code generator matrix is expressed as $$G = [g_0 g_1 \ldots g_{47}] =$$

$$\begin{bmatrix} 0101010101010101 & 0000010101100011 & 0000000011111111 \\ 0011001100110011 & 0001000100010001 & 0000001101010110 \\ 0000111100001111 & 0101010101010101 & 0000010101100011 \\ 0000000011111111 & 0011001100110011 & 0001000100010001 \\ 0000001101010110 & 0000111100001111 & 0101010101010101 \\ 0000010101100011 & 0000000011111111 & 0011001100110011 \\ 0001000100010001 & 0000001101010110 & 0000111100001111 \end{bmatrix}$$

15. The apparatus as claimed in claim 14, wherein the interleaving scheme is defined as $\Pi(r)$ as shown:

| $\Pi(r)$ | 9, 7, 14, 15, 10, 1, 2, 5, 3, 8, 0, 4, 13, 11, 6, 12, 27, 29, 21, 18, 16, 25, 23, 17, 24, 19, 28, 31, 26, 20, 30, 22, 38, 47, 41, 42, 37, 46, 39, 45, 32, 34, 40, 33, 35, 43, 36, 44, |
|---|---| wherein each number in the table indicates an index of a sub-carrier to which an element of the block code is one-to-one mapped.

16. A method for receiving a reference signal for identification of each cell in a communication system including a plurality of cells each of which is identified by a cell identifier, the method comprising:

extracting, by a reference signal extractor, the reference signal from a received signal which has been converted through a Fast Fourier Transform (FFT) operation;

dividing, by an adder, the reference signal into a predetermined number of intervals and performing an exclusive OR (XOR) operation on the divided intervals;

deinterleaving, by a deinterleaver, the XOR-processed signal according to at least one deinterleaving scheme;

dividing, by a sub-block divider, the deinterleaved signal into sub-block signals in accordance with a predetermined block code generator matrix;

performing, by a block code decoder, an Inverse Fast Hadamard Transform (IFHT) using mask sequences generated according to control of each of the sub-block signals;

generating, by a combiner, a combined signal by combining the IFHT-processed signals for each of the sub-block signals; and determining, by a comparison selector, a cell identifier corresponding to a block code having a maximum correlation value from among the combined signals as a final cell identifier, wherein the reference signal of the frequency domain is defined by:

$$P_{ID_{cell,S}}[k] = \begin{cases} \sqrt{2}(1 - 2q_{ID_{cell,S}}[m]), & k = 2m - \frac{N_{used}}{2}, \\ & m = 0, 1, \ldots, \frac{N_{used}}{4} - 1 \\ \sqrt{2}(1 - 2q_{ID_{cell,S}}[m-1]), & k = 2m - \frac{N_{used}}{2}, \\ & m = \frac{N_{used}}{4} + 1, \frac{N_{used}}{4} + 2, \ldots, \frac{N_{used}}{2} \\ 0, & \text{otherwise} \end{cases}$$

$$ID_{cell} \in \{0, 1, \ldots, 126\}, s \in \{0, 1, \ldots, 7\},$$

$$k \in \{-N_{FFT}/2, -N_{FFT}/2 + 1, \ldots, N_{FFT}/2 - 1\},$$

wherein $P_{ID_{cell,S}}[k]$ denotes the reference signal, $ID_{cell}$ denotes the cell identifier, s denotes the sector identifier, k denotes a sub-carrier index, $N_{used}$ denotes a number of subcarriers used, $N_{FFT}$ denotes a number of points of the IFFT operation, and $q_{IDcell,S}[m]$ denotes a setup sequence.

17. The method as claimed in claim 16, wherein, in the step of extracting, the reference signal is extracted by eliminating a predetermined sequence from a signal received through M sub-carriers other than sub-carriers corresponding to DC components and intersubcarrier interference eliminating components from among N sub-carriers.

18. The method as claimed in claim 17, wherein the eliminating is performed in consideration of a predetermined offset that is set to have a specific value for each of the cells and sectors.

19. The method as claimed in claim 16, wherein the setup sequence is defined by:

$$q_{ID_{cell,S}}[m] = \begin{cases} R\left(8 * \left\lfloor \frac{m}{9} \right\rfloor + m \bmod 9\right), & \text{where } m \bmod 9 = 0, 1, \ldots, 7 \\ & m = 0, 1, \ldots, 53 \\ T\left(\left\lfloor \frac{m}{9} \right\rfloor\right), & \text{where } m \bmod 9 = 8 \end{cases},$$

wherein $$\left\lfloor \frac{m}{9} \right\rfloor$$

represents a maximum integer not greater than $$\frac{m}{9},$$

and R(r) is defined by:

$$R(r) = w^s_{r \bmod 8} \oplus b_{IDcell+1} g_{\Pi(r)},$$

$$r = 8 * \left\lfloor \frac{m}{9} \right\rfloor + m \bmod 9 = 0, 1, \cdots, 47,$$

wherein $w^s_{r \bmod 8}$ represents repetition of Walsh codes having a length of 8, $b_k$ ($1 \leq k \leq 47$) represents a k-th row vector of the block code generator matrix, k represents a value calculated by adding a cell identifier IDcell and '1', $g_u$ ($0 \leq u \leq 47$) represents a u-th column vector of the block code generator matrix, u represents indicating an r-th element of an interleaving pattern according to a deinterleaving scheme $\Pi(r)$, R(r) denotes a first sequence, and T(–) denotes a second sequence.

20. The method as claimed in claim 19, wherein the block code generator matrix is defined as:

$$G = [g_0 g_1 \ldots g_{47}] =$$

$$\begin{bmatrix} 0101010101010101 & 0000010101100011 & 0000000011111111 \\ 0011001100110011 & 0001000100010001 & 0000001101010110 \\ 0000111100001111 & 0101010101010101 & 0000010101100011 \\ 0000000011111111 & 0011001100110011 & 0001000100010001 \\ 0000011010101011 & 0000111110000111 & 0101010101010101 \\ 0000010101100011 & 0000000011111111 & 0011001100110011 \\ 0001000100010001 & 0000000110101011 & 0000111100001111 \end{bmatrix}.$$

21. The method as claimed in claim 20, wherein the deinterleaving scheme is defined to correspond to an interleaving scheme $\Pi(r)$ as shown in:

| $\Pi(r)$ | 9, 7, 14, 15, 10, 1, 2, 5, 3, 8, 0, 4, 13, 11, 6, 12, 27, 29, 21, 18, 16, 25, 23, 17, 24, 19, 28, 31, 26, 20, 30, 22, 38, 47, 41, 42, 37, 46, 39, 45, 32, 34, 40, 33, 35, 43, 36, 44, |
|---|---| wherein each number in the table indicates an index of a sub-carrier to which an element of the block code is one-to-one mapped.

22. The method as claimed in claim 21, wherein the setup sequence is set to have a minimum Peak to Average Power Ratio (PAPR) for the reference signal.

23. An apparatus for receiving a reference signal for identification of each cell in a communication system including a plurality of cells each of which is identified by a cell identifier, the apparatus comprising:
- a Fast Fourier Transform (FFT) unit for performing an FFT operation on a received signal;
- a reference signal extractor for extracting the reference signal from the FFT-processed signal;
- an adder for dividing the reference signal into a predetermined number of intervals and performing an exclusive OR (XOR) operation on the divided intervals;
- a deinterleaver for deinterleaving the XOR-processed signal according to at least one deinterleaving scheme;
- a sub-block divider for dividing the deinterleaved signal into sub-block signals in accordance with a predetermined block code generator matrix;
- a block code decoder for performing an Inverse Fast Hadamard Transform (IFHT) using mask sequences generated according to control of each of the sub-block signals;
- a combiner for generating a combined signal by combining the IFHT-processed signals for each of the sub-block signals; and
- a comparison selector for determining a cell identifier corresponding to a block code having a maximum correlation value from among the combined signals as a final cell identifier, wherein the reference signal of the frequency domain is defined by:

$$P_{ID_{cell},S}[k] = \begin{cases} \sqrt{2}(1 - 2q_{ID_{cell},S}[m]), & k = 2m - \frac{N_{used}}{2}, \\ & m = 0, 1, \ldots, \frac{N_{used}}{4} - 1 \\ \sqrt{2}(1 - 2q_{ID_{cell},S}[m-1]), & k = 2m - \frac{N_{used}}{2}, \\ & m = \frac{N_{used}}{4} + 1, \frac{N_{used}}{4} + 2, \ldots, \frac{N_{used}}{2} \\ 0, & \text{otherwise} \end{cases}$$

$$ID_{cell} \in \{0, 1, \ldots, 126\}, s \in \{0, 1, \ldots, 7\},$$

$$k \in \{-N_{FFT}/2, -N_{FFT}/2 + 1, \ldots, N_{FFT}2 - 1\},$$

where $P_{ID_{cell},S}[k]$ denotes the reference signal of the frequency domain, $ID_{cell}$ denotes the cell identifier, s denotes the sector identifier, k denotes a sub-carrier index, $N_{used}$ denotes a number of used subcarriers, $N_{FFT}$ denotes a number of points of the FFT operation, and $q_{IDcell,S}[m]$ denotes a setup sequence.

24. The apparatus as claimed in claim 23, wherein the reference signal extractor extracts the reference signal by eliminating a predetermined sequence from a signal received through M sub-carriers other than sub-carriers corresponding to DC components and intersubcarrier interference eliminating components from among N sub-carriers.

25. The apparatus as claimed in claim 24, wherein the eliminating is performed in consideration of a predetermined offset that is set to have a specific value for each of the cells and sectors.

26. The apparatus as claimed in claim 23, wherein the setup sequence is defined by:

$$q_{ID_{cell},S}[m] = \begin{cases} R\left(8 * \left\lfloor \frac{m}{9} \right\rfloor + m \bmod 9\right), & \text{where } m \bmod 9 = 0, 1, \ldots, 7 \\ & m = 0, 1, \ldots, 53 \\ T\left(\left\lfloor \frac{m}{9} \right\rfloor\right), & \text{where } m \bmod 9 = 8 \end{cases},$$

wherein $$\left\lfloor \frac{m}{9} \right\rfloor$$

represents a maximum integer not greater than $$\frac{m}{9}.$$

and R(r) is defined by:

$$R(r) = w^s_{r \bmod 8} \oplus b_{IDcell+1} g_{\Pi(r)},$$

$$r = 8 * \left\lfloor \frac{m}{9} \right\rfloor + m \bmod 9 = 0, 1, \ldots, 47,$$

wherein $w^s_{r \bmod 8}$ represents repetition of Walsh codes having a length of 8, $b_k$ ($1 \leq k \leq 47$) represents a k-th row vector of the block code generator matrix, k represents a value calculated by adding a cell identifier IDcell and '1', $g_u$ ($0 \leq u \leq 47$) represents a u-th column vector of the block code generator matrix, u represents indicating an r-th element of an interleaving pattern according to a deinterleaving scheme $\Pi(r)$, R(r) denotes a first sequence, and T(−) denotes a second sequence.

27. The apparatus as claimed in claim 23, wherein the block code generator matrix is defined as:

$$G = [g_0 g_1 \ldots g_{47}] =$$

$$\begin{bmatrix}
01010101010101010 & 00001010110001 & 00000000111111111 \\
00110011001100110 & 00100010001001 & 00000001101010110 \\
00001111000011110 & 10101010101010 & 00001010110011 \\
00000000111111110 & 01100110011001 & 00010001000010001 \\
00000011010101010 & 00001111000011 & 11010101010101010 \\
00000101011000110 & 00000000111111 & 10011001100110011 \\
00010001000100010 & 00000110101011 & 00000111100001111
\end{bmatrix}$$

28. The apparatus as claimed in claim 27, wherein the deinterleaving scheme corresponds to an interleaving scheme $\Pi(r)$ as shown in:

| $\Pi(r)$ | 9, 7, 14, 15, 10, 1, 2, 5, 3, 8, 0, 4, 13, 11, 6, 12, 27, 29, 21, 18, 16, 25, 23, 17, 24, 19, 28, 31, 26, 20, 30, 22, 38, 47, 41, 42, 37, 46, 39, 45, 32, 34, 40, 33, 35, 43, 36, 44, |
|---|---| wherein each number in the table indicates an index of a sub-carrier to which an element of the block code is one-to-one mapped.

29. The apparatus as claimed in claim 28, wherein the setup sequence is set to have a minimum Peak to Average Power Ratio (PAPR) for the reference signal.

30. A method for transmitting a reference signal for identification of each cell through at least one transmit antenna in a communication system including a plurality of cells each of which is identified by a cell identifier, the method comprising:
receiving a cell identifier;
generating, by a block code encoder, a block code corresponding to the cell identifier by using a predetermined block code generator matrix;
selecting a Walsh code corresponding to the cell identifier from among predetermined Walsh codes, and repeating the selected Walsh code a predetermined number of times;
interleaving, by an interleaver, the block code according to at least one interleaving scheme and performing, by an adder, an exclusive OR operation on the interleaved block code and the repeated Walsh code, thereby generating a first part sequence;
selecting a second part sequence corresponding to the cell identifier from among predetermined sequences;
generating, by a combiner, a reference signal of a frequency domain by using the first part sequence and the second part sequence; and
converting, by a transmitter, the reference signal of the frequency domain to a reference signal of a time domain through an Inverse Fast Fourier Transform (IFFT) operation and then transmitting the reference signal of the time domain in a predetermined reference signal transmission interval,
wherein the reference signal of the frequency domain is defined by:

$$P_{ID_{cell,n}}[k] = \begin{cases} 1 - 2q_{ID_{cell}}[m], & k = N_t m - \frac{N_{used}}{2} + n, \\ & m = 0, 1, \ldots, \frac{N_{used}}{N_t} - 1 \\ 0, & \text{otherwise} \end{cases}$$

$$ID_{cell} \in \{0, 1, \ldots, 126\}, n = 0, 1, \ldots N_t - 1,$$

$$k \in \left\{-\frac{N_{FFT}}{2}, -\frac{N_{FFT}}{2} + 1, \ldots, \frac{N_{FFT}}{2} - 1\right\},$$

where $P_{ID_{cell,S}}[k]$ denotes the reference signal, $ID_{cell}$ denotes the cell identifier, n denotes an index of one of the transmit antennas, k denotes a sub-carrier index, $N_{FFT}$ denotes a number of points of the IFFT operation, $N_{used}$ denotes a number of used subcarriers, $N_t$ indicates a number of the transmit antennas, and $q_{IDcell,S}[m]$ denotes a setup sequence.

31. The method as claimed in claim 30, wherein the block code generator matrix includes b number of sub-blocks, each of which includes c number of Walsh bases and d number of mask sequences.

32. The method as claimed in claim 31, wherein the b sub-blocks including a first sub-block to a b-th sub-block have a relation of cyclic shift between each other, so as to maximize the minimum distance of the block code generated by using the block code generator matrix.

33. The method as claimed in claim 31, wherein the step of interleaving comprises the steps of:
dividing the block code into the b sub-blocks; and
interleaving the b sub-blocks according to b number of interleaving schemes differently set for the b sub-blocks.

34. The method as claimed in claim 33, wherein the step of converting comprises the steps of:
inserting null data into sub-carriers corresponding to DC components and intersubcarrier interference eliminating components from among N sub-carriers;
inserting elements of the reference signal into M sub-carriers other than the sub-carriers into which the null data is inserted from among the N sub-carriers; and
performing an Inverse Fast Fourier Transform (IFFT) operation on a signal including the reference signal elements and the M sub-carriers.

35. The method as claimed in claim 33, wherein the step of converting comprises the steps of:
inserting null data into sub-carriers corresponding to DC components and intersubcarrier interference eliminating components from among N sub-carriers;
inserting elements of the reference signal into M sub-carriers other than the sub-carriers into which the null data is inserted from among the N sub-carriers, in consideration of a predetermined offset; and
performing an IFFT operation on a signal including the reference signal elements and the M sub-carriers and then transmitting the signal.

36. The method as claimed in claim 35, wherein the offset is set to have a specific value for each of the cells and sectors.

37. The method as claimed in claim 30, wherein the setup sequence is defined by:

$$q_{ID_{cell}}[m] = \begin{cases} R\left(8*\left\lfloor \frac{m}{9} \right\rfloor + m \bmod 9\right), & \text{where } m \bmod 9 = 0, 1, \ldots, 7 \\ & m = 0, 1, \ldots, \frac{N_{used}}{N_t} - 1 \\ T\left(\left\lfloor \frac{m}{9} \right\rfloor\right), & \text{where } m \bmod 9 = 8 \end{cases}$$

wherein $\left\lfloor \frac{m}{9} \right\rfloor$ represents a maximum integer not greater than $\frac{m}{9}$, R(r) denotes a first sequence, and T(-) denotes a second sequence.

38. The method as claimed in claim 37, wherein R(r) is defined by an equation, $$R(r) = B_{IDcell+1} g_{\Pi(r)}, \; r = 8*\left\lfloor \frac{m}{9} \right\rfloor + m \bmod 9 = 0, 1, \ldots, 47,$$

wherein the number of the transmit antennas is two, the number of operation points of the FFT operation is 128, $b_k$ represents a k-th row vector of the block code generator matrix, k represents a value calculated by adding a cell identifier IDcell and 1, $g_u$ ($0 \leq u \leq 47$) represents a u-th column vector of the block code generator matrix, and u represents indicating an r-th element of a interleaving pattern according to an interleaving scheme $\Pi(r)$.

39. The method as claimed in claim 38, wherein the block code generator matrix is defined as:

G = [g₀g₁ ... g₄₇] =

$$\begin{bmatrix} 0101010101010101 & 0000010101100011 & 0000000011111111 \\ 0011001100110011 & 0001000100010001 & 0000000110101110 \\ 0000111100001111 & 0101010101010101 & 0000010101100011 \\ 0000000011111111 & 0011001100110011 & 0001000100010001 \\ 0000001101010110 & 0000111100001111 & 0101010101010101 \\ 0000010101100011 & 0000000011111111 & 0011001100110011 \\ 0001000100010001 & 0000001101010110 & 0000111100001111 \end{bmatrix}.$$

40. The method as claimed in claim 38, wherein the interleaving scheme is defined by $\Pi(r)$ as shown in:

Π(l)  5, 6, 4, 10, 7, 2, 14, 0, 8, 11, 13, 12, 3, 15, 1, 9, 26, 29, 19, 27, 31, 17, 20, 16, 23, 28, 24, 21, 18, 30, 25, 22, 43, 46, 34, 47, 44, 41, 37, 36, 39, 38, 35, 33, 32, 45, 40, 42, wherein each number in the table indicates an index of a sub-carrier to which an element of the block code is one-to-one mapped.

41. The method as claimed in claim 38, wherein T(k) has one of values as expressed in:

| ID cell | sequence | papr |
| --- | --- | --- |
| 0 | 1 1 1 0 1 1 | 6.67057 |
| 1 | 0 0 1 1 0 0 | 5.883 |
| 2 | 1 1 1 1 1 1 | 4.95588 |
| 3 | 0 1 1 0 0 1 | 4.92942 |
| 4 | 1 0 0 1 0 0 | 4.84232 |
| 5 | 0 1 0 1 0 0 | 5.97707 |
| 6 | 0 0 0 0 1 1 | 5.2818 |
| 7 | 0 1 1 1 0 1 | 4.62935 |
| 8 | 1 1 1 1 0 1 | 4.80191 |
| 9 | 0 1 1 1 1 0 | 4.62839 |
| 10 | 1 0 0 0 0 0 | 4.93818 |
| 11 | 0 0 0 0 1 0 | 4.62239 |
| 12 | 1 1 0 0 1 1 | 5.23206 |
| 13 | 0 0 0 0 0 1 | 4.76556 |
| 14 | 1 1 0 1 1 1 | 5.21957 |
| 15 | 0 1 1 0 0 0 | 6.73261 |
| 16 | 0 0 1 1 1 0 | 4.9981 |
| 17 | 0 1 1 0 0 0 | 5.23977 |
| 18 | 1 1 1 1 1 0 | 5.59862 |
| 19 | 0 1 1 1 0 1 | 6.75846 |
| 20 | 0 0 1 1 1 1 | 4.86729 |
| 21 | 1 1 0 0 0 0 | 5.57405 |
| 22 | 1 0 1 0 0 1 | 4.82309 |
| 23 | 0 1 0 1 0 1 | 4.54948 |
| 24 | 0 1 1 1 0 1 | 5.45765 |
| 25 | 1 1 0 0 0 1 | 4.91648 |
| 26 | 1 0 0 1 0 1 | 3.95813 |
| 27 | 1 0 0 0 0 1 | 6.03433 |
| 28 | 1 1 0 0 0 1 | 4.50629 |
| 29 | 0 1 0 0 0 1 | 4.80454 |
| 30 | 1 0 1 1 1 1 | 4.94614 |
| 31 | 1 0 1 1 0 0 | 4.54236 |
| 32 | 0 1 1 0 0 0 | 5.66311 |
| 33 | 0 1 1 0 0 0 | 5.18297 |
| 34 | 1 1 0 1 0 1 | 5.59197 |
| 35 | 1 0 0 1 0 0 | 5.51692 |
| 36 | 1 1 0 0 1 0 | 4.64969 |
| 37 | 1 1 1 0 0 0 | 5.59862 |
| 38 | 0 0 0 0 1 1 | 5.56593 |
| 39 | 1 0 1 0 0 0 | 6.65257 |
| 40 | 0 0 1 0 1 1 | 6.30837 |
| 41 | 0 0 0 1 0 1 | 5.76988 |
| 42 | 0 0 0 1 1 1 | 5.17799 |
| 43 | 1 0 0 1 1 0 | 5.50595 |
| 44 | 0 0 0 0 0 1 | 5.58222 |
| 45 | 1 1 1 0 1 1 | 5.19814 |
| 46 | 1 0 0 1 1 0 | 5.50865 |
| 47 | 1 0 0 0 0 0 | 5.40509 |
| 48 | 1 0 0 1 0 0 | 4.48416 |
| 49 | 0 1 0 0 1 1 | 5.59862 |
| 50 | 0 1 0 1 0 0 | 4.76609 |
| 51 | 0 1 1 1 0 1 | 4.87035 |
| 52 | 1 1 1 1 0 0 | 5.60052 |
| 53 | 1 0 1 0 0 1 | 4.18939 |
| 54 | 1 1 1 1 0 1 | 5.00411 |
| 55 | 1 1 1 1 0 0 | 4.91284 |
| 56 | 0 0 0 0 1 0 | 6.92296 |
| 57 | 0 0 0 0 1 0 | 5.39012 |
| 58 | 0 1 1 0 0 1 | 6.0232 |
| 59 | 1 1 0 1 0 0 | 5.27241 |
| 60 | 0 0 1 0 1 0 | 5.26582 |
| 61 | 1 0 0 0 0 1 | 5.47146 |
| 62 | 0 0 0 0 1 0 | 6.43249 |
| 63 | 1 0 0 1 1 1 | 4.69906 |
| 64 | 1 1 1 1 0 0 | 5.28969 |
| 65 | 1 0 1 0 1 1 | 6.66965 |
| 66 | 1 0 1 0 1 1 | 5.90593 |
| 67 | 0 1 1 1 0 0 | 6.13642 |
| 68 | 0 0 1 0 0 0 | 4.9337 |
| 69 | 0 1 1 0 1 0 | 5.19715 |

-continued

| ID cell | sequence | papr |
|---|---|---|
| 70 | 1 1 1 1 0 0 | 5.05877 |
| 71 | 1 0 0 1 0 0 | 5.42538 |
| 72 | 1 1 1 0 1 0 | 5.21428 |
| 73 | 1 0 1 1 0 1 | 4.27288 |
| 74 | 0 1 0 0 0 1 | 4.63478 |
| 75 | 1 0 1 1 0 1 | 5.47216 |
| 76 | 1 0 1 0 0 0 | 6.48514 |
| 77 | 1 1 0 0 0 0 | 5.95897 |
| 78 | 0 0 0 0 0 1 | 5.59862 |
| 79 | 0 1 0 0 0 0 | 5.36634 |
| 80 | 0 0 0 0 1 0 | 4.79522 |
| 81 | 0 0 1 1 1 0 | 5.03585 |
| 82 | 1 1 0 0 1 1 | 6.41538 |
| 83 | 0 1 1 0 0 1 | 5.92329 |
| 84 | 1 0 1 1 1 0 | 5.24541 |
| 85 | 0 0 0 0 0 1 | 6.41868 |
| 86 | 1 0 1 0 1 1 | 5.47231 |
| 87 | 0 1 0 1 1 1 | 4.27052 |
| 88 | 0 0 0 1 0 1 | 4.98455 |
| 89 | 0 0 0 1 0 1 | 4.85573 |
| 90 | 1 0 1 1 0 0 | 4.66224 |
| 91 | 0 1 1 0 0 1 | 5.59862 |
| 92 | 0 1 0 1 0 1 | 5.13782 |
| 93 | 1 1 0 9 0 0 | 5.73599 |
| 94 | 0 1 1 1 1 1 | 6.91115 |
| 95 | 0 1 1 1 0 1 | 4.76096 |
| 96 | 0 1 0 1 1 1 | 4.43229 |
| 97 | 1 0 0 1 1 1 | 4.52951 |
| 98 | 1 0 0 1 0 0 | 4.16266 |
| 99 | 1 1 1 0 1 0 | 5.72573 |
| 100 | 0 1 0 1 0 0 | 4.34746 |
| 101 | 1 0 0 1 0 0 | 6.81937 |
| 102 | 0 1 0 1 1 1 | 5.86829 |
| 103 | 0 1 0 1 1 0 | 5.22098 |
| 104 | 1 0 0 0 0 0 | 4.8724 |
| 105 | 0 1 1 0 1 1 | 6.7658 |
| 106 | 1 0 0 0 1 0 | 5.75267 |
| 107 | 1 1 0 0 1 1 | 5.1796 |
| 108 | 1 1 1 1 0 0 | 6.00083 |
| 109 | 1 0 1 0 0 1 | 4.6724 |
| 110 | 1 0 0 1 0 0 | 4.8945 |
| 111 | 0 0 1 1 1 0 | 4.05646 |
| 112 | 0 0 1 1 1 1 | 5.6271 |
| 113 | 0 1 1 1 1 1 | 5.59862 |
| 114 | 1 1 0 0 1 0 | 4.80494 |
| 115 | 0 0 1 1 0 0 | 5.95286 |
| 116 | 0 1 1 0 1 1 | 5.99303 |
| 117 | 0 1 0 0 1 1 | 3.97648 |
| 118 | 0 1 0 1 0 0 | 5.71222 |
| 119 | 0 0 0 0 1 1 | 4.61998 |
| 120 | 1 1 1 1 1 0 | 4.67909 |
| 121 | 1 0 0 1 1 0 | 5.53328 |
| 122 | 0 0 0 1 1 0 | 5.20303 |
| 123 | 0 1 1 0 0 0 | 5.00679 |
| 124 | 1 0 1 1 1 0 | 4.57847 |
| 125 | 0 1 1 1 0 0 | 4.79082 |
| 126 | 1 1 0 1 0 0 | 4.91901. |

42. The method as claimed in claim 38, wherein $q_{IDcell}[m]$ has one of values as expressed in:

| ID cell | sequence | papr |
|---|---|---|
| 0 | 88B7E232CDC83C | 6.67057 |
| 1 | 5E260E301C4620 | 5.883 |
| 2 | D691EC22D18E1C | 4.95588 |
| 3 | EA1A5F3245640C | 4.92942 |
| 4 | 62ADBD0098A430 | 4.84232 |
| 5 | B43C5102592228 | 5.97707 |
| 6 | 3C0BB31084EA14 | 5.2818 |
| 7 | 127AEE31B90504 | 4.62935 |
| 8 | 9ACD4C2374C53C | 4.80191 |
| 9 | 4C5CE021B54B20 | 4.62839 |
| 10 | C4EB0213688318 | 4.93818 |
| 11 | F860B103EC6908 | 4.62239 |
| 12 | 70D7531121A934 | 6.23206 |
| 13 | A646BF13E0272C | 4.76556 |
| 14 | 2EF15D013DEF14 | 5.21957 |
| 15 | 4A30D2BAA965A0 | 6.73261 |
| 16 | C20730A874AD98 | 4.9981 |
| 17 | 1416DCAAA52380 | 5.23977 |
| 18 | 9CA17EB878EBB8 | 5.59862 |
| 19 | A02ACDA8FC01AC | 6.75846 |
| 20 | 281D2FBA31C994 | 4.86729 |
| 21 | FE8CC398E04788 | 5.57405 |
| 22 | 76BB21AA2D87B4 | 4.82303 |
| 23 | 584A7C8B1060A4 | 4.54948 |
| 24 | D07DDEB9DDA09C | 5.45765 |
| 25 | 06EC729B0C2684 | 4.91648 |
| 26 | 8EDB9089D1E6BC | 3.95813 |
| 27 | B2D023994504AC | 6.03433 |
| 28 | 3AE7C18B88C494 | 4.50629 |
| 29 | EC766D8949428C | 4.80454 |
| 30 | 64C18FBB948AB4 | 4.94614 |
| 31 | 9A82B62CDF0708 | 4.54236 |
| 32 | 1235543E02C730 | 3.86311 |
| 33 | C424F83CC34128 | 5.18297 |
| 34 | 4C935A0E1E8114 | 5.59137 |
| 35 | 7098A91E9A6300 | 5.51632 |
| 36 | F8AF4B0C47AB38 | 4.64969 |
| 37 | 2EBEE72E862520 | 5.59862 |
| 38 | A609051C4BED1C | 6.56393 |
| 39 | 88F8183D660208 | 6.63257 |
| 40 | 004FBA2FABCA34 | 6.30837 |
| 41 | D65E160D7A442C | 5.76388 |
| 42 | 5E69B41FB78C14 | 5.17733 |
| 43 | 62E2070F336E00 | 6.50695 |
| 44 | EA55A51DEEA63C | 5.58222 |
| 45 | 3CC4493F2F2824 | 5.19814 |
| 46 | B4F3AB0DF2E818 | 5.50865 |
| 47 | D0B224966662A8 | 5.40503 |
| 48 | 58858684BBA290 | 4.48416 |
| 49 | 8E146A866A2C8C | 5.59862 |
| 50 | 0623C894B7E4B0 | 4.76609 |
| 51 | 3A287BA43306A4 | 4.87033 |
| 52 | B29FD9B6EEC69C | 5.60052 |
| 53 | 648E35B42F4084 | 4.18939 |
| 54 | ECB9D7A6F280BC | 5.00411 |
| 55 | C2C8CAA7DF67A8 | 4.91284 |
| 56 | 4A7F289502AF90 | 6.92296 |
| 57 | 9C6E8497C32988 | 5.39012 |
| 58 | 145966A50EE1B4 | 6.0232 |
| 59 | 28D2D5959A03A0 | 6.27241 |
| 60 | A06537A747CB98 | 5.26582 |
| 61 | 76F49B85864584 | 5.47146 |
| 62 | FE4339974B8DB8 | 6.43249 |
| 63 | 08A61410F5BE24 | 4.69906 |
| 64 | 8091F622287618 | 5.28969 |
| 65 | 56801A20E9F804 | 6.66865 |
| 66 | DEB7B83224383C | 5.90593 |
| 67 | E23C4B22B0D228 | 6.13642 |
| 68 | 6A0BA9306D1210 | 4.9337 |
| 69 | BC1A4532AC9C08 | 5.13715 |
| 70 | 34ADE720715430 | 5.05877 |
| 71 | 1ADCBA015CB320 | 5.42538 |
| 72 | 92EB5833817B18 | 5.21428 |
| 73 | 44FAB43150F504 | 4.27288 |
| 74 | CC4D56038D353C | 4.63478 |
| 75 | F0C6A53309D72C | 5.47216 |
| 76 | 78F10721C41710 | 6.49514 |
| 77 | AEE0EB03059108 | 5.35897 |
| 78 | 26570911C85134 | 5.59862 |
| 79 | 4216C68A4CD380 | 5.36634 |
| 80 | CA212498811BB8 | 4.79522 |
| 81 | 1C3088BA509DA0 | 5.03585 |
| 82 | 94876A888D5D9C | 6.41538 |
| 83 | A80CD9B809B78C | 5.92329 |
| 84 | 20BB3BAAD47FB0 | 5.24541 |
| 85 | F62A978805F1AC | 6.41868 |
| 86 | 7E9D35BAC83994 | 5.47231 |

-continued

| ID cell | sequence | papr |
|---|---|---|
| 87 | 506C689BF5DE84 | 4.27052 |
| 88 | D85B8A893816BC | 4.98455 |
| 89 | 0E4A268BF990A4 | 4.85573 |
| 90 | 86FD84B9345098 | 4.66224 |
| 91 | BA7677A9A0B28C | 5.59862 |
| 92 | 3241D59B7D72B4 | 5.13782 |
| 93 | E4D07999ACF4A8 | 5.73533 |
| 94 | 6C67DBAB713C94 | 6.31115 |
| 95 | 9224E23C3AB12C | 4.76096 |
| 96 | 1A13400EF77914 | 4.43229 |
| 97 | CC82AC0C36FF0C | 4.52351 |
| 98 | 44B50E1EFB3730 | 4.16266 |
| 99 | 78BEFD2E6FDD20 | 5.72573 |
| 100 | F0095F1CB21518 | 4.34746 |
| 101 | 2698B31E739300 | 6.81937 |
| 102 | AE2F510CBE5B3C | 5.86829 |
| 103 | 805E4C0D93BC28 | 5.22038 |
| 104 | 08E9AE1F4E7410 | 4.8724 |
| 105 | DE78423D8FFA0C | 6.7858 |
| 106 | 56CFA00F423A30 | 5.75267 |
| 107 | 6AC4531FC6D824 | 5.1796 |
| 108 | E2F3F12D0B1018 | 6.00083 |
| 109 | 34E21D2FCA9604 | 4.6724 |
| 110 | BCD5BF1D175638 | 4.8345 |
| 111 | D81430A693DC88 | 4.05646 |
| 112 | 502392B45E1CB4 | 5.6271 |
| 113 | 86327EB69F9AAC | 5.59862 |
| 114 | 0E85DC84425A90 | 4.90494 |
| 115 | 320E2FB4D6B080 | 5.95286 |
| 116 | BA39CDA60B70BC | 5.99303 |
| 117 | 6C286184CAFEA4 | 3.97648 |
| 118 | E41FC396173698 | 5.71222 |
| 119 | CA6E9E972AD98C | 4.61398 |
| 120 | 42D97CA5F719B0 | 4.67909 |
| 121 | 94C89087369FA8 | 5.53328 |
| 122 | 1C7F3295FB5F90 | 5.20303 |
| 123 | 2074C1A56FB580 | 5.00679 |
| 124 | A8C323B7B27DB8 | 4.57847 |
| 125 | 7E52CFB573F3A0 | 4.79082 |
| 126 | F6E56D87BE3398 | 4.91901. |

43. The method as claimed in claim 38, wherein the interleaving scheme is defined by $\Pi(r)$ as shown in:

| $\Pi(l)$ | 11, 4, 12, 15, 0, 13, 5, 6, 14, 8, 10, 9, 1, 3, 2, 7, 16, 20, 31, 26, 22, 30, 27, 23, 19, 18, 17, 25, 21, 29, 24, 28, |
|---|---| wherein each number in the table indicates an index of a sub-carrier to which an element of the block code is one-to-one mapped.

44. The method as claimed in claim 37, wherein R(r) is defined:

$$R(r) = b_{IDcell+1} g_{\Pi(r)}, \ r = 8 * \left\lfloor \frac{m}{9} \right\rfloor + m \bmod 9 = 0, 1, \ldots, 31,$$

wherein the number of the transmit antennas is three, the number of operation points of the FFT operation is 128, $b_k$ represents a k-th row vector of the block code generator matrix, k represents a value calculated by adding a cell identifier IDcell and 1, $g_u$ ($0 \leq u \leq 47$) represents a u-th column vector of the block code generator matrix, and u represents indicating an r-th element of a interleaving pattern according to an interleaving scheme $\Pi(r)$.

45. The method as claimed in claim 44, wherein the block code generator matrix is defined as:

$$G = [g_0 g_1 \ldots g_{31}]$$

$$= \begin{bmatrix} 0101010101010101000001010110011 \\ 0011001100110011000100010001 \\ 00001111000011110101010101010101 \\ 0000000011111111001100110011 \\ 000001101010110000011100001111 \\ 00000101011000110000000011111111 \\ 0001000100010001000001101010110 \end{bmatrix}.$$

46. The method as claimed in claim 44, wherein T(k) has one of values as expressed in:

| ID cell | sequence | papr |
|---|---|---|
| 0 | 0 0 1 1 | 4.49505 |
| 1 | 0 1 1 0 | 4.11454 |
| 2 | 0 1 1 0 | 5.0206 |
| 3 | 1 1 0 0 | 5.06895 |
| 4 | 0 0 0 0 | 4.51602 |
| 5 | 1 0 1 0 | 4.96176 |
| 6 | 0 0 0 1 | 4.50134 |
| 7 | 0 1 0 0 | 5.29586 |
| 8 | 1 1 1 1 | 5.37387 |
| 9 | 1 0 0 0 | 4.6668 |
| 10 | 0 1 1 0 | 6.09482 |
| 11 | 0 0 0 1 | 6.11344 |
| 12 | 0 0 0 0 | 5.71868 |
| 13 | 0 0 0 0 | 4.12233 |
| 14 | 0 1 1 1 | 4.44864 |
| 15 | 1 0 1 0 | 4.42172 |
| 16 | 1 0 0 0 | 4.43697 |
| 17 | 0 1 1 0 | 5.96559 |
| 18 | 0 0 1 0 | 5.31882 |
| 19 | 1 1 1 0 | 5.1578 |
| 20 | 0 0 1 1 | 4.18834 |
| 21 | 1 1 0 0 | 5.74259 |
| 22 | 1 0 1 0 | 6.10238 |
| 23 | 1 1 1 0 | 4.50063 |
| 24 | 1 0 0 1 | 4.38448 |
| 25 | 1 1 0 1 | 4.33171 |
| 26 | 1 0 0 1 | 6.31759 |
| 27 | 1 1 1 0 | 6.33599 |
| 28 | 1 1 0 1 | 4.55537 |
| 29 | 0 1 0 0 | 4.83803 |
| 30 | 1 0 1 1 | 4.45342 |
| 31 | 1 0 1 0 | 5.12448 |
| 32 | 1 0 0 0 | 4.43697 |
| 33 | 0 0 0 1 | 4.90907 |
| 34 | 1 0 0 1 | 3.9985 |
| 35 | 1 0 1 0 | 6.0206 |
| 36 | 0 0 0 1 | 5.38301 |
| 37 | 1 0 0 0 | 3.66487 |
| 38 | 1 0 1 1 | 4.92205 |
| 39 | 0 1 1 1 | 5.53843 |
| 40 | 0 1 1 1 | 5.26838 |
| 41 | 1 1 0 1 | 5.16959 |
| 42 | 0 1 1 0 | 5.34282 |
| 43 | 0 0 0 0 | 5.15133 |
| 44 | 1 0 0 1 | 4.87551 |
| 45 | 1 1 1 1 | 4.79443 |
| 46 | 1 0 1 0 | 5.07783 |
| 47 | 0 0 1 0 | 4.99682 |
| 48 | 1 0 1 1 | 5.94242 |
| 49 | 1 0 0 1 | 4.77698 |
| 50 | 1 0 0 0 | 5.03657 |
| 51 | 0 0 1 1 | 4.46604 |
| 52 | 1 0 0 0 | 5.68568 |
| 53 | 1 1 0 1 | 5.01898 |
| 54 | 0 1 1 1 | 4.95591 |
| 55 | 1 0 0 1 | 5.27862 |

-continued

| ID cell | sequence | papr |
|---|---|---|
| 56 | 1 1 1 0 | 6.0317 |
| 57 | 1 0 1 1 | 4.64379 |
| 58 | 1 1 0 0 | 5.02863 |
| 59 | 0 0 0 0 | 6.04332 |
| 60 | 0 0 0 1 | 4.44083 |
| 61 | 0 1 1 1 | 5.23739 |
| 62 | 1 0 1 0 | 6.43278 |
| 63 | 0 1 1 1 | 4.43697 |
| 64 | 1 0 1 1 | 4.43697 |
| 65 | 1 1 1 0 | 4.50516 |
| 66 | 1 0 0 1 | 4.58929 |
| 67 | 0 1 1 0 | 4.85849 |
| 68 | 0 0 0 0 | 5.13149 |
| 69 | 0 0 1 0 | 4.59563 |
| 70 | 0 1 0 1 | 4.73083 |
| 71 | 1 0 0 0 | 4.43697 |
| 72 | 1 0 0 0 | 4.44072 |
| 73 | 1 0 1 0 | 5.47799 |
| 74 | 1 1 1 0 | 4.92135 |
| 75 | 1 0 0 0 | 5.5708 |
| 76 | 1 0 0 0 | 4.48634 |
| 77 | 0 0 0 1 | 5.3005 |
| 78 | 1 0 1 1 | 5.8947 |
| 79 | 1 1 0 0 | 5.38806 |
| 80 | 0 0 1 0 | 4.74777 |
| 81 | 0 1 0 0 | 4.82428 |
| 82 | 1 0 0 0 | 4.45469 |
| 83 | 1 0 1 1 | 5.66832 |
| 84 | 1 1 0 0 | 4.50856 |
| 85 | 1 0 0 1 | 4.97946 |
| 86 | 1 0 1 1 | 4.68484 |
| 87 | 0 1 0 1 | 4.50907 |
| 88 | 1 0 1 0 | 5.38228 |
| 89 | 0 0 1 0 | 5.22999 |
| 90 | 1 1 1 0 | 5.0672 |
| 91 | 0 1 0 0 | 5.59042 |
| 92 | 0 1 0 1 | 4.95926 |
| 93 | 0 0 1 1 | 3.80828 |
| 94 | 1 0 1 1 | 5.40268 |
| 95 | 0 0 1 0 | 5.97897 |
| 96 | 1 0 0 1 | 3.99109 |
| 97 | 1 0 0 1 | 5.06574 |
| 98 | 0 0 0 1 | 6.08269 |
| 99 | 1 0 0 0 | 4.39827 |
| 100 | 0 0 1 1 | 4.70382 |
| 101 | 0 1 0 1 | 4.60731 |
| 102 | 0 1 0 0 | 5.05357 |
| 103 | 1 0 1 0 | 3.30653 |
| 104 | 1 0 1 1 | 4.52546 |
| 105 | 1 1 0 0 | 5.53041 |
| 106 | 0 1 1 0 | 6.04148 |
| 107 | 1 0 1 0 | 4.88727 |
| 108 | 0 0 1 0 | 5.40024 |
| 109 | 1 1 0 0 | 4.566 |
| 110 | 0 1 1 1 | 4.92796 |
| 111 | 1 0 1 1 | 5.17459 |
| 112 | 0 1 0 1 | 4.65719 |
| 113 | 1 1 1 0 | 4.94826 |
| 114 | 1 1 1 0 | 5.62084 |
| 115 | 0 0 1 0 | 4.77778 |
| 116 | 0 1 0 0 | 4.43697 |
| 117 | 0 1 1 0 | 4.24182 |
| 118 | 0 0 0 0 | 6.37234 |
| 119 | 1 1 1 0 | 4.46408 |
| 120 | 0 1 1 0 | 5.23129 |
| 121 | 1 1 0 0 | 5.9557 |
| 122 | 0 0 1 0 | 5.1374 |
| 123 | 1 0 0 0 | 5.35576 |
| 124 | 0 1 0 0 | 4.82596 |
| 125 | 1 1 1 0 | 4.43697 |
| 126 | 1 1 1 0 | 4.74343 |

47. The method as claimed in claim 44, wherein $q_{ID_{cell}}[m]$ has one of values as expressed in:

| ID cell | sequence | papr |
|---|---|---|
| 0 | 960E8D691 | 4.49505 |
| 1 | 9159C8F00 | 4.11454 |
| 2 | 075D46B90 | 6.0206 |
| 3 | 77C0C8D78 | 5.06896 |
| 4 | E14E05948 | 4.51602 |
| 5 | E69300278 | 4.96176 |
| 6 | 701D8D449 | 4.50134 |
| 7 | B4784FD80 | 5.29586 |
| 8 | 22F6C2BB1 | 5.37387 |
| 9 | 25AB87080 | 4.6668 |
| 10 | B3254A6B0 | 6.09432 |
| 11 | C338870F9 | 6.11344 |
| 12 | 55360A4C8 | 5.71868 |
| 13 | 526B0FDF8 | 4.12233 |
| 14 | C465C2BC9 | 4.44864 |
| 15 | 85C89B61A | 4.42172 |
| 16 | 13C61602A | 4.43697 |
| 17 | 141B53B1A | 5.96559 |
| 18 | 82159EF2A | 5.31882 |
| 19 | F28853B62 | 5.1578 |
| 20 | 64069EF53 | 4.18834 |
| 21 | 63DBDB462 | 5.74259 |
| 22 | F5D516252 | 6.10238 |
| 23 | 31B0D4B9A | 4.50063 |
| 24 | A7BE19DAB | 4.38448 |
| 25 | A0E35C49B | 1.33171 |
| 26 | 36ED910AB | 6.31759 |
| 27 | 46F05C6E2 | 6.33599 |
| 28 | D0FED10D3 | 4.55537 |
| 29 | D723D48E2 | 4.83803 |
| 30 | 41AD19FD3 | 4.46342 |
| 31 | 12D88DA2E | 5.12448 |
| 32 | 84D600C1E | 4.45697 |
| 33 | 830B0552F | 4.90907 |
| 34 | 15858811F | 5.9985 |
| 35 | 659805756 | 6.0206 |
| 36 | F31688167 | 5.39301 |
| 37 | F4CB8D856 | 3.66497 |
| 38 | 62C500E67 | 4.92205 |
| 39 | A620C27AF | 5.53849 |
| 40 | 302E4F39F | 5.26838 |
| 41 | 37F34A8AF | 5.16959 |
| 42 | A17DC7E9E | 5.34282 |
| 43 | D1600A8D6 | 5.15133 |
| 44 | 47EE87CE7 | 4.87551 |
| 45 | 40V3C27D7 | 4.79443 |
| 46 | D6VD0F3E6 | 5.07783 |
| 47 | 971016E34 | 4.99682 |
| 48 | 019E9BA05 | 5.94242 |
| 49 | 06C39E135 | 4.77698 |
| 50 | 90CD13504 | 5.03657 |
| 51 | E0509E34D | 4.46604 |
| 52 | 76DE1357C | 5.68568 |
| 53 | 718356C4D | 5.01898 |
| 54 | E70DDBA7D | 4.95591 |
| 55 | 23E8191B5 | 5.27862 |
| 56 | B5E6D4784 | 6.0317 |
| 57 | B2BB91EB5 | 4.64379 |
| 58 | 24B55C884 | 5.02863 |
| 59 | 542891CCC | 6.04332 |
| 60 | C2261C8FD | 4.44083 |
| 61 | C57B593CD | 5.23739 |
| 62 | 53F5947FC | 6.43278 |
| 63 | 9002C3E29 | 4.43697 |
| 64 | 068COEA19 | 4.43697 |
| 65 | 01D14B328 | 4.50516 |
| 66 | 97DF86519 | 4.58929 |
| 67 | E7424B350 | 4.35848 |
| 68 | 714C86560 | 5.13148 |
| 69 | 761183E50 | 4.59563 |
| 70 | E01F4E861 | 4.73083 |
| 71 | 24FA8C1A8 | 4.43697 |
| 72 | B2F4O1598 | 4.44072 |
| 73 | B5A9O4EA8 | 5.47799 |

-continued

| ID cell | sequence | papr |
| --- | --- | --- |
| 74 | 29A7C9A98 | 1.92135 |
| 75 | 53BA04CD0 | 5.5708 |
| 76 | CDB4898E0 | 4.4934 |
| 77 | C2698C1D1 | 5.3005 |
| 78 | 54E7D17E1 | 5.8947 |
| 79 | 15CA58832 | 5.38806 |
| 80 | 834495E02 | 4.74777 |
| 81 | 8419D0532 | 4.82428 |
| 82 | 12971D102 | 4.45469 |
| 83 | 628A9074B | 5.66892 |
| 84 | F4845D17A | 4.50856 |
| 85 | F3D91884B | 4.97946 |
| 86 | 65D795E7B | 4.68484 |
| 87 | A132575B3 | 4.50907 |
| 88 | 37BC9A382 | 2.38228 |
| 89 | 30619FAB2 | 5.22999 |
| 90 | A6EP52E82 | 5.0672 |
| 91 | D672DF8CA | 5.59042 |
| 92 | 407C52CFB | 4.95926 |
| 93 | 4721177CB | 3.80828 |
| 94 | D1AF9A3FB | 5.40268 |
| 95 | 825A0E606 | 5.97897 |
| 96 | 14D483037 | 3.99109 |
| 97 | 138986907 | 5.06574 |
| 98 | 85070BD37 | 6.08269 |
| 99 | F59A8697E | 4.39827 |
| 100 | 63140BF4F | 4.70382 |
| 101 | 64494E47F | 4.60731 |
| 102 | F247C304E | 5.05357 |

-continued

| ID cell | sequence | papr |
| --- | --- | --- |
| 103 | 36A201B86 | 3.30653 |
| 104 | A0AC9CFB7 | 4.52546 |
| 105 | A7F1C9486 | 5.53041 |
| 106 | 317F442B6 | 6.04148 |
| 107 | 41E2896FE | 4.68727 |
| 108 | D76C042CE | 5.40024 |
| 109 | D0B1419FE | 4.566 |
| 110 | 463FCCFCF | 4.92796 |
| 111 | 07929521D | 5.17459 |
| 112 | 911C5842D | 4.65719 |
| 113 | 96C15DF1C | 4.94826 |
| 114 | 00CFD0B2C | 5.62084 |
| 115 | 70521DF64 | 4.77778 |
| 116 | E65CD0954 | 4.43697 |
| 117 | E101D5264 | 4.24182 |
| 118 | 770F18454 | 6.37234 |
| 119 | B3EADAF9C | 4.46408 |
| 120 | 256457BAC | 5.23129 |
| 121 | 22B95209C | 5.9557 |
| 122 | B4379F6AC | 5.1374 |
| 123 | C4AA120E4 | 5.35576 |
| 124 | 5224DF4D4 | 4.82596 |

-continued

| ID cell | sequence | papr |
| --- | --- | --- |
| 125 | 55F9DAFE4 | 4.43697 |
| 126 | C3F757BD4 | 4.74343. |

48. The method as claimed in claim 37, wherein R(r) is defined by:

$$R(r) = B_{IDcell+1} g_{\Pi(r)}, \; r = 8*\left\lfloor \frac{m}{9} \right\rfloor + m \bmod 9 = 0, 1, \ldots, 95,$$

wherein the number of the transmit antennas is four, the number of operation points of the FFT operation is 512, $b_k$ represents a k-th row vector of the block code generator matrix, k represents a value calculated by adding a cell identifier IDcell and 1, $g_u$ ($0 \leq u \leq 47$) represents a u-th column vector of the block code generator matrix, and u represents indicating a r-th element of a interleaving pattern according to the interleaving scheme $\Pi(r)$.

49. The method as claimed in claim 48, wherein the block code generator matrix is defined as:

$$G = [g_0 g_1 \ldots g_{95}]$$

$$= \begin{bmatrix}
0101010101010101000100010001000010000010101100011000000110101011000000000111111110000111100001111 \\
0011001100110011010101010101010100010001000100010000001010110001100000011010101100000000011111111 \\
0000111100001111001100110011001101010101010101010001000100010001000000010101100011000000110101010110 \\
0000000011111111000011110000111100110011001100110101010101010101000100010001000100000010101100011 \\
000000110101011000000000111111110000111100001111001100110011001101010101010101010001000100010001 \\
0000010101100011000000110101011000000000111111110000111100001111001100110011001101010101010101010101 \\
0001000100010001000000010101100011000000110101011000000000111111110000111100001111001100110011001100 \\
\end{bmatrix}.$$

50. The method as claimed in claim 48, wherein the interleaving scheme is defined by $\Pi(r)$ as shown in:

| $\Pi(l)$ | 2, 6, 0, 10, 14, 11, 7, 3, 8, 15, 1, 12, 9, 4, 13, 5, 18, 26, 24, 17, 29, 19, 21, 16, 23, 22, 25, 28, 27, 31, 20, 30, 41, 34, 38, 44, 36, 43, 35, 32, 45, 47, 46, 39, 40, 33, 37, 42, 60, 56, 59, 61, 51, 62, 52, 49, 58, 48, 53, 50, 54, 57, 55, 63, 71, 77, 76, 74, 67, 66, 68, 75, 78, 64, 69, 79, 72, 70, 65, 73, 81, 92, 83, 87, 82, 94, 86, 88, 95, 91, 93, 90, 84, 85, 80, 89, |
| --- | --- | wherein each number in the table indicates an index of a sub-carrier to which an element of the block code is one-to-one mapped.

51. The method as claimed in claim 48, wherein T(k) has one of values as expressed in:

| ID cell | sequence | papr |
| --- | --- | --- |
| 0 | CB3 | 6.26336 |
| 1 | D47 | 5.27748 |
| 2 | 59D | 4.9581 |

-continued

| ID cell | sequence | papr |
|---|---|---|
| 3 | F21 | 5.05997 |
| 4 | 87E | 6.51422 |
| 5 | BFA | 5.33856 |
| 6 | 4D4 | 7.0618 |
| 7 | 3E0 | 6.41769 |
| 8 | 3E4 | 4.87727 |
| 9 | 6F7 | 4.15136 |
| 10 | 8D0 | 5.86359 |
| 11 | 33E | 5.68455 |
| 12 | CA3 | 5.79482 |
| 13 | 119 | 5.29216 |
| 14 | AA3 | 5.3423 |
| 15 | EC5 | 5.40257 |
| 16 | A08 | 5.63148 |
| 17 | 96C | 5.44285 |
| 18 | 9D3 | 5.19112 |
| 19 | 5BC | 5.41859 |
| 20 | 4BC | 5.96539 |
| 21 | D15 | 6.07706 |
| 22 | A31 | 4.76142 |
| 23 | 4B3 | 4.67373 |
| 24 | B0A | 5.24324 |
| 25 | BB7 | 4.81109 |
| 26 | 245 | 4.99566 |
| 27 | B34 | 4.81878 |
| 28 | A59 | 5.78273 |
| 29 | 807 | 5.59368 |
| 30 | 694 | 5.53837 |
| 31 | 6C6 | 6.42782 |
| 32 | 1F3 | 5.26429 |
| 33 | 573 | 4.94488 |
| 34 | O7F | 6.36319 |
| 35 | 9A3 | 5.91188 |
| 36 | C86 | 5.36258 |
| 37 | 349 | 4.98064 |
| 38 | C83 | 6.14253 |
| 39 | EE0 | 5.95156 |
| 40 | 4C4 | 5.40169 |
| 41 | 634 | 4.82317 |
| 42 | 360 | 5.05168 |
| 43 | 7B6 | 5.20885 |
| 44 | 4A7 | 5.52378 |
| 45 | 0D4 | 6.47369 |
| 46 | 523 | 5.20757 |
| 47 | F29 | 5.0776 |
| 48 | A67 | 5.52381 |
| 49 | 251 | 5.10732 |
| 50 | B8E | 4.77121 |
| 51 | 580 | 5.38618 |
| 52 | B6B | 5.20069 |
| 53 | DCC | 6.18175 |
| 54 | 356 | 5.46713 |
| 55 | 7FB | 6.23427 |
| 56 | C6B | 4.64117 |
| 57 | 956 | 5.81606 |
| 58 | 100 | 5.04293 |
| 59 | DF0 | 6.56931 |
| 60 | 663 | 5.4996 |
| 61 | 602 | 5.72958 |
| 62 | 894 | 4.96955 |
| 63 | 247 | 5.37554 |
| 64 | 73E | 5.29366 |
| 65 | 0FE | 6.62956 |
| 66 | 5CB | 4.88939 |
| 67 | C59 | 4.30678 |
| 68 | 5B5 | 5.54517 |
| 69 | E2D | 5.27261 |
| 70 | 5F6 | 5.03828 |
| 71 | 9A9 | 5.25379 |
| 72 | BDB | 5.14859 |
| 73 | AE7 | 5.39255 |
| 74 | 2C2 | 4.97124 |
| 75 | 6A3 | 6.20876 |
| 76 | D3A | 4.83271 |
| 77 | 741 | 5.5686 |
| 78 | 737 | 5.64126 |
| 79 | 7AC | 5.17063 |

-continued

| ID cell | sequence | papr |
|---|---|---|
| 80 | 79F | 5.0828 |
| 81 | 3F4 | 5.22885 |
| 82 | 99C | 6.01707 |
| 83 | 755 | 6.51422 |
| 84 | A44 | 4.93486 |
| 85 | F67 | 4.86142 |
| 86 | 4D4 | 6.21941 |
| 87 | 810 | 4.25677 |
| 88 | 201 | 4.47647 |
| 89 | 054 | 6.8165 |
| 90 | 654 | 5.87238 |
| 91 | F34 | 5.31419 |
| 92 | 4FF | 6.88515 |
| 93 | 4AA | 6.75475 |
| 94 | E8D | 6.10937 |
| 95 | 944 | 4.79898 |
| 96 | 478 | 4.77121 |
| 97 | 17E | 5.66118 |
| 98 | 696 | 4.93494 |
| 99 | 31A | 5.36534 |
| 100 | 9D7 | 4.78933 |
| 101 | 2A4 | 5.45932 |
| 102 | 35C | 6.40963 |
| 103 | CBD | 5.39788 |
| 104 | 44C | 4.38835 |
| 105 | 416 | 4.38145 |
| 106 | 6B6 | 5.5007 |
| 107 | E79 | 5.6706 |
| 108 | 34F | 5.62588 |
| 109 | DC4 | 5.29578 |
| 110 | 586 | 5.00808 |
| 111 | DF3 | 4.48385 |
| 112 | F2B | 5.53794 |
| 113 | ED1 | 5.58523 |
| 114 | 686 | 5.71655 |
| 115 | 500 | 5.01001 |
| 116 | BFB | 5.89436 |
| 117 | CB5 | 5.25553 |
| 118 | 99A | 5.47731 |
| 119 | 43D | 5.4871 |
| 120 | 161 | 6.18899 |
| 121 | 32D | 5.35874 |
| 122 | 49D | 5.46312 |
| 123 | 8BD | 5.13605 |
| 124 | 2E9 | 5.70272 |
| 125 | 0F0 | 6.26171 |
| 126 | 144 | 5.50515. |

52. The method as claimed in claim 48, wherein $q_{IDcell}[m]$ has one of values as expressed in:

| ID cell | sequence | papr |
|---|---|---|
| 0 | 07B5C111880B98D21D714C95B59 | 6.26336 |
| 1 | DFA04795906284114EC142D17E3 | 5.27748 |
| 2 | D815C684186918C153B08E44CBB | 4.9581 |
| 3 | 4AABF139B866B0A2069058858C3 | 5.05997 |
| 4 | 4D9E300820652C721BE1945039A | 6.51422 |
| 5 | 958BB6AC380C34B349519A14F20 | 5.33856 |
| 6 | 923E779DA00FAC61552056C1478 | 7.0618 |
| 7 | 1C6D02BAF66B8CE64E89080512A | 6.41769 |
| 8 | 1B5883AB7E68143652F844D0872 | 4.87727 |
| 9 | C34D452F66090CF701484AD46C9 | 4.15136 |
| 10 | C4F8841EEE0A94251D390601D90 | 5.86359 |
| 11 | 5646B3A35E0538464919D0C0BE8 | 5.68455 |
| 12 | 51F37292C60EA09654681C152B1 | 5.79482 |
| 13 | 8966B416DE67B85507D89211C0B | 5.29216 |
| 14 | 8ED33527466C20871AA95E84753 | 5.3423 |
| 15 | 4E855A27A38F94B136C919CC181 | 5.40257 |
| 16 | 49B09B362B8408612AB8D5198D8 | 5.63148 |
| 17 | 91A51D9233E514A27808DB5D462 | 5.44285 |
| 18 | 96909C83BBEE8C7065791788F3B | 5.19112 |
| 19 | 042EEB1E1BE920133159C149942 | 5.41859 |

-continued

| ID cell | sequence | papr |
|---|---|---|
| 20 | 031B6A0F83EAB8C32D288DDC01A | 5.96539 |
| 21 | DB8EEC8B9B83A0007F9803D8CA1 | 6.07706 |
| 22 | DCBB2DBA038038D263E94F0D5F9 | 4.76142 |
| 23 | 5268589D45EC1857794011892AB | 4.67373 |
| 24 | 55DD99ACDDE780856431DD1CBF2 | 5.24324 |
| 25 | 8DC81F28D58E984637815358749 | 4.81109 |
| 26 | 8A7D9E394D8504942AF01FCDC11 | 4.99566 |
| 27 | 18C3A984ED82A8F77FD0494C868 | 4.81878 |
| 28 | 1FF628B56581342563A18599131 | 5.78273 |
| 29 | C7E3AE116DE028E430110BDDF8B | 5.59368 |
| 30 | C0566F20E5EBB0342D6047484D2 | 5.53837 |
| 31 | 1A24C23D294F4E58569D4A6C3CA | 6.42782 |
| 32 | 1D11030CB14CD68A4BEC06B9A93 | 5.26429 |
| 33 | C504C588B925CE4B195C08BD629 | 4.94488 |
| 34 | C23104992126569B052DC468F71 | 6.36319 |
| 35 | 508F33049129FAFA500D12A9B09 | 5.91188 |
| 36 | 57BAF215092A62284C7C5E7C250 | 5.36258 |
| 37 | 8F2F34B111437EE91ECCD038CEB | 4.98064 |
| 38 | 889AF5808948E23902BD1CAD7B3 | 6.14253 |
| 39 | 06C9C0A7CF2CC6BE181442290E0 | 5.95156 |
| 40 | 017C4196472F5E6C04658EBCBB8 | 5.40169 |
| 41 | D969C7324F4642AF57D500F8502 | 4.82317 |
| 42 | DE5C0623D745DE7F4AA44C2DC5A | 5.05168 |
| 43 | 4C6271BE774A721E1F841AECA22 | 5.20885 |
| 44 | 4B57F08FEF49EACE02F5567937B | 5.52378 |
| 45 | 9342360BE728F60D5145587DDC0 | 6.47369 |
| 46 | 9477F71A7F236ADF4C3414A8599 | 5.20757 |
| 47 | 54A1D83A9AC0DAEB6054D3A004B | 5.0776 |
| 48 | 5394192B02C3463B7C251F75B13 | 5.52381 |
| 49 | 8B019FAF0AA25EF82F9511315A9 | 5.10732 |
| 50 | 8CB41EBE92A9C22832E4DDE4EF0 | 4.77121 |
| 51 | 1E0A690332AE6A4B67C40B25888 | 5.38618 |
| 52 | 19BFA832BAA5F69B7AB5C7B03D1 | 5.20069 |
| 53 | C1AA6E96B2CCEE582805C9F4D6A | 6.18175 |
| 54 | C61FAFA73AC7768835740561632 | 5.46713 |
| 55 | 484CDAA07CAB560F2FDDDBA5361 | 6.23427 |
| 56 | 4FF95B91E4A0CEDF32AC9730A39 | 4.64117 |
| 57 | 97EC9D15FCC1D61C611C1974682 | 5.81606 |
| 58 | 90591C0474C24ACC7C6D55A1DDA | 5.04293 |
| 59 | 02E76B99D4CDE6AF294D03209A2 | 6.56931 |
| 60 | 0552EAA84CC67E7F343C4FB52FB | 5.4996 |
| 61 | DD476C2C44A762BC668C41B1E40 | 5.72958 |
| 62 | DAF2AD1DCCACFA6C7BFD0D64518 | 4.96955 |
| 63 | 072010B4AA4587D10AE25A4FBA1 | 5.37554 |
| 64 | 0015D1A532461B03179396DA2F8 | 5.29366 |
| 65 | D80017012A2F07C2452398DEE42 | 6.62956 |
| 66 | DF35D610B22C9F105852D40B71B | 4.88939 |
| 67 | 4D8BE18D022337710D72828A163 | 4.30678 |
| 68 | 4A3E609C9A28ABA311034E5F83B | 5.54517 |
| 69 | 92ABE6388241B36242B3C05B481 | 5.27261 |
| 70 | 951E67091A4A2FB25FC20CCEFD8 | 5.03828 |
| 71 | 1BCD120E5C2E0B37446BD20A88B | 5.25379 |
| 72 | 1CF8933FD42D97E5591A9E9F3D3 | 5.14859 |
| 73 | C4ED15BBCC4C8F260AAA10DBF69 | 5.39255 |
| 74 | C35894AA444F17F416DB5C0E630 | 4.97124 |
| 75 | 5166E337E448BB9742FB0A8F249 | 6.20876 |
| 76 | 56D362067C4323475F8AC61AB10 | 4.83271 |
| 77 | 8E46E4A274223F840C3A481E5AB | 5.5686 |
| 78 | 897365B3FC21A356114B04CBEF3 | 5.64126 |
| 79 | 49254AB319CA13623C2BC3C3820 | 5.17063 |
| 80 | 4E10CBA291C98BB0215A8F56379 | 5.0828 |
| 81 | 96050D2699A8977373EA8112FC2 | 5.22885 |
| 82 | 91B08C1711AB0BA16F9BCDC749A | 6.01707 |
| 83 | 030EFBAAB1A4A7C03BBB1B460E3 | 6.51422 |
| 84 | 04BB3ABB29A73F1026CA57D39BA | 4.93486 |
| 85 | DCAEFC3F31C627D3747A59D7701 | 4.86142 |
| 86 | DB1B7D0EA9CDBF01690B1542C58 | 6.21941 |
| 87 | 55C80809EFA19B8473A24B8690A | 4.25677 |
| 88 | 527D893867A203546ED30713053 | 4.47647 |
| 89 | 8A680F9C6FC31F953D630957CE8 | 6.8165 |
| 90 | 8D5DCEADE7C08745211245C25B0 | 5.87238 |
| 91 | 1FE3F93057C72B26753213431C8 | 5.31419 |
| 92 | 18567801CFCCB7F66943DFD6A91 | 6.88515 |
| 93 | C043FE85C7ADAB373AF3D19262A | 6.75475 |
| 94 | C7F67FB44FAE33E526829D47D73 | 6.10937 |
| 95 | 1D8492899302CD895C7F106386A | 4.79898 |
| 96 | 1A3153980B01555B410EDCB6132 | 4.77121 |
| 97 | C224951C13604D9A13BED2F2F88 | 5.66118 |
| 98 | C511542D8B6BD1480FCF1E676D0 | 4.93494 |
| 99 | 572F23B03B6479295BEFC8A62A8 | 5.36534 |
| 100 | 509AA281B36FE5F9479E0473BF1 | 4.78933 |
| 101 | 880F2425AB0EF93A142E0A7754A | 5.45932 |
| 102 | 8F3AA534330565E8095FC6E2C12 | 6.40963 |
| 103 | 01E9D0136569416F13F69866941 | 5.39788 |
| 104 | 065C5102ED62DDBD0E87D4F3018 | 4.38835 |
| 105 | DE49D786E503C17C5D375AF7EA2 | 4.38145 |
| 106 | D97C56B76D0859AE414616627FA | 5.5007 |
| 107 | 4BC2612ACD07F5CF1566C0A3183 | 5.6706 |
| 108 | 4C77A03B55046D1D08178C76ADB | 5.62588 |
| 109 | 94E2669F5D6D75DC5AA70272460 | 5.29578 |
| 110 | 9357E78ED56EE90C46D64EE7F38 | 5.00808 |
| 111 | 5381C88E308D5D3A6BB609AFBEB | 4.48385 |
| 112 | 54B449BFB886C1EA76C7C53A2B3 | 5.53794 |
| 113 | 8CA1CF3BA0EFDD2925774B3EC09 | 5.58523 |
| 114 | 8B144E2A28EC41F9380607EB750 | 5.71655 |
| 115 | 192A799798E3E9986C26512A128 | 5.01001 |
| 116 | 1E9FB88600E8754A71579DBFA71 | 5.89436 |
| 117 | C68A7E020889698B23E713FB4CB | 5.25553 |
| 118 | C1BFBF13908AF1593F96DF2EF92 | 5.47731 |
| 119 | 4F6CCA14C6C6E6D1DE253F81EA8C1 | 5.4871 |
| 120 | 48590B055EE54D0E384E4D3F199 | 6.18899 |
| 121 | 904C8DA1568451CF6AFEC37BD23 | 5.35874 |
| 122 | 97794C90CE8FC91D778F8FEE47B | 5.46312 |
| 123 | 05C73B0D6E88617E23AFD96F003 | 5.13605 |
| 124 | 0272BA3CE68BFDAE3EDE95BA95B | 5.70272 |
| 125 | DA673C98EEEAE56F6D6E1BBE5E0 | 6.26171 |
| 126 | DD52BD8976E17DBD701F576BCB8 | 5.50515. |

53. A method for providing a pilot symbol for base station identification in a Multiple-Input Multiple-Output (MIMO) communication system having one or more transmit antennas, the method comprising:

generating, by a pilot signal generator, the pilot symbol, wherein the pilot symbol is comprised of a first sequence having a good cell identification characteristic and a second sequence for reducing a peak-to-average power ratio (PAPR) for all of pilot symbols, wherein when the number of the transmit antennas is two and an FFT operation point has a value of 128, the first sequence R(r) is determined by $$R(r) = b_{IDcell+1} g_{\Pi(r)}, r = 8 * \left\lfloor \frac{m}{9} \right\rfloor + m \bmod 9 = 0, 1, \ldots, 47, \text{ and}$$

wherein $b_k$ represents a k-th row vector of a block code generator matrix, k represents a value calculated by adding a cell identifier IDcell and 1, $g_u$ represents a u-th column vector of the block code generator matrix, and u represents an r-th element of an interleaving pattern according to an interleaving scheme Π(r).

54. The method of claim 53, wherein the first sequence is created by block-coding information to be transmitted from a base station to a mobile station.

55. The method of claim 54, wherein the information to be transmitted from the base station to the mobile station is a cell identifier (ID).

56. The method of claim 53, wherein the second sequence is created from a predetermined reference table taking the first sequence into account.

57. The method of claim 53, wherein the pilot symbol for base station identification is determined by the following equation in which the first sequence and the second sequence are reflected, $$q_{ID_{cell}}[m] = \begin{cases} R\left(8*\left\lfloor\frac{m}{9}\right\rfloor + m \bmod 9\right), & \text{where } m \bmod 9 = 0, 1, \ldots, 7 \\ & m = 0, 1, \ldots, \frac{N_{used}}{N_t} - 1 \\ T\left(\left\lfloor\frac{m}{9}\right\rfloor\right), & \text{where } m \bmod 9 = 8 \end{cases}$$

where $N_{used}$ denotes a number of used subcarriers, $N_t$, indicates a number of the transmit antennas, $R(r)$ denotes the first sequence, and $T(-)$ denotes the second sequence.

* * * * *

UNITED STATES PATENT AND TRADEMARK OFFICE
CERTIFICATE OF CORRECTION

PATENT NO. : 7,583,586 B2 Page 1 of 1
APPLICATION NO. : 11/167663
DATED : September 1, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fourteenth Day of September, 2010

David J. Kappos
*Director of the United States Patent and Trademark Office*